United States Patent [19]
Yamaguchi et al.

[11] Patent Number: 6,020,426
[45] Date of Patent: Feb. 1, 2000

[54] CHARGE-TRANSPORTING COPOLYMER, METHOD OF FORMING CHARGE-TRANSPORTING COPOLYMER, ELECTROPHOTOGRAPHIC PHOTOSENSITIVE BODY, AND ELECTROPHOTOGRAPHIC DEVICE

[75] Inventors: Yasuhiro Yamaguchi; Fumiaki Tambo; Taketoshi Hoshizaki; Yasuo Sakaguchi; Ryosaku Igarashi; Masakazu Iijima; Taketoshi Higashi, all of Minami-ashigara, Japan

[73] Assignee: Fuji Xerox Co., Ltd., Tokyo, Japan

[21] Appl. No.: 08/962,831

[22] Filed: Nov. 3, 1997

[30] Foreign Application Priority Data

| Nov. 1, 1996 | [JP] | Japan | 8-292112 |
|---|---|---|---|
| Nov. 1, 1996 | [JP] | Japan | 8-292113 |
| Jun. 2, 1997 | [JP] | Japan | 9-144358 |
| Aug. 14, 1997 | [JP] | Japan | 9-219589 |
| Aug. 25, 1997 | [JP] | Japan | 9-228582 |

[51] Int. Cl.[7] .......... C08G 63/93; C07C 211/54; C07C 211/61; C08F 20/10

[52] U.S. Cl. .......... 525/66; 528/74; 528/99; 528/121; 528/124; 564/379; 430/59; 430/127; 430/131; 526/318.45; 526/318.6

[58] Field of Search .......... 528/74, 99, 121, 528/124; 430/59, 127, 131; 525/66; 564/379

[56] References Cited

U.S. PATENT DOCUMENTS

| 4,801,517 | 1/1989 | Frechet et al. | 430/59 |
|---|---|---|---|
| 4,806,443 | 2/1989 | Yanus et al. | 430/56 |
| 4,806,444 | 2/1989 | Yanus et al. | 430/56 |
| 4,937,165 | 6/1990 | Ong et al. | 430/59 |
| 4,959,288 | 9/1990 | Ong et al. | 430/59 |
| 4,983,482 | 1/1991 | Ong et al. | 430/59 |
| 5,034,296 | 7/1991 | Ong et al. | 430/59 |
| 5,080,989 | 1/1992 | Gruenbaum et al. | 430/58 |
| 5,094,930 | 3/1992 | Nomori et al. | 430/96 |
| 5,306,077 | 4/1994 | Trevaskis | 312/122 |
| 5,306,586 | 4/1994 | Pai et al. | 430/58 |
| 5,734,003 | 3/1998 | Iwasaki et al. | 528/99 |

FOREIGN PATENT DOCUMENTS

| 61-20953 | 1/1986 | Japan . |
|---|---|---|
| 1-122065 | 5/1989 | Japan . |
| 1-133065 | 5/1989 | Japan . |
| 1-134456 | 5/1989 | Japan . |
| 1-134457 | 5/1989 | Japan . |
| 1-134462 | 5/1989 | Japan . |
| 1-169454 | 7/1989 | Japan . |
| 2-207258 | 8/1990 | Japan . |
| 3-31847 | 2/1991 | Japan . |
| 4-11627 | 1/1992 | Japan . |
| 4-133066 | 5/1992 | Japan . |
| 5-19140 | 1/1993 | Japan . |
| 5-313387 | 5/1993 | Japan . |
| 5-202135 | 8/1993 | Japan . |
| 5-295096 | 11/1993 | Japan . |
| 5-310904 | 11/1993 | Japan . |
| 5-331238 | 12/1993 | Japan . |
| 6-256428 | 9/1994 | Japan . |
| 7-72640 | 3/1995 | Japan . |

OTHER PUBLICATIONS

"Electrophotography", R.M. Schaffert, Focal Press, pp. 344 (1975).
"Current Problems in Electrophotography", J.W. Weigl et al., Walter de Gruyter, pp. 288–300 (1972).
"Journal of Chemical Society of Japan" GC Que et al., No. 3, pp. 393–401 (1986).

*Primary Examiner*—James J. Seidleck
*Assistant Examiner*—Olga Asinovsky
*Attorney, Agent, or Firm*—Oliff & Berridge, PLC

[57] ABSTRACT

A charge transporting block and an insulating block are block copolymerized or graft copolymerized to form a charge transporting copolymer. The charge transporting polymers may be used in an electrophotographic photoreceptor and an electrophotographic device.

21 Claims, 10 Drawing Sheets

F I G. 1
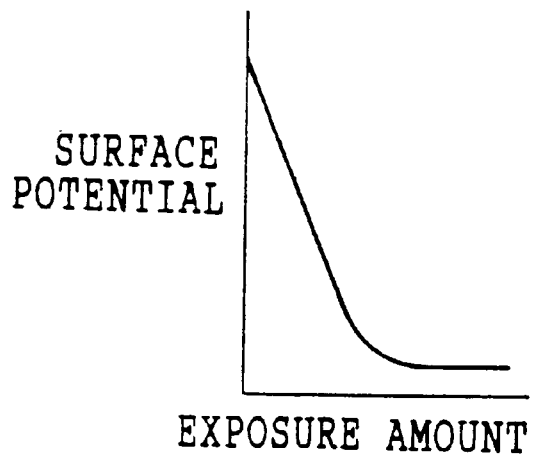
F I G. 2
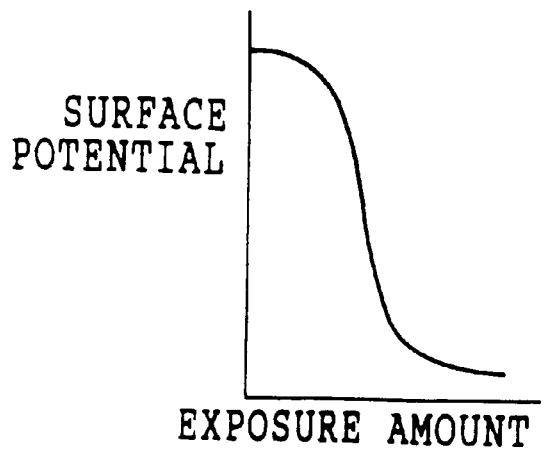

F I G. 3
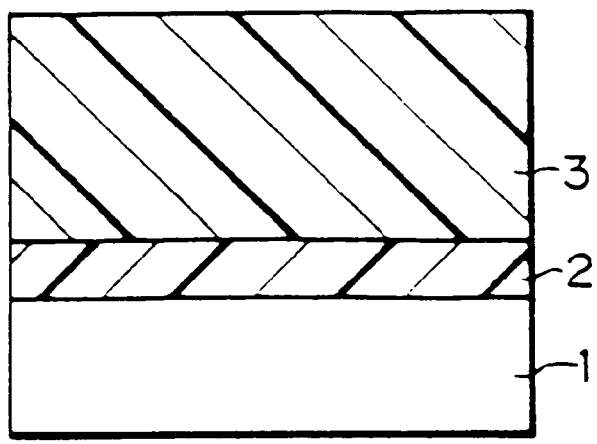
F I G. 4
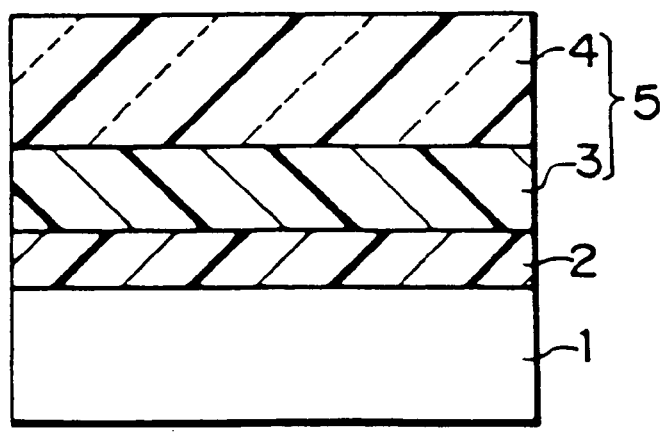

CHARGE-TRANSPORTING COPOLYMER, METHOD OF FORMING CHARGE-TRANSPORTING COPOLYMER, ELECTROPHOTOGRAPHIC PHOTOSENSITIVE BODY, AND ELECTROPHOTOGRAPHIC DEVICE

BACKGROUND OF THE INVENTION

1. Field of the invention

The present invention relates to a novel charge transporting copolymer applicable to electronic devices in which the charge transporting function is utilized and which are exemplified by an electrophotographic photoreceptor, an electroluminescence element, a photorefractive element, an optical sensor and a photocell, a method for making the novel charge transporting copolymer, and an electrophotographic photoreceptor and an electrophotographic apparatus utilizing the novel charge transporting copolymer.

2. Description of the related art

Recently, because of the advantages of high speed and high-quality print, electrophotography is playing a major role in such applications as copying machines, printers and facsimiles.

In the electrophotographic technologies, well-known photoreceptors are those which utilize inorganic photoconductive materials such as selenium, selenium-tellurium alloys, and selenium-arsenic alloys.

Meanwhile, electrophotographic photoreceptors utilizing organic photoconductive materials, which are far more advantageous in terms of cost, production and waste disposal than the above-mentioned inorganic photoconductive materials, are now being actively studied. And at present, organic photoreceptors such as these have become superior to inorganic photoreceptors. Particularly, owing to the development of a function separated multilayer photoreceptor in which two separate functions that constitute the basic process as for photoconductance, i.e., the generation of photoelectric charge and the transport of the charge, are performed by separate layers, the latitude for the selection of materials has been widened and a remarkable improvement of the performance has been achieved. This is because, designing and developing a material excellent both in the charge generation and the charge transport had been problematic, however, in the case of the function separated multilayer photoreceptor, a high performance electrophotographic photoreceptor was able to be obtained thanks to the development of materials excellent in any one of the functions. Accordingly, the main stream electrophotographic photoreceptor is currently this function separated multilayer photoreceptor.

Practical examples of the charge generating layer for use in the function separated multilayer organic photoreceptor consist of a layer produced by a direct vapor deposition of a pigment having excellent charge generation functions such as quinone pigments, perylene pigments, azo pigments, phthalocyanine pigments and selenium pigments, or a layer made up of any of these pigments dispersed at a high concentration in a binder resin.

However, as the material which forms the charge transporting layer, originally, use was made of a charge transporting polymer such as polyvinyl carbazole (PVK) which combined a charge transporting function with a film forming capability. However, PVK is associated with inherent problems such as the mechanical strength being insufficient and the mobility of the charge being slight. In order to solve these problems, function separated charge transporting layers to support the functions required of the charge transporting materials, i.e., a charge transporting function and mechanical properties, such as film forming capability, flexibility and strength, as well as the materials thereof, were developed. As a result, the main stream charge transporting material for use in an electrophotographic photoreceptor is currently a composite material made by dispersing a low-molecular-weight compound such as a hydrazone compound, a benzidine compound, an amine compound and a stilbene compound, which are each excellent in charge transporting functions, in an insulating resin having excellent mechanical properties.

However, the above-mentioned composite material made up of a dispersion of a low-molecular-weight compound presented the problem that the dispersed charge transporting low-molecular-weight compound crystallized with a lapse of time and/or under heat and thus the properties deteriorated. Especially, the material could not be used at a high temperature or in a device such as an electroluminescent element which generates heat (Joulean heat). A second problem was that, if the material was used in a photoreceptor in an electrophotographic apparatus utilizing a developing liquid to obtain a high-quality image, the contact of the material with the developing liquid caused cracks to form in the material or its properties to change due to the dissolution or crystallization of the charge transporting low-molecular-weight compound. A third problem was that, since it was necessary to disperse the low-molecular-weight compound performing the charge transporting in a resin at a concentration as high as 35% to 60% by weight for securing a sufficient charge transporting function, it was difficult to obtain a composite film excellent in mechanical properties, even if the resin had excellent mechanical properties such as flexibility and strength.

The above-mentioned problems need to be overcome, for an organic charge transporting material to be used widely in such applications as photoreceptors for electrophotography and organo-electronic devices where a higher performance, a longer service life, a higher durability, a higher speed and a lower cost are required.

Meanwhile, in response to the recent demand for high-quality images, high added value and network, digital system electrophotographic apparatuses are being actively studied and developed. In a conventional analog system electrophotographic copying machine, in which a photoreceptor is exposed by optically imaging an original on the photoreceptor, a photoreceptor is required which has a photo-induced potential attenuation characteristic as shown in FIG. 1, namely, a photoreceptor whose potential attenuates proportionally to the exposure amount (hereinafter referred to as "J-type photoreceptor"), in order to improve the reproducibility of halftone by density gradation. The aforementioned inorganic photoreceptors and organic function separated multilayer photoreceptors exhibit photo-induced potential attenuation characteristics as shown in FIG. 1. However, in a digital-system electrophotographic apparatus generally utilizing an area gradation method in which the gradation is produced by the area percentage of dots or the like, in order to increase the sharpness of pixels, it is desirable to use a photoreceptor which has a photo-induced potential attenuation characteristic as shown in FIG. 2, i.e., a photoreceptor exhibiting no attenuation of potential until a certain exposure amount is reached, but once that exposure amount is reached then the attenuation of potential is abrupt (hereinafter referred to as "S-type photoreceptor").

The S-type photo-induced potential attenuation characteristic is a known phenomenon in a single-layer photoreceptor made by dispersing the particles of an inorganic pigment such as ZnO or an organic pigment such as phthalocyanine in a resin {For example, R. M. Schaffert, "Electrophotography", Focal Press, pp.344(1975), and J. W. Weigl et al., "Current Problems in Electrophotography", Walter de Gruyter, pp.287(1972)}. In particular, many of the single-layer photoreceptors designed for exposure to laser are proposed, and these photoreceptors are produced by dispersing a phthalocyanine pigment, which has a sensitivity in the near-infrared region which is the wavelength region of a semiconductor laser now in wide use in many applications, in a binder resin {For example, G. C. Que et al., "J. of Chem. Soc. of Japan, pp.393(1986), Japanese Patent Application Laid-Open (JP-A) Nos. 1-169,454, 2-207,258, 3-31,847 and 5-313,387}. These single-layer photoreceptors are required to perform the two functions, i.e., charge-generation and charge transport, in a single material.

However, a material which is excellent in the two functions is rare, and no material able to endure actual use has been obtained yet. Generally, pigment particles have many trap levels, and therefore are not suitable for use as a charge transporting material because of the drawbacks such as poor performance in charge transporting, residual charge and poor stability in repeated use. In order to fundamentally solve these problems, broaden the latitude for the selection of materials, and enhance the overall properties of the photoreceptor, it is essential that a function separated structure be introduced in an S-type photoreceptor as well.

In this connection, D. M. Pai et al. report that, if a heterogeneous charge transporting layer, which comprises at least two charge transporting regions and one electrically inert region so that the charge transporting regions contact each other to form a helical charge transporting pathway, is combined with a charge generating layer to form multilayer photoreceptor having two layers composed of a charge generating layer and a charge transporting layer, it is possible to produce S-type photo-induced potential attenuation characteristic {JP-A No. 6-83,077 (U.S. Pat. No. 5,306,586). Meanwhile, the present inventors have succeeded in increasing the degree of separation of functions more than that of the above-mentioned invention of D. M. Pai et al., based on the discovery that a three-layer photoreceptor, which comprises a charge generating layer, a heterogeneous charge transporting layer and a homogeneous charge transporting layer, exhibits S-type photo-induced potential attenuation characteristics (JP-A No. 9-96,914).

However, the disclosed examples of the heterogeneous charge transporting layer which produces the S-type photo-induced potential attenuation characteristics, which is the key to the invention, (hereinafter referred to as "S-shaping") are limited to a layer composed of a resin having fine crystals of a phthalocyanine pigment dispersed therein, a layer composed of a resin having fine hexagonal crystals of selenium dispersed therein, and a phase-separation block copolymer of polyvinyl carbazole/dodecyl methacrylate. And, since these materials have the problems as described below, it was essential to develop a novel material for the heterogeneous charge transporting layer in order to put the above-mentioned invention to a practical use.

Namely, if a coloring pigment, such as a phthalocyanine pigment, hexagonal selenium or the like, which has a charge generating function, is used as a charge transporting material in the heterogeneous charge transporting layer, and if the charge generating layer is exposed to light particularly from the side of the charge transporting layer, the absorption of light in the heterogeneous layer and the resultant charge generation causes the problems of the sensitivity to light and chargeability being adversely affected and the stability in repeated use decreases. Although these problems maybe avoided by use of a charge generating layer, which has a sensitivity to light in the wavelength region not absorbed in the heterogeneous charge transporting layer, and by use of an exposing device, which performs the exposure only within the foregoing wavelength region, a constraint is imposed on the material and the device. In addition, when producing a layer composed of a resin having fine crystals of phthalocyanine pigment dispersed therein, or a layer composed of a resin having fine hexagonal crystals of selenium dispersed therein, it is necessary that these pigments be ground and/or dispersed, however, the grinding operation needs an enormous amount of energy and involves the risk of the blending in of impurities. The selection of suitable solvents and binder resins is a laborious task and the thus selected materials are significantly limited, because it is generally difficult to obtain a stable dispersion liquid. Further, since the denaturation of the dispersion liquid due to the growth of crystals and flocculation is generally unavoidable, the dispersion cannot be used for a long period of time. Accordingly, frequent replacement of the dispersion liquid is necessary, leading to cost increases.

Meanwhile, the advantages of the phase-separated block copolymer of polyvinyl carbazole/dodecyl methacylate are that the above-mentioned problem related to the grinding and/or dispersing is fundamentally solved, because the coating solution is homogeneous and the drying of the solution gives rise to the micro-separation of phase that produces the desired heterogeneous charge transporting layer. Further, the problem related to the above-mentioned absorption of light does not occur, because the phase-separation block copolymer is not a pigment. However, a problem of the phase-separation block copolymer is that the production is difficult and expensive, because the copolymer is produced by use of a special bifunctional initiator. Other problems of the copolymer are low mechanical strength, low mobility of charge and insufficient charge injecting capability.

As stated above, in recent years, in response to demand for organo-electronic devices and for digital system electrophotographic apparatuses, a high-performance charge transporting polymer to replace polyvinyl carbazole is once more being actively studied. Since a triarylamine-based charge transporting compound having a low molecular weight has a high charge transporting capability, many charge transporting polymers having a triarylamine skeleton in a main chain or a side chain have been developed as at the present time.

For example, U.S. Pat. No. 4,806,443 discloses charge transporting polycarbonate obtained by the polymerization of a specific dihydroxytriarylamine with bischloroformate, while U.S. Pat. No. 4,806,444 discloses a charge transporting polycarbonate obtained by the polymerization of a specific dihydroxyarylamine with phosgene. U.S. Pat. No. 4,801,517 discloses a charge transporting polycarbonate obtained by the polymerization of a bis(hydroxyalkyl) triarylamine with bischloroformate orphosgene, while U.S. Pat. Nos. 4,937,165 and 4,959,288 disclose a charge transporting polycarbonate obtained by the polymerization of a specific dihydroxyarylamine or bis(hydroxyalkyl) triarylamine with bischloroformate, and a charge transporting polyester obtained by the polymerization of a specific dihydroxyarylamine or bis(hydroxyalkyl)triaryl amine with a bisacyl halide. U.S. Pat. No. 5,034,296 discloses a charge transporting polycarbonate and a polyester containing a triarylamine structure having a specific fluorene skeleton. U.S. Pat. No. 4,983,482 discloses a charge transporting polyurethane. JP-A Nos. 61-20,953, 1-134,456, 1,134,457, 1-134,462, 1-133,065 and 4-133,066 disclose charge transporting polymers having a charge transporting skeleton such as hydrazone and triarylamine in a side chain, and an electrophotographic photoreceptor utilizing such charge transporting polymers.

However, it is still difficult to realize all of the required properties with a homopolymer composed of a single constituent component. Consequently, a satisfactory material has not yet been obtained.

In order to solve the above-mentioned problems, copolymers composed of several monomers are proposed by, for example, JP-A Nos. 4-11,627, 7-72,640, 6-256,428, 5-,295, 096, 5-310,904, 5-331,238 and 5-202,135. These copolymers, however, are produced by a single-stage polymerization wherein raw material monomers are used in the form of a mixture, and therefore the copolymers are random copolymers in which the monomers are randomly linked. Because of this, these copolymers cannot fully exhibit the properties where each of the monomers is singly polymerized, and accordingly the above-mentioned problems still remain unsolved. That is, if a homopolymer composed of a charge transporting monomer is inferior in flexibility, the flexibility can be improved by a random copolymer composed of the same charge transporting monomer and a flexible monomer. However, the copolymer thus obtained will have the concentration of the monomer active in the charge transporting reduced by the added monomer, and the function of charge transporting will decrease proportionally. Further, if the component of the copolymer forms a charge trap, a new problem will arise which impairs the charge transporting performance more than the above-mentioned dilution of the charge transporting performance.

Moreover, since these random copolymers do not exhibit any substantive phase separation, singly they are unable to form a heterogeneous charge transporting layer for S-shaping.

As for the S-shaping, the present inventors found that a phase-separated polymer blend, which was prepared from the charge transporting polymer and an insulating polymer incompatible with the charge transporting polymer, functioned effectively as a heterogeneous charge transporting layer for S-shaping (Japanese Patent Application Nos. 8-58, 858 and 8-158,520).

However, since the above-mentioned polymer blend generally caused the phase separation in a scale of several μm or more, the homogeneity of the image decreased. Further, manufacturing reproducibility problems also existed, namely that, depending on the film forming conditions such as drying speed and drying temperature, the scale of phase separation varied significantly and the electrophotographic properties dependent thereon also varied significantly.

SUMMARY OF THE INVENTION

In view of the problems of prior art as stated above, the present invention was made with the aim of providing a novel charge transporting copolymer capable of solving the problems and of providing a method for making the novel charge transporting copolymer.

Accordingly, one object of the present invention is to provide a novel charge transporting copolymer which is superior in charge transporting, mechanical properties, multilayer-formability and capability of imparting new functions and which is highly applicable to organo-electronic devices including photoreceptors for electrophotography. Another object of the present invention is to provide an easy method for making the novel charge transporting copolymer.

Yet another object of the present invention is to provide a electrophotographic photoreceptor which can solve the above-mentioned problems and exhibit excellent S-type photo-induced potential attenuation characteristics and to provide a durable electrophotographic apparatus which can produce a high-quality image by using this type of electrophotographic photoreceptor.

After vigorous studies of charge transporting materials and polymers, the present inventors have found that multiple functions can be obtained without impairing any of these functions by means of a block copolymerization or a graft copolymerization technique wherein plural blocks having the desired functions are linked by a covalent bond.

They have found that a block or graft copolymer, which is composed of a charge transporting block having at least one structure represented by the following general formula (1) or (2) and of an insulating block having at least one structure represented by the following general formula (3), has both high charge transporting capabilities and excellent mechanical properties together.

Accordingly, a first mode of the present invention is a charge transporting copolymer which is a block copolymer or a graft copolymer and which is composed of charge transporting block having as a repeating unit at least one structure represented by the following general formula (1) or (2) and of an insulating block having as a repeating unit at least one structure represented by the following general formula (3).

General Formula (1)

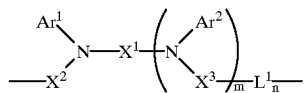

where $Ar^1$ and $Ar^2$ each independently represent a substituted or unsubstituted aryl group, $X^1$ represents a divalent hydrocarbon or heteroatom-containing hydrocarbon group which has an aromatic ring structure, $X^2$ and $X^3$ each independently represent a substituted or unsubstituted arylene group, $L^1$ represents a divalent hydrocarbon or heteroatom-containing hydrocarbon group which may be branched or may contain a ring structure, and m and n each independently represent 0 or 1.

General Formula (2)

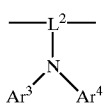

where $Ar^3$ and $Ar^4$ each independently represent a substituted or unsubstituted aryl group, and L2 represents a trivalent hydrocarbon or heteroatom-containing hydrocarbon group which has an aromatic ring structure.

General Formula (3)

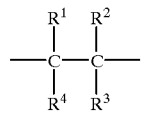

where $R^1$–$R^3$ each independently represent a hydrogen atom, a halogen atom, a substituted or unsubstituted alkyl group and a substituted or unsubstituted aryl group, and $R^4$ represents a halogen atom, a hydroxyl group, a carboxyl group, a substituted or unsubstituted alkyl groups, a substituted or unsubstituted aryl group, a substituted or unsubstituted alkoxyl group, a substituted or unsubstituted acyl group, a substituted or unsubstituted acyloxy group and a substituted or unsubstituted alkoxycarbonyl group.

Since the charge transporting copolymer of the present invention is a block or graft copolymer, which is composed of a charge transporting block having at least one structure represented by the following general formula (1) or (2), and of an insulating block having at least one structure represented by the following general formula (3), the copolymer combines a high charge transporting capability, with excellent mechanical properties, and a suitability for multilayer structure. In addition, the charge transporting copolymer of the present invention has a possibility to become a further highly functional material, because the alteration of the constituent components of the insulating block makes it possible to control properties such as glass transition temperature, degree of crystallization, refractive index, adhesion, adsorption, flexibility, solubility, fusibility and phase separation without impairing the charge transporting capability.

The present inventors have achieved the invention based on the discovery that the above-mentioned charge transporting copolymer can be easily prepared by introducing a polymerization initiator into the end or side of the charge transporting block and polymerizing the above-mentioned insulating block to the end or side of the charge transporting block by means of the initiator.

Accordingly, a second mode of the present invention is a method for making a charge transporting copolymer, comprising the steps of preparing a charge transporting block having as a repeating unit at least one structure represented by the following general formula (1) or (2), introducing a polymerization initiator into the end or side of the charge transporting block, and polymerizing a vinyl monomer represented by the general formula (3) by means of the initiator so that an insulating block, which has as a repeating unit at least one structure represented by the general formula (3), is formed at the end or side of the charge transporting block.

According to this method, it is possible to produce quite easily a high-performance charge transporting block copolymer or graft copolymer having a variety of properties by preparing blocks having a desired charge transporting capability in advance, and thereafter polymerizing a monomer which will provide desired insulating blocks by the selection of a suitable initiator.

A third mode of the present invention is a method for making a three-dimensionally crosslinked charge transporting copolymer, comprising heating the copolymer and/or treating the copolymer with water so as to cure the copolymer by crosslinking, wherein $R^4$ in the general formula (3) of the copolymer represents a substituted alkyl group, a substituted aryl group, a substituted alkoxy group, a substituted acyl group, a substituted acyloxy group or a substituted alkoxycarbonyl group, each having as a substituent thereof at least one group selected from the group consisting of halogen atoms, hydroxyl, mercapto, nitrile, carboxyl, halogenated carbonyl, halogenated sulfonyl, isocyanate, amino and alkoxysilyl groups.

The present inventors have achieved the invention based on the discovery that the above-mentioned problems can be solved by use of a electrophotographic photoreceptor comprising an electroconductive substrate with a charge generating layer and a heterogeneous charge transporting layer formed thereon, and an electrophotographic apparatus utilizing the photoreceptor, wherein the heterogeneous charge transporting layer comprises a block copolymer or a graft copolymer having a plurality of different blocks, which have the desired functions, linked to each other by means of a covalent bond.

Accordingly, a fourth mode of the present invention is a electrophotographic photoreceptor comprising an electroconductive substrate with a charge generating layer and a heterogeneous charge transporting layer formed thereon, wherein the heterogeneous charge transporting layer comprises a block copolymer or a graft copolymer containing at least a charge transporting block having a triarylamine structure and an insulating block in the repeating unit and wherein the charge transporting block and the insulating block are in a phase-separated state.

A fifth mode of the present invention is an electrophotographic apparatus which comprises the above-mentioned electrophotographic photoreceptor and an exposure means whereby exposure is performed based on a digitally processed image signal.

Concerning the mechanism revealed in the photo-induced potential S-type attenuation, there is no theory established despite several theories proposed, for example, a trap theory {(by Kitamura et al., J. of Electrophotographic Soc., vol. 20, pp.60 (1982)}, and a helical electrical conduction theory as proposed by D. M. Pai et al. in the aforementioned patent to explain clearly why the electrophotographic photoreceptor of the present invention exhibits photo-induced potential S-type attenuation.

However, photoreceptors hitherto known as S-type photoreceptors, i.e., a single-layer photoreceptor made by dispersing a pigment in a resin, an electrophotographic photoreceptor composed of a charge generating layer and a heterogeneous charge transporting layer as disclosed by D. M. Pai et al., and the electrophotographic photoreceptor composed of a charge generating layer, a heterogeneous charge transporting layer, and a homogeneous charge transporting layer as proposed by the present inventors, have in common the feature that at least in the charge transporting layer, the region adjacent to a charge generating layer is made up of a heterogeneous structure where a charge transporting domain is dispersed in an electrically inert matrix. As used herein, "an electrically inert matrix" means a matrix having a transport energy level so much greater than that of the charge transporting domain that substantially no transport charge is injected into the matrix by an electric field having an ordinary strength and therefore the matrix is virtually in a state of electrical insulation to the transport charge.

According to the helical electrical conduction theory as proposed by D. M. Pai et al., the photo-induced potential S-type attenuation of the present invention is presumably caused by the following process.

In the heterogeneous charge transporting layer, the charge transporting domains, which are dispersed in the electrically inert matrix, contact each other to produce a helical charge transporting pathway. If the electrophotographic photoreceptor is charged and a high electric field is applied to the photosensitive layer, the charge, which is generated in the charge generating layer by means of exposure to light, is injected from the charge generating layer into the charge transporting layer along the electric field by means of a Coulomb's force owing to the electric field, and moves in the direction of the electric field within the charge transporting domain. However, when the charge reaches a terminal protrusion of the charge transporting domain, the charge faces the barrier of the electrically inert matrix, and stops moving, because the direction of the movement is restricted by the electric field. If the distance of the above-described movement is sufficiently small in comparison with the total film thickness of the photosensitive layer, the attenuation of potential due to the movement is negligible. After completion of the injection of charge corresponding to almost all of the surface charge, the local electric field perpendicular to the surface in the vicinity of the injected charge is small enough as to be disregarded. In this state, since the charge which remained immobilized becomes free of the constraints of the electric field and becomes capable of diffusing in a direction other than perpendicular to the surface, the charge moves along the helical pathway into a region deeper than the region at which the charge stopped initially. In this deeper region, since the charge is again exposed to a sufficiently strong electric field, the charge moves in the direction of the electric field within the charge transporting domain. The charge reaches the barrier of the electrically inert matrix, and stops moving. However, since the strength of the electric field drops due to the previous movement of the charge, more charge moves through the helical charge transporting pathway and reaches the next insulating barrier. In this way, the movement of charge takes place in a cascade sequence, and therefore the S-type attenuation of the photoelectric potential takes place. The above is proposed by D. M. Pai et al. This explanation is also applicable to a single-layer S-type photoreceptormade by dispersing a pigment into a resin, because the light given by exposure to the photoreceptor is absorbed in a region near the surface and a charge is generated in this region, and therefore the region where light absorption and charge generating take place can be regarded as a charge generating layer and the remaining subsequent region can be regarded as a charge transporting layer. In the explanation stated above, the terminal protrusion in the charge transporting domain at which the direction of movement of the charge is restricted by the electric field can be regarded as a kind of trap (hereinafter referred to as "structural trap"). In traps caused by differences in general energy levels (hereinafter referred to as energy traps), the probability of escape from the trap diminishes as the strength of the electric field diminishes due to the Pool-Frenkel effect. In comparison to this, because of the afore mentioned mechanism, structural traps are characterized by the probability of escape from the trap increasing as the strength of the electric field diminishes.

The S-type attenuation of the photo-induced potential shown by the electrophotographic photoreceptor of the present invention is presumably caused by the above-described phenomenon where a charge transporting domain is formed by a phase composed of a charge transporting block and an electrically inert matrix is formed by a phase composed of an insulating block.

BRIEF DESCRIPTION OF THE DRAWINGS

FIG. 1 is a graph illustrating the relationship between exposure amount and surface potential in a J-type electrophotographic photoreceptor.

FIG. 2 is a graph illustrating the relationship between exposure amount and surface potential in an S-type electrophotographic photoreceptor.

FIG. 3 is a cross-sectional view of an electrophotographic photoreceptor of a first embodiment of the present invention.

FIG. 4 is a cross-sectional view of an electrophotographic photoreceptor of a second embodiment of the present invention.

DESCRIPTION OF THE PREFERRED EMBODIMENTS

Figure 5:
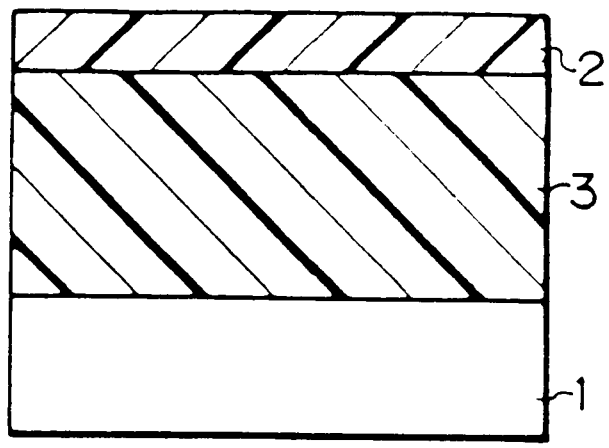
FIG. 5 is a cross-sectional view of an electrophotographic photoreceptor of a third embodiment of the present invention.

The present invention is further explained in detail by way of embodiments given below.

The charge transporting block constituting the copolymer of the present invention can be any block whose repeating unit contains a triarylamine structure and which contains as a repeating unit at least one structure represented by the general formula (1) or (2). However, in view of film forming capability, mechanical strength, flexibility, wet-application property and the like, the weight average molecular weight of the block is preferably in the range of 2,000 to 5,000,000, more preferably in the range of 10,000 to 2,000,000, and most preferably in the range of 20,000 to 1,000,000. As used here in, the weight average molecular weight of the block means a weight average of molecular weights of all the charge transporting blocks contained in the copolymer of the present invention.

In the general formula (1), $Ar^1$ and $Ar^2$ are each independently selected from a substituted or unsubstituted aryl group, and are each preferably a $C_{(6-16)}$ substituted or unsubstituted aryl group. Examples of the aryl group include phenyl, biphenyl, naphthyl and pyrenyl groups. Examples of the substituted group include methyl, ethyl and methoxy groups and halogen atoms.

$X^1$ is selected from a divalent hydrocarbon group and a heteroatom-containing hydrocarbon group having an aromatic ring structure, and is preferably a $C_{(6-20)}$ hydrocarbon group or heteroatom-containing hydrocarbon group. Examples of these groups include phenylene, biphenylene, terphenylene, naphthylene, methylenediphenyl, cyclohexylidenediphenyl, oxydiphenyl and thiodiphenyl groups as well as these groups bearing a substituent such as methyl, ethyl, methoxy and halogen. Among these groups, a substituted or unsubstituted biphenylene group is particularly preferable from the viewpoint of, for example, charge mobility.

$X^2$ and $X^3$ are each independently selected from a substituted or unsubstituted arylene group, and are each preferably a $C_{(6-18)}$ substituted or unsubstituted arylene group. Examples of these groups include phenylene, biphenylene, terphenylene and naphthylene groups as well as these groups bearing a substituent such as methyl, ethyl, methoxy and halogen.

$L^1$ is selected from a divalent hydrocarbon or heteroatom-containing hydrocarbon group which may be branched or may contain a ring structure. Among these groups, preferred is a group which has 20 or less carbon atoms and which has a linkage selected from the group consisting of ether, ester, carbonate and siloxane linkages, from the viewpoint of, for example, film forming capability, mechanical strength and flexibility. Some examples of $L^1$ are given below.

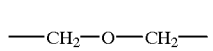

(L1)

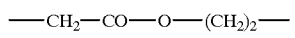

(L2)

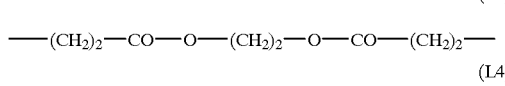

(L3)

(L4)

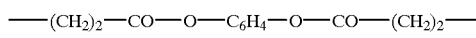

-continued

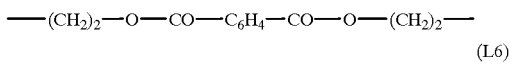

(L5)

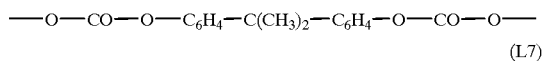

(L6)

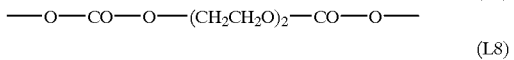

(L7)

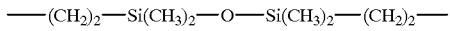

(L8)

In the general formula (1), m and n are independently 0 or 1.

Examples of the partial structural formula represented by the general formula (1) include the following. In the following example, n is 1.

TABLE 1
| * | $X^1$ | $X^2$ | $X^3$ | $Ar^1$ | $Ar^2$ | $L^1$ | m |
|---|---|---|---|---|---|---|---|
| 1 | 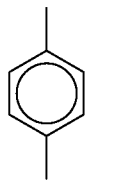 | 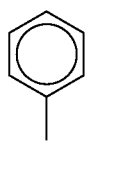 | 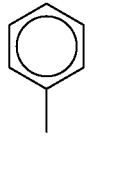 |  | 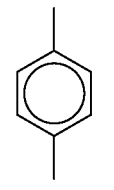 | L3 | 1 |
| 2 | 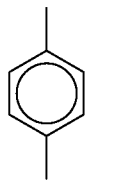 | 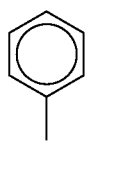 | 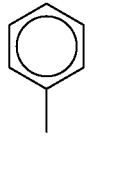 | 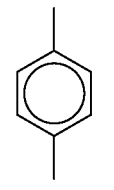 | 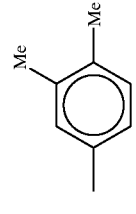 | L3 | 1 |
| 3 | 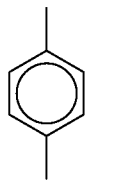 | 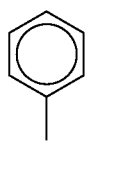 | | 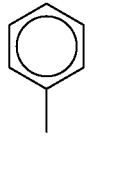 | | L2 | 0 |
| 4 |  | 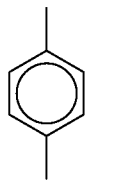 | | 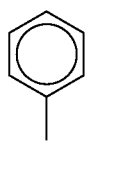 | | L1 | 0 |
| 5 | 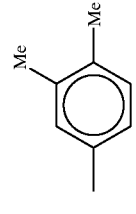 |  | | 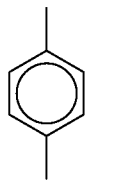 | | L1 | 0 |

TABLE 1-continued

| * | $X^1$ | $X^2$ | $X^3$ | $Ar^1$ | $Ar^2$ | $L^1$ | m |
|---|---|---|---|---|---|---|---|
| 6 | biphenyl | p-phenylene | p-phenylene | phenyl | phenyl | L1 | 1 |
| 7 | biphenyl | biphenyl | biphenyl | 4-Me-phenyl | 4-Me-phenyl | L2 | 1 |
| 8 | biphenyl | m-phenylene | m-phenylene | 3-Me-phenyl | 3-Me-phenyl | L3 | 1 |
| 9 | biphenyl | m-phenylene | m-phenylene | 2,3-diMe-phenyl | 2,3-diMe-phenyl | L3 | 1 |
| 10 | biphenyl | m-phenylene | m-phenylene | phenyl | phenyl | L4 | 1 |

TABLE 1-continued

| * | X$^1$ | X$^2$ | X$^3$ | Ar$^1$ | Ar$^2$ | L$^1$ | m |
|---|---|---|---|---|---|---|---|
| 11 | biphenyl | m-phenylene | m-phenylene | phenyl | phenyl | L5 | 1 |
| 12 | biphenyl | m-phenylene | m-phenylene | phenyl | phenyl | L6 | 1 |
| 13 | biphenyl | m-phenylene | m-phenylene | phenyl | phenyl | L7 | 1 |
| 14 | biphenyl | m-phenylene | m-phenylene | phenyl | phenyl | L8 | 1 | note:
* = partial structural formula

TABLE 2
| * | X¹ | X² | X³ |
|---|---|---|---|
| 15 | 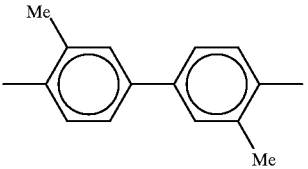 | 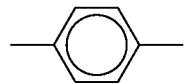 |  |
| 16 | 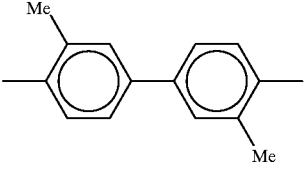 | 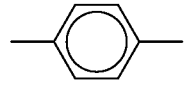 |  |
| 17 | 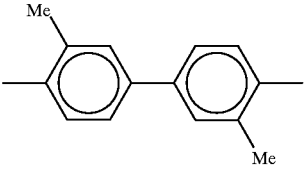 | 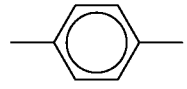 |  |
| 18 | 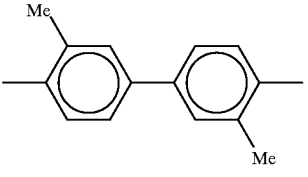 | 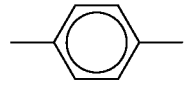 | 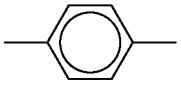 |
| 19 | 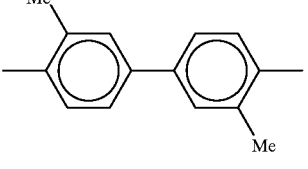 | 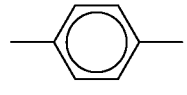 | 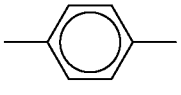 |
| 20 | 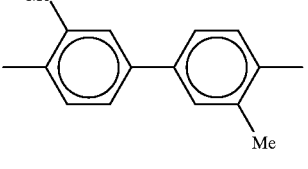 | 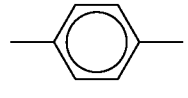 |  |
| 21 | 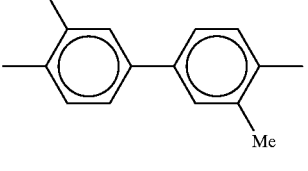 | 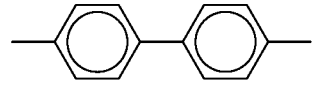 | 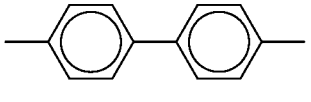 |
| 22 | 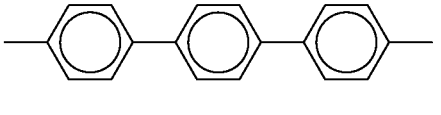 | 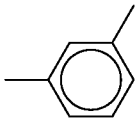 | 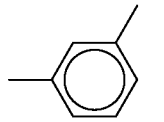 |

TABLE 2-continued

| * | Ar¹ | Ar² | L¹ | m |
|---|-----|-----|----|----|
| 15 | (phenyl) | (phenyl) | L1 | 1 |
| 16 | (3,4-dimethylphenyl) | (3,4-dimethylphenyl) | L3 | 1 |
| 17 | (3-methylphenyl) | (3-methylphenyl) | L3 | 1 |

TABLE 2-continued

| | | | | |
|---|---|---|---|---|
| 18 | 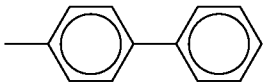 | 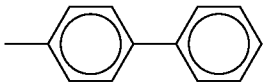 | L3 | 1 |
| 19 | 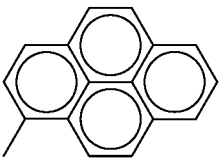 | 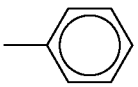 | L7 | 1 |
| 20 | 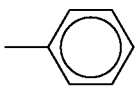 | 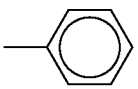 | L7 | 1 |
| 21 | 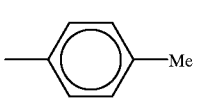 |  | L3 | 1 |
| 22 | 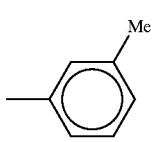 | 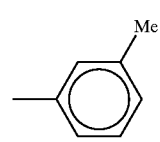 | L3 | 1 |
| 23 | 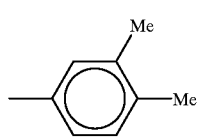 | 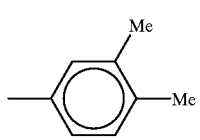 | L3 | 1 |
| 24 | 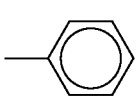 | 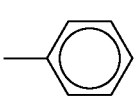 | L3 | 1 |
| 25 | 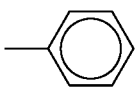 | 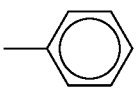 | L3 | 1 |
| 26 | 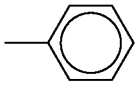 | 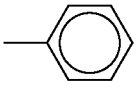 | L3 | 1 |
| 27 | 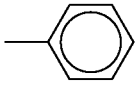 | 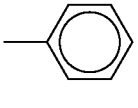 | L6 | 1 |
| 28 | 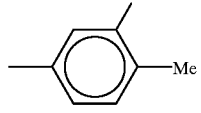 | 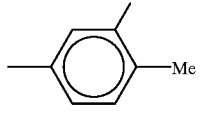 | L8 | 1 | note:
* = partial structural formula

In the general formula (2), $Ar^3$ and $Ar^4$ are each selected independently from a substituted or unsubstituted aryl group, and are each preferably a $C_{(6-24)}$ substituted or unsubstituted aryl group. Examples of the aryl group include phenyl, biphenyl, naphthyl and pyrenyl groups. Examples of the substituent include a $C_{(1-12)}$ alkyl or alkoxyl, diarylamino and diarylaminoaryl groups and halogen atoms.

$L^2$ is arbitrarily selected from a trivalent hydrocarbon group and heteroatom-containing hydrocarbon group having an aromatic ring structure, and preferred is a group which has 20 or less carbon atoms, from the viewpoint of, for example, mechanical strength. Some examples of $L^2$ are given below.
(Y1)
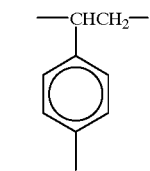
(Y2)
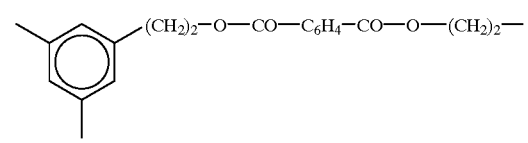
(Y3)
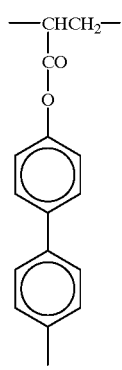
(Y4)
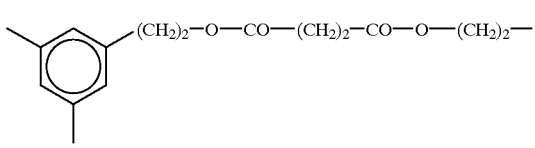
(Y5)
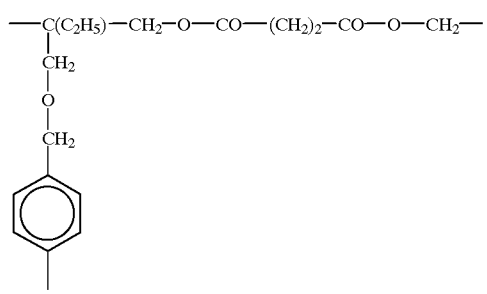
(Y6)
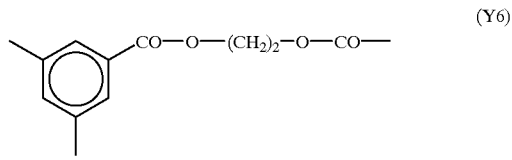
(Y7)
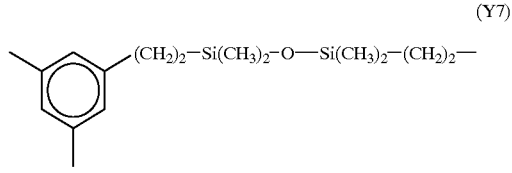
(Y8)
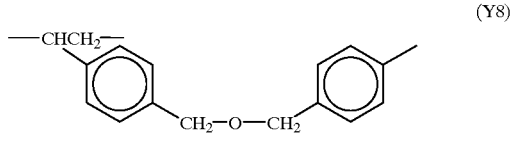
Examples of the partial structural formula represented be the general formula (2) include the following.
TABLE 3
| * | Ar³ | Ar⁴ | $L^2$ |
|---|-----|-----|-------|
| 29 | —⟨phenyl⟩ | —⟨phenyl⟩ | Y1 |
| 30 | —⟨2,3-diMe-phenyl⟩ | —⟨2,3-diMe-phenyl⟩ | Y1 |
| 31 | —⟨2,3-diMe-phenyl⟩ | —⟨biphenyl⟩ | Y3 |

TABLE 3-continued

| * | Ar³ | Ar⁴ | L² |
|---|-----|-----|-----|
| 32 | tolyl | pyrenyl | Y3 |
| 33 | tolyl | methylnaphthyl | Y3 |
| 34 | 3,4-dimethylphenyl | biphenyl | Y1 |
| 35 | 3,4-dimethylphenyl | biphenyl | Y2 |
| 36 | 3,4-dimethylphenyl | biphenyl | Y3 |
| 37 | 3,4-dimethylphenyl | biphenyl | Y4 |
| 38 | 3,4-dimethylphenyl | biphenyl | Y5 |
| 39 | 3,4-dimethylphenyl | biphenyl-N(3-tolyl)₂ | Y6 |

TABLE 3-continued

| * | Ar³ | Ar⁴ | L² |
|---|-----|-----|-----|
| 40 | 2,4-dimethylphenyl | N,N-bis(methylphenyl)(methylphenyl)amino | Y7 |
| 41 | 2,4-dimethylphenyl | 4-phenylphenyl (biphenyl) | Y6 | note:
* = partial structural formula

The aforementioned charge transporting block may have in the repeating unit at least one structure represented by the general formula (1) or (2). If several structures are contained in the repeating unit, the structures may be linked by any form arbitrarily selected from random, block and alternating linkages. Further, the charge transporting block may have the repeating unit containing a structure different from that represented by the general formula (1) or (2). In this case, the percentage of the structure represented by the general formula (1) or (2) is preferably 25% by weight or more, more preferably 40% by weight or more, and most preferably 60% by weight or more, of the charge transporting block. If the percentage of the structure represented by the general formula (1) or (2) is less than 25% by weight in the charge transporting block, a sufficient charge transporting capability cannot be exhibited.

From the requirements of durability, mechanical strength, flexibility, chemical stability and prevention of adhesion of contaminants, the glass transition temperature of the charge transporting block is preferably 20° C. or higher, more preferably 60° C. or higher, and most preferably 90° C. or higher.

The insulating block constituting the copolymer of the present invention can be any block whose repeating unit contains as a repeating unit at least one structure represented by the general formula (3) and which exhibits an insulating property. However, in view of film forming capability, mechanical strength, flexibility, wet-application property and the like, the weight average molecular weight of the block is preferably in the range of 2,000 to 5,000,000, more preferably in the range of 10,000 to 2,000,000, and most preferably in the range of 20,000 to 1,000,000. As used herein, the weight average molecular weight of the insulating block means a weight average of molecular weights of all the insulating blocks contained in the copolymer of the present invention.

In the general formula (3), $R^1$ to $R^3$ are independently selected from the group consisting of a hydrogen atom, a halogen atom, a substituted or unsubstituted alkyl group and a substituted or unsubstituted aryl group. Preferable substituted or unsubstituted alkyls are $C_{(1-8)}$ alkyl groups. Preferable substituted or unsubstituted aryls are $C_{(6-8)}$ aryl groups. Examples of these groups include a methyl group, an ethyl group, a chloromethyl group, a phenyl group and a tolyl group.

$R^4$ is selected at will from the group consisting of a halogen atom, a hydroxyl, a carboxyl, a substituted or unsubstituted alkyl, a substituted or unsubstituted aryl group, a substituted or unsubstituted alkoxy group, a substituted or unsubstituted acyl group, a substituted or unsubstituted acyloxy group, and a substituted or unsubstituted alkoxycarbonyl group. Although $R^4$ may be branched or may contain a ring structure, the number of carbon atoms is preferably in the range of 1 to 20.

In the applications where a high-speed response is required, such as a electrophotographic photoreceptor, an optical sensor and a photo-refractive element, a particularly preferred compound represented by the general formula (3) is a compound in which $R^1$ to $R^3$ are each independently a hydrogen atom and a monovalent hydrocarbon group which may be branched or may contain a ring structure, and $R^4$ is a monovalent hydrocarbon group which may be branched or may contain a ring structure.

Since these compounds have no polar group in the structure, the polarity is low and the proportion of charge which is caught by dielectric polarization is small. Because of this, these compounds are preferable because the charge mobility is higher and the charge life span is prolonged. Moreover, they show the particularly preferable effect of their dependency of the compounds on moisture being reduced because their moisture absorption is reduced.

In order to exhibit these advantageous effects, the percentage of the repeating unit having the above-mentioned structure is preferably 50% by weight or more, and more preferably 70% by weight or more, of the insulating block.

In the applications where a high mechanical strength and solvent resistance are required, such as a electrophotographic photoreceptor and an electroluminescence element, a particularly preferred compound represented by the general formula (3) is a compound in which $R^4$ is a substituted alkyl group, a substituted aryl group, a substituted alkoxyl group, a substituted acyl group, a substituted acyloxy group or a a substituted acyl group, a substituted acyloxy group or a substituted alkoxycarbonyl group, each having as a substituent thereof at least one reactive group selected from the group consisting of halogen atoms, hydroxyl, mercapto, nitrile, carboxyl, halogenated carbonyl, halogenated sulfonyl, isocyanate, amino and alkoxysilyl groups.

Because of the presence of the reactive substituent, the charge transporting copolymer can be crosslinked by itself or by the aid of a curing agent to produce a charge transporting copolymer which is three-dimensionally crosslinked. Because of the three-dimensionally crosslinked structure, the three-dimensionally crosslinked copolymer exhibits advantageous effects such as high mechanical strength and solvent resistance.

In order to exhibit these advantageous effects, the percentage of the repeating unit having the above-mentioned structure is preferably 5% by weight or more, and more preferably 10% by weight or more, of the insulating block. However, it is necessary to exercise caution particularly in the case where the film formation is performed using a wet-application method, because the reaction in the coating liquid cannot be neglected and the pot-life will be shortened if the proportion of the repeating unit in the insulating block is too high.

The aforementioned insulating block is required to have a repeating unit containing at least one structure represented by the general formula (3). If several structures are contained in the repeating unit, the structures may be linked by any form selected from random, block and alternating linkages. Further, the insulating block may have a repeating unit containing a structure different from that represented by the general formula (3). If a different structure such as this is contained in the repeating unit, the percentage of the structure represented by the general formula (3) is preferably 30% by weight or more, more preferably 50% by weight or more, and most preferably 70% by weight or more, of the insulating block.

From the requirements of durability, mechanical strength, flexibility, chemical stability and prevention of adhesion of contaminants, the glass transition temperature of the insulating block is preferably 20° C. or higher, more preferably 60° C. or higher, and most preferably 90° C. or higher. FIGS. 4 to 13 show examples of the structures of the repeating units which provide such preferable glass transition temperatures and are represented by the general formula (3). The glass transition temperatures shown in these tables mean the glass transition temperatures of homopolymers composed of a repeating unit represented by the general formula (3) alone.

TABLE 4 general formula (3)

| $*^1$ | $R^1$ | $R^2$ | $R^3$ | $R^4$ | $*^2$ |
|---|---|---|---|---|---|
| 42 | H | H | H | isopropyl | 50 |
| 43 | H | H | H | isobutyl | 30 |
| 44 | H | H | H | cyclopentyl | 75 |
| 45 | H | H | H | cyclopentylmethyl | 50 |
| 46 | H | H | H | cyclohexyl | 120 |
| 47 | H | H | H | cyclohexylmethyl | 62 |
| 48 | H | H | H | benzyl | 60 |
| 49 | H | H | H | 2-naphthylethyl | 60 |
| 50 | methyl | H | H | isopropyl | 37 |
| 51 | H | H | H | methoxycarbonyl | 31 |
| 52 | H | H | H | tert-butoxycarbonyl | 43 |
| 53 | H | H | H | 2-(tert-butyl)phenoxycarbonyl | 72 |
| 54 | H | H | H | 2-naphthoxycarbonyl | 85 |
| 55 | H | H | H | 4-methoxyphenoxycarbonyl | 51 |
| 56 | H | H | H | 2-methoxycarbonyl-phenoxycarbonyl | 46 |
| 57 | H | H | H | 2-ethoxycarbonyl-phenoxcarbonyl | 30 |
| 58 | H | H | H | 2-chlorophenoxycarbonyl | 53 |
| 59 | H | H | H | 4-chlorophenoxycarbonyl | 58 |

TABLE 4-continued general formula (3)

| $*^1$ | $R^1$ | $R^2$ | $R^3$ | $R^4$ | $*^2$ |
|---|---|---|---|---|---|
| 60 | H | H | H | 2-cyanobenzyloxycarbonyl | 44 |
| 61 | H | H | H | 4-cyanophenoxycarbonyl | 90 |
| 62 | H | H | H | p-tolyloxycarbonyl | 43 |
| 63 | H | H | H | isobornyloxycarbonyl | 94 |
| 64 | methyl | H | H | methoxycarbonyl | 105 | note: $*^1$ = partial structural formula
note: $*^2$ = Tg (° C.) of polymers

TABLE 5 general formula (3)

| $*^1$ | $R^1$ | $R^2$ | $R^3$ | $R^4$ | $*^2$ |
|---|---|---|---|---|---|
| 65 | methyl | H | H | ethoxycarbonyl | 65 |
| 66 | methyl | H | H | propoxycarbonyl | 35 |
| 67 | methyl | H | H | isopropoxycarbonyl | 81 |
| 68 | nethyl | H | H | sec-butoxycarbonyl | 60 |
| 69 | methyl | H | H | tert-butoxycarbonyl | 107 |
| 70 | methyl | H | H | isobutoxycarbonyl | 53 |
| 71 | methyl | H | H | cyclohexyloxycarbonyl | 83 |
| 72 | methyl | H | H | phenoxycarbonyl | 110 |
| 73 | methyl | H | H | benzyloxycarbonyl | 54 |
| 74 | methyl | H | H | 2-(N-tert-butylamino)ethoxycarbonyl | 33 |
| 75 | methyl | H | H | 2-cyanoethoxycarbonyl | 91 |
| 76 | methyl | H | H | 2-hydroxyethoxycarbonyl | 55 |
| 77 | methyl | H | H | 2-hydroxypropoxycarbonyl | 73 |
| 78 | methyl | H | H | isobornyloxycarbonyl | 110 |
| 79 | H | H | H | aminocarbonyl | 109 |
| 80 | H | H | H | N-butylaminocarbonyl | 46 |
| 81 | H | H | H | N,N-dimethylaminocarbonyl | 89 |
| 82 | H | H | H | morpholylcarbonyl | 145 |
| 83 | H | H | H | piperidylcarbonyl | 108 |
| 84 | methyl | H | H | N-(4-methoxycarbonylphenyl)aminocarbonyl | 180 |
| 85 | Cl | H | H | methoxycarbonyl | 174 |
| 86 | Cl | H | H | ethoxycarbonyl | 119 |
| 87 | Cl | H | H | propoxycarbonyl | 71 |
| 88 | Cl | H | H | isopropoxycarbonyl | 135 | note: $*^1$ = partial structural formula
note: $*^2$ = Tg (° C.) of polymers

TABLE 6 general formula (3)

| $*^1$ | $R^1$ | $R^2$ | $R^3$ | $R^4$ | $*^2$ |
|---|---|---|---|---|---|
| 89 | F | H | H | methoxycarbonyl | 128 |
| 90 | cyano | H | H | butoxycarbonyl | 85 |
| 91 | phenyl | H | H | methoxycarbonyl | 118 |
| 92 | methyl | H | H | methoxy | 67 |
| 93 | F | F | F | 2,2,2-trifluoroethoxy | 35 |
| 94 | H | H | H | phenylcarbonyl | 74 |
| 95 | H | H | H | p-tolylcarbonyl | 71 |
| 96 | H | H | H | p-ethylphenylcarbonyl | 52 |
| 97 | H | H | H | p-propylphenylcarbonyl | 44 |
| 98 | H | H | H | p-tert-butylphenylcarbonyl | 104 |
| 99 | H | H | H | Cl | 81 |
| 100 | H | H | H | F | 41 |
| 101 | H | H | F | F | 102 |
| 102 | F | H | F | F | 32 |
| 103 | F | F | F | Cl | 45 |
| 104 | F | F | Cl | Cl | 77 |
| 105 | F | H | H | trifluoromethyl | 42 |
| 106 | F | F | F | trifluoromethyl | 152 |
| 107 | H | H | H | 2-bromoethyl | 70 |
| 108 | H | H | H | cyano | 97 |
| 109 | H | H | H | acetoxy | 32 |

TABLE 6-continued general formula (3)

| *1 | R¹ | R² | R³ | R⁴ | *2 |
|---|---|---|---|---|---|
| 110 | H | H | H | formyloxy | 37 |
| 111 | H | H | H | pivaloyloxy | 104 |
| 112 | H | H | H | cyclopentanoyloxy | 36 |
| 113 | H | H | H | cyclohexanoyloxy | 76 | note: *1 = partial structural formula
note: *2 = Tg (° C.) of polymers

TABLE 7 general formula (3)

| *1 | R¹ | R² | R³ | R⁴ | *2 |
|---|---|---|---|---|---|
| 114 | H | H | H | 1-methylcyclohexanoyloxy | 86 |
| 115 | H | H | H | benzoyloxy | 71 |
| 116 | H | H | H | o-methylbenzoyloxy | 48 |
| 117 | H | H | H | m-methylbenzoyloxy | 51 |
| 118 | H | H | H | p-methylbenzoyloxy | 70 |
| 119 | H | H | H | p-ethylbenzoyloxy | 53 |
| 120 | H | H | H | o-methoxybenzoyloxy | 65 |
| 121 | H | H | H | m-methoxybenzoyloxy | 44 |
| 122 | H | H | H | p-methoxybenzoyloxy | 87 |
| 123 | H | H | H | p-ethoxybenzoyloxy | 70 |
| 124 | H | H | H | o-acetoxybenzoyloxy | 51 |
| 125 | H | H | H | p-tert-butylbenzoyloxy | 101 |
| 126 | H | H | H | p-butanoyloxybenzoyloxy | 61 |
| 127 | H | H | H | o-chlorobenzoyloxy | 62 |
| 128 | H | H | H | m-chlorobenzoyloxy | 65 |
| 129 | H | H | H | p-chlorobenzoyloxy | 84 |
| 130 | H | H | H | m-bromobenzoyloxy | 58 |
| 131 | H | H | H | p-bromobenzoyloxy | 92 |
| 132 | H | H | H | m-trimethylsilylbenzoyloxy | 80 |
| 133 | H | H | H | p-trimethylsilylbenzoyloxy | 135 |
| 134 | H | H | H | m-nitrobenzoyloxy | 93 |
| 135 | H | H | H | p-nitrobenzoyloxy | 122 |
| 136 | H | H | H | p-phenylbenzoyloxy | 85 |
| 137 | H | H | H | nicotinoyloxy | 87 |
| 138 | H | H | H | isonicotinoyloxy | 99 | note: *1 = partial structural formula
note: *2 = Tg (° C.) of polymers

TABLE 8 general formula (3)

| *1 | R¹ | R² | R³ | R⁴ | *2 |
|---|---|---|---|---|---|
| 139 | H | H | H | phenyl | 100 |
| 140 | H | H | H | 2-methylphenyl | 136 |
| 141 | H | H | H | 3-methylphenyl | 97 |
| 142 | H | H | H | 4-methylphenyl | 93 |
| 143 | H | H | H | 2,4-dimethylphenyl | 112 |
| 144 | H | H | H | 2,5-dimethylphenyl | 143 |
| 145 | H | H | H | 3,4-dimethylphenyl | 111 |
| 146 | H | H | H | 3,5-dimethylphenyl | 104 |
| 147 | H | H | H | 4-butylphenyl | 48 |
| 148 | H | H | H | 4-tert-butylphenyl | 128 |
| 149 | H | H | H | 4-methoxyphenyl | 92 |
| 150 | H | H | H | 4-butoxyphenyl | 47 |
| 151 | H | H | H | 2-chlorophenyl | 131 |
| 152 | H | H | H | 3-chlorophenyl | 90 |
| 153 | H | H | H | 4-chlorophenyl | 131 |
| 154 | H | H | H | 2,4-dichlorophenyl | 135 |
| 155 | H | H | H | 2,5-dichlorophenyl | 106 |
| 156 | H | H | H | 2,6-dichlorophenyl | 157 |
| 157 | H | H | H | 3,4-dichlorophenyl | 128 |
| 158 | H | H | H | 2-bromophenyl | 118 |
| 159 | H | H | H | 3-bromophenyl | 118 |
| 160 | H | H | H | 4-bromophenyl | 144 |
| 161 | H | H | H | 2,4,6-tribromophenyl | 195 |

TABLE 8-continued general formula (3)

| *1 | R¹ | R² | R³ | R⁴ | *2 |
|---|---|---|---|---|---|
| 162 | H | H | H | 4-fluorophenyl | 95 |
| 163 | H | H | H | 4-iodophenyl | 157 | note: *1 = partial structural formula
note: *2 = Tg (° C.) of polymers

TABLE 9 general formula (3)

| *1 | R¹ | R² | R³ | R⁴ | *2 |
|---|---|---|---|---|---|
| 164 | H | H | H | 4-methoxymethylphenyl | 77 |
| 165 | H | H | H | 4-butoxymethylphenyl | 67 |
| 166 | H | H | H | 2-methoxycarbonylphenyl | 130 |
| 167 | H | H | H | 4-methoxycarbonylphenyl | 113 |
| 168 | H | H | H | 2-ethoxycarbonylpyenyl | 118 |
| 169 | H | H | H | 2-butoxycarbonylphenyl | 126 |
| 170 | H | H | H | 2-isobutoxycarbonylphenyl | 127 |
| 171 | H | H | H | 4-isobutoxycarbonylphenyl | 90 |
| 172 | H | H | H | 2-propoxycarbonylphenyl | 108 |
| 173 | H | H | H | 2-hexyloxycarbonylphenyl | 45 |
| 174 | H | H | H | 2-dimethylaminophenyl | 87 |
| 175 | H | H | H | 4-dimethylaminophenyl | 146 |
| 176 | H | H | H | 2-hydroxymethylphenyl | 160 |
| 177 | H | H | H | 3-hydroxymethylphenyl | 125 |
| 178 | H | H | H | 4-hydroxymethylphenyl | 140 |
| 179 | H | H | H | 4-biphenyl | 161 |
| 180 | H | H | H | 4-phenylacetylphenyl | 78 |
| 181 | H | H | H | 4-p-toluoylphenyl | 99 |
| 182 | H | H | H | 4-benzoylphenyl | 98 |
| 183 | H | H | H | 4-(4-biphenyl)phenyl | 320 |
| 184 | H | H | H | 4-acetylphenyl | 116 |
| 185 | H | H | H | 4-chloro-2-methylphenyl | 145 |
| 186 | H | H | H | 4-chloro-3-methylphenyl | 114 |
| 187 | H | H | H | 4-chloro-3-fluorophenyl | 122 |
| 188 | methyl | H | H | phenyl | 168 |
| 189 | methyl | H | H | 4-isopropylphenyl | 149 |
| 190 | F | F | F | phenyl | 202 |
| 191 | methyl | H | H | cyano | 120 |
| 192 | H | H | H | naphthyl | 151 | note: *1 = partial structural formula
note: *2 = Tg (° C.) of polymers

TABLE 10 general formula (3)

| * | R¹ | R² | R³ | R⁴ |
|---|---|---|---|---|
| 193 | H | H | H | phenyl |
| 194 | methyl | H | H | phenyl |
| 195 | H | H | H | 2-biphenyl |
| 196 | H | H | H | 3-biphenyl |
| 197 | methyl | H | H | 4-biphenyl |
| 198 | H | H | H | 9-anthryl |
| 199 | H | H | H | 2-fluorenyl |
| 200 | H | H | H | cyclobutyl |
| 201 | H | H | H | 4-phenylcyclobutyl |
| 202 | H | H | H | 3-cyclohexylpropyl |
| 203 | H | H | H | 3-cyclopentylpropyl |
| 204 | H | H | H | 3-naphthylpropyl |
| 205 | H | H | H | 4-methylcyclohexyl |
| 206 | H | H | H | 3-methylcyclohexyl |
| 207 | H | H | H | phenethyl |
| 208 | H | H | H | 2-cyclopentylethyl |
| 209 | H | H | H | 2-cyclohexylethyl |
| 210 | H | H | H | 4-cyclohexylbutyl |
| 211 | H | H | H | 4-phenylbutyl | note: * = partial structural formula

TABLE 11 general formula (3)

| * | R¹ | R² | R³ | R⁴ |
|---|---|---|---|---|
| 212 | H | H | H | 2-bicyclo[2.2.1]heptylethyl |
| 213 | H | H | H | 1-naphthylphenyl |
| 214 | H | H | H | 2-phenanthryl |
| 215 | methyl | H | H | 2-phenanthryl |
| 216 | H | H | H | 1,2,3,4-tetrahydronaphthyl |
| 217 | methyl | H | H | 1,2,3,4-tetrahydronaphthyl |
| 218 | H | H | H | pentyl |
| 219 | H | H | H | 3-methylpentyl |
| 220 | H | H | H | 4-methylpentyl |
| 221 | H | H | H | hexyl |
| 222 | H | H | H | heptyl |
| 223 | H | H | H | nonyl |
| 224 | H | H | H | undecyl |
| 225 | H | H | H | tert-butoxy |
| 226 | H | H | H | ethylcarbonyl |
| 227 | H | H | H | methylcarbonyloxy |
| 228 | methyl | H | H | methyl |
| 229 | methyl | H | H | ethyl |
| 230 | methyl | H | H | propyl |
| 231 | methyl | H | H | isopropyl |
| 232 | methyl | H | H | butyl |
| 233 | methyl | H | H | isobutyl | note: * = partial structural formula

TABLE 12 general formula (3)

| * | R¹ | R² | R³ | R⁴ |
|---|---|---|---|---|
| 234 | methyl | H | H | tert-butyl |
| 235 | methyl | H | H | pentyl |
| 236 | methyl | H | H | hexyl |
| 237 | methyl | H | H | cyclohexyl |
| 238 | methyl | H | H | heptyl |
| 239 | methyl | H | H | octyl |
| 240 | methyl | H | H | decyl |
| 241 | methyl | H | H | dodecyl |
| 242 | methyl | H | H | eicosyl |
| 243 | methyl | H | H | phenyl |
| 244 | methyl | H | H | benzyl |
| 245 | H | H | H | butyl |
| 246 | ethyl | H | H | butyl |
| 247 | F | H | H | butyl |
| 248 | Cl | H | H | butyl |
| 249 | F | H | H | butyl |
| 250 | Cl | Cl | H | butyl |
| 251 | F | F | F | butyl |
| 252 | Cl | Cl | Cl | butyl |
| 253 | phenyl | H | H | butyl |
| 254 | methyl | methyl | methyl | butyl | note: * = partial structural formula

TABLE 13 general formula (3)

| * | R¹ | R² | R³ | R⁴ |
|---|---|---|---|---|
| 255 | methyl | H | H | 2-chlorosulfonylethyl |
| 256 | methyl | H | H | 3-chlorosulfonylpropyl |
| 257 | methyl | H | H | 2-carboxyethyl |
| 258 | methyl | H | H | 3-carboxypropyl |
| 259 | methyl | H | H | 4-carboxyphenyl |
| 260 | methyl | H | H | 2-hydroxyethyl |
| 261 | methyl | H | H | 3-hydroxypropyl |
| 262 | methyl | H | H | 4-hydroxybutyl |
| 263 | methyl | H | H | 5-hydroxypentyl |
| 264 | methyl | H | H | 6-hydroxyhexyl |
| 265 | methyl | H | H | 4-hydroxyphenyl |

TABLE 13-continued general formula (3)

| * | R¹ | R² | R³ | R⁴ |
|---|---|---|---|---|
| 266 | methyl | H | H | 2-mercaptoethyl |
| 267 | methyl | H | H | 3-mercaptopropyl |
| 268 | methyl | H | H | 2-cyanoethyl |
| 269 | methyl | H | H | 3-cyanopropyl |
| 270 | methyl | H | H | 4-cyanobutyl |
| 271 | methyl | H | H | 5-cyanopentyl |
| 272 | methyl | H | H | 6-cyanohexyl |
| 273 | methyl | H | H | 4-cyanophenyl |
| 274 | methyl | H | H | 2-isocyanatoethyl |
| 275 | methyl | H | H | 3-isocyanatopropyl |
| 276 | methyl | H | H | 2-aminoethyl |
| 277 | methyl | H | H | 2-aminopropyl |
| 278 | methyl | H | H | 4-aminobutyl |
| 279 | methyl | H | H | 5-aminopentyl |
| 280 | methyl | H | H | 6-aminohexyl |
| 281 | methyl | H | H | 4-aminophenyl |
| 282 | methyl | H | H | 3,4-epoxybutyl |
| 283 | methyl | H | H | 4,5-epoxypentyl |
| 284 | methyl | H | H | 5,6-epoxyhexyl |
| 285 | methyl | H | H | 2-trimethoxysilylethyl |
| 286 | methyl | H | H | 3-trimethoxysilylpropyl | note: * = partial structural formula

The copolymer of the present invention may be a block copolymer comprising the above-mentioned blocks linked to each other in a block form, or may be a graft copolymer comprising one of the above-mentioned blocks as a main chain and the other block as a side chain linked to the main chain. Accordingly, the type of the linkage of the blocks is not limited. If the charge transporting block is indicated by A and the insulating block is indicated by B, the examples of possible copolymers include block copolymers, such as AB, ABA, BAB, $(AB)_n$, $(AB)_nA$ and $B(AB)_n$, graft copolymers comprising charge transporting blocks as a main chain and insulating blocks as a side chain linked to the main chain, graft copolymers comprising insulating blocks as a main chain and charge transporting blocks as a side chain linked to the main chain, and block/graft copolymers composed of a block copolymer such as an AB-type block copolymer having A and/or B grafted to the side thereof.

FIGS. 14 and 15 show examples of the structures of the charge transporting copolymers of the present invention, but the present invention is not limited to these examples.

TABLE 14

| compound | charge-transport block (A) partial structure | molar ratio | charge-transport block (B) partial structure | molar ratio | type of linkage | composition of block (A/B weight ratio) |
|---|---|---|---|---|---|---|
| CPT-1 | 2 | — | 232 | — | BAB Type | 1/1 |
| CPT-2 | 9 | — | 228 | — | BAB Type | 1/1 |
| CPT-3 | 9 | — | 233 | — | BAB Type | 1/1 |
| CPT-4 | 9 | — | 237 | — | BAB Type | 1/1 |
| CPT-5 | 9 | — | 229/260 | 9/1 | BAB Type | 1/1 |
| CPT-6 | 13 | — | 236 | — | BAB Type | 1/1 |
| CPT-7 | 13 | — | 240 | — | BAB Type | 1/1 |
| CPT-8 | 16 | — | 232 | — | BAB Type | 1/1 |
| CPT-9 | 16 | — | 241 | — | BAB Type | 1/1 |
| CPT-10 | 16 | — | 233/286 | 9/1 | BAB Type | 1/1 |
| CPT-11 | 16 | — | 251 | — | BAB Type | 1/1 |
| CPT-12 | 21 | — | 232 | — | BAB Type | 1/1 |
| CPT-13 | 22 | — | 232 | — | BAB Type | 1/1 |
| CPT-14 | 23 | — | 232 | — | BAB Type | 1/1 |

TABLE 14-continued

| compound | charge-transport block (A) partial structure | charge-transport block (A) molar ratio | charge-transport block (B) partial structure | charge-transport block (B) molar ratio | type of linkage | composition of block (A/B weight ratio) |
|---|---|---|---|---|---|---|
| CPT-15 | 24 | — | 232 | — | BAB Type | 1/1 |
| CPT-16 | 25 | — | 232 | — | BAB Type | 1/1 |
| CPT-17 | 26 | — | 232 | — | AB Type | 1/1 |
| CPT-18 | 30 | — | 241 | — | AB Type | 1/1 |
| CPT-19 | 34 | — | 241 | — | AB Type | 1/1 |
| CPT-20 | 30/34 | 1/1 | 241 | — | AB Type | 1/1 |

TABLE 15

| compound | charge-transport block (A) partial structure | charge-transport block (A) molar ratio | charge-transport block (B) partial structure | charge-transport block (B) molar ratio | type of linkage | composition of block (A/B weight ratio) |
|---|---|---|---|---|---|---|
| CPT-21 | 36 | — | 243 | — | AB Type | 1/1 |
| CPT-22 | 37 | — | 232 | — | BAB Type | 1/1 |
| CPT-23 | 37 | — | 241 | — | BAB Type | 1/1 |
| CPT-24 | 37 | — | 233/286 | 9/1 | BAB Type | 1/1 |
| CPT-25 | 37 | — | 251 | — | BAB Type | 1/1 |
| CPT-26 | 16/37 | 1/1 | 241 | — | BAB Type | 1/1 |
| CPT-27 | 16/37 | 1/1 | 233/234 | 1/1 | BAB Type | 1/1 |
| CPT-28 | 35 | — | 241 | — | BAB Type | 1/1 |
| CPT-29 | 38 | — | 241 | — | BAB Type | 1/1 |
| CPT-30 | 39 | — | 241 | — | BAB Type | 1/1 |
| CPT-31 | 40 | — | 241 | — | BAB Type | 1/1 |
| CPT-32 | 16 | — | 232 | — | BAB Type | 4/1 |
| CPT-33 | 16 | — | 232 | — | BAB Type | 7/3 |
| CPT-34 | 16 | — | 232 | — | BAB Type | 6/4 |
| CPT-35 | 16 | — | 241 | — | BAB Type | 7/3 |
| CPT-36 | 16 | — | 237 | — | AB Type | 1/1 |
| CPT-37 | 16 | — | 239 | — | AB Type | 1/1 |
| CPT-38 | 16 | — | 240 | — | AB Type | 1/1 |
| CPT-39 | 16 | — | 243 | — | AB Type | 1/1 |
| CPT-40 | 16 | — | 236/244 | 7/3 | AB Type | 1/1 |

The copolymer of the present invention can be synthesized by any method selected from those methods for preparing a block copolymer or a graft copolymer which are described in, for example, "Experimental Chemistry Course 28: Synthesis of Polymers", $4^{th}$ edition (Maruzen Ltd., 1992), "Chemistry and Industry of Macromonomers" (IPC, 1990), "Compatibilization of Polymers and Evaluation Techniques" (Association of Technical Information, 1992) and "New Polymeric Materials: One Point 12 Polymer Alloys (Koyritsu Shuppan Co., Ltd., 1988).

Examples of the methods for preparing the copolymers of the present invention include (1) a method wherein a charge transporting polymer and an insulating polymer are synthesized in advance separately, and a desired block copolymer is obtained by linking the foregoing polymers by a reaction between them, (2) a method wherein a desired block copolymer is obtained by a simple polymerization of a mixture of monomers so that a monomer having a higher reactivity is polymerized first and after consumption of thereof a monomer having a lower reactivity is then polymerized if a monomer for charge-transport block and a monomer for insulating block are synthesized by the same polymerization method and if the difference of reactivity between the monomers is significant, and (3) a method wherein in advance a polymer is synthesized from one of the monomers and the synthesis is followed by the introduction into the end and/or side chain of the polymer of a polymerization initiator containing a group capable of starting the polymerization, such as azo, peracid ester, peroxy, dithiocarbamate, alkali metal alcolate and an alkali metal alkyl, and the polymerization of the other monomer is conducted by use of the above-mentioned initiator to produce the desired block copolymer or graft copolymer. Method (3) is preferable, because this method easily provides a di- or tri-block copolymer and a graft copolymer composed of a polycondensation or polyaddition product and an addition or ring-opening polymerization product. Among the initiators, an azo-type initiator is particularly preferable, because this initiator can be handled easily due to its relatively high stability and because this initiator is capable of starting a radical polymerization of a wide range of vinyl monomers.

Other examples are (4) a method wherein a compound containing a plurality of groups capable of initiating polymerization, such as azo, peracid ester and peroxy, is used so that first one monomer is polymerized by use of the first polymer initiator group and the other monomer is polymerized by use of the rest of the polymer initiator group to obtain a desired block copolymer, and (5) a method wherein monomers are successively polymerized by means of a living polymerization process such as a cation living polymerization, an anion living polymerization or a radical living polymerization process. A living polymerization process makes it possible to control easily the molecular weight of each block and to provide a polymer having a narrow molecular weight distribution.

Further, it is possible to obtain a desired block copolymer by (6) a successive polymerization of monomers according to such processes as an immortal polymerization process and an iniferter process. Furthermore, it is also possible to obtain the desired graft copolymer by synthesizing in advance a macromonomer which has another monomer introduced into the end thereof and thereafter polymerizing the macromonomer.

A method for making the above-mentioned three-dimensionally crosslinked charge transporting copolymer comprises the steps of dissolving or suspending a charge transporting copolymer having the above-mentioned reactive substituent in a suitable solvent together if necessary with a curing additive and/or curing catalyst, coating the resultant solution, and heating the coating and/or treating with water the coating. Compounds known as a curing additive can be used, examples thereof including water, a polyvalent alcohol, a polyvalent amine, a polyvalent isocyanate and a polyvalent acid anhydride. Compounds known as a curing catalyst can be used, examples thereof including an acid, a base, a tin compound and a titanium compound.

The molecular weight of the copolymer of the present invention is not limited. However, in order to fully exhibit the properties of a polymer such as film forming capability and flexibility, the weight average molecular weight is preferably 2,000 or more. Although electrical properties set no particular upper limit to the molecular weight, the molecular weight should be generally not greater than 5,000,000 if a film is to be formed by means of a wet-application because the solution needs to have a suitable viscosity.

As is well known in the field of polymer blends and polymer alloys, different polymers are incompatible with each other generally, and accordingly a blend of polymers, a block copolymer and a graft copolymer each have a state of phase separation. In the case of a mere blend, namely, a polymer blend, it is difficult to obtain a homogeneous film in a reproducible way, because the phase separation is in a macro-size scale of several μm or more (macro separation) and the scale of the phase separation significantly varies depending on the film forming conditions and the like. In the case of a block copolymer and a graft copolymer, in each of which the constituent components are linked together by means of a covalent bond, it is possible to obtain a fine and homogeneous state of phase separation (micro phase separation) in a stable way, because the scale of the phase separation is regulated by the length of the block. The scale of phase separation in a block copolymer and a graft copolymer is generally about the average length of blocks and is known to be approximately proportional to a ⅔rd root of the molecular weight.

The block copolymer or the graft copolymer of the present invention is generally in the state of micro separation.

Generally, in the state of phase separation of a phase separated block copolymer or graft copolymer, the most stable structure thermodynamically exists, depending on the kind of constituent blocks, molecular weights of the blocks and the composition ratios of the blocks. In the case of a copolymer composed of A and B blocks, thermodynamically the most stable structure does not depend on the kind of linkage but on the A/B ratio alone in such a way that, as the A/B ratio increases, the structure systematically changes from a structure where A is a spherical domain and B is a matrix, to a structure where A is a rod-like domain and B is a matrix, to a structure composed of A/B alternating layers, to a structure where B is a rod-like domain and A is a matrix, and finally to a structure where B is a spherical domain and A is a matrix.

When forming a film by means of a wet-application process, the state of separation can be controlled arbitrarily by the solvent used, drying speed and the like. For example, even from a copolymer which has a large A/B ratio and therefore should be thermodynamically a structure where B is a spherical domain and A is a matrix, it is possible to obtain a structure where A is a spherical domain and B is a matrix by using a solvent which is a good solvent for A but is a poor solvent for B as a coating solution. A state of phase separation (modulated structure) in a frozen state of a spinodal degradation can be obtained by using a good solvent for both A and B and by rapidly removing the solvent. If a polymer compatible only with B is added to a copolymer which has a large A/B ratio and therefore should be thermodynamically a structure where B is a spherical domain and A is a matrix, the final phase separated structure is in a state where the spheres are composed of A and the matrix is composed of B and a polymer compatible only with B, because the spheres composed of B become larger as the amount added of the polymer increases. In the charge transporting copolymer of the present invention, the larger the molecular weight of the constituent blocks, and the more the solubility parameters of the two blocks differ, the more the degree of phase separation increases. A copolymer, which has a high degree of phase separation and a phase separated structure where the charge transporting phase is a domain and the insulating phase is a matrix, effectively functions as a heterogeneous charge transporting layer of an S-type photoreceptor.

However, the block copolymer or graft copolymer of the present invention is not necessarily limited to a copolymer having a micro phase separation, and some of the copolymers are in a state of compatibility and therefore exhibit no phase separation depending on the combination of the blocks. A copolymer, in which the molecular weights of the blocks are small and/or the difference in the solubility parameters between the blocks is small, is in a state of compatibility and can be used suitably as a material for a homogeneous charge transporting layer of a J-type photoreceptor.

In the copolymer, the ratio between the charge transporting block and the insulating block is not limited, but is preferably in the range of 10:1 to 1:10 and more preferably in the range of 4:1 to 1:4. If the proportion of the charge transporting block exceeds the upper limit, the mechanical properties of the copolymer tend to become inferior, whereas if the proportion of the charge transporting block drops below the lower limit, a sufficient level of charge transporting may not be obtained.

The weight average molecular weight of the blocks and the ratio between the blocks of the copolymer of the present invention can be calculated from the data obtained by GPC and NMR measurements of the copolymer.

Since the novel copolymer of the present invention has a combination of a high charge transporting ability and excellent mechanical properties, the copolymer is applicable to organo-electronic devices, such as an electroluminescence element, a photorefractive element, a light sensor and a photocell, besides a electrophotographic photoreceptor as reported in the preprint 31-p-K-12(1990) of the $36^{th}$ Joint Congress of Applied Physics. For example, when a pigment capable of generating charge is dispersed into a copolymer which has a high level of charge transporting capability and of film forming ability together with a high level of adsorption and adhesion to the pigment, an excellent charge generating layer for a function separated multilayer electrophotographic photoreceptor and an excellent single-layer electrophotographic photoreceptor can be obtained. For example, a copolymer, which has a high level of charge transporting capability and of mechanical strength together with chemical stability, is effective as a material for a homogeneous charge transporting layer or a surface protective layer for a function separated multilayer electrophotographic photoreceptor. Further, a copolymer, which has a high level of charge transporting capability together with phase separation, is effective as a material for a heterogeneous charge transporting layer for an S-type photoreceptor.

The electrophotographic photoreceptor of the present invention is explained below.

The electrophotographic photoreceptor of the present invention comprises an electroconductive substrate and formed thereon a charge generating layer and a heterogeneous charge transporting layer. If necessary, the photoreceptor may further include a subbing layer, a homogeneous charge transporting layer, a protective layer and/or an irregular reflection layer.

Electroconductive substrates known as those for electrophotographic photoreceptor may be used in the present invention and these substrates may be opaque or substantially transparent. Examples of these substrates include a metal, such as aluminum, nickel or stainless steel, plastics, glass or ceramics coated with a thin layer of a material, such as aluminum, titanium, nickel, chromium, stainless steel, gold, platinum, zirconium, vanadium, tinoxide, indium oxide and ITO, and paper, plastics, glass or ceramics coated or impregnated with an agent capable of imparting electrical conduction. The electroconductive substrate may be used in an appropriate shape such as a drum, a sheet, a plate, a belt or the like.

If necessary, the surface of the electroconductive substrate may undergo a variety of processes. For example, a surface oxidizing and chemical process, a coloring process and a surface roughening process by a mechanical means such as sanding or honing of the surface. The oxidizing process or the roughening process of the surface of the substrate by a mechanical means not only roughens the surface of the substrate, but also provides advantages such as the surface shape of the layer to be formed on the roughened surface being controlled, and the generation of an interference fringe which becomes a problem when the light source of exposure is an interference causing light source such as a laser light, and which is produced by the regular reflection at the substrate surface and/or interface between layers being prevented.

The subbing layer, which is optional and is the lowermost layer usually, prevents the injection of charge from the electroconductive substrate into the photoreceptor when the photosensitive layer is charged, and serves as a bonding layer that integrally holds the photosensitive layer and the electroconductive substrate, and, in certain cases prevents the regular reflection which causes the interference fringe. In the electrophotographic photoreceptor of the present invention, one subbing layer or a plurality of subbing layers may be formed.

Known materials may be used for the subbing layer and examples of the materials are resins such as polyethylene resins, acrylic resins, methacrylic resins, polyamide resins, vinyl chloride resins, vinyl acetate resins, phenol resins, urethane resins, polyimide resins, vinylidene chloride resins, polyvinyl acetal resins, polyvinyl alcohol resins, water-soluble polyester resins, alcohol-soluble nylon resins, nitrocellulose, polyacrylic acid and polyacrylamide and copolymers of the foregoing as well as curable organometallic compounds such as zirconium alkoxide compounds, titanium alkoxide compounds and silane coupling agents. In addition, a material, which can transport only a charge having the same polarity as that of the generated charge, can also be used as a material for the subbing layer. These materials may be used alone or in a combination of two or more.

The appropriate thickness of the subbing layer is in the range of 0.01 to 10 $\mu$m, and preferably in the range of 0.05 to 5 $\mu$m. The coating methods for producing the subbing layer include conventional methods such as blade coating, wire-bar coating, spray coating, immersion coating, bead coating, air knife coating, curtain coating and ring coating.

Irrespective of J-shape and S-shape, the charge generating material in the electrophotographic photoreceptor of the present invention may be selected from any materials that can be used as charge generating materials in a multilayer photoreceptor. Examples of these materials include inorganic photoconductive materials, such as amorphous selenium, selenium/tellurium alloys, selenium/arsenic alloys, other selenium compounds and selenium alloys, zinc oxide, titanium oxide, a-Si, and a-SiC, and organic pigments and dyes such as phthalocyanine, squalium, anthoanthrone, perylene, azo, polycyclic quinone, pyrene, pyrylium salts and thiapyrylium salts. These charge generating materials may be used alone or in a combination of two or more.

Phthalocyanine compounds are particularly preferably as a charge generating material in the present invention, because phthalocyanine compounds have an excellent sensitivity to light of 600 to 850 nm which is the range of wavelength generated from LED's and laser diodes now widely used as light sources in digital-system electrophotographic apparatuses. The phthalocyanine compounds which can be used in the present invention include metal-free phthalocyanine, metal-containing phthalocyanine and derivatives thereof. Examples of the central metal of the metal-containing phthalocyanine include Cu, Ni, Zn, Co, Fe, V, Si, Al, Sn, Ge, Ti, In, Ga, Mg, Pb and Li. Oxides, hydroxides, halides, alkylated products and alkoxides of these central metals can also be used. Specific examples include titanyl phthalocyanine, chlorogallium phthalocyanine, hydroxygallium phthalocyanine, vanadyl phthalocyanine, chloroindium phthalocyanine, dichloro-tin phthalocyanine, and dimethoxysilicon phthalocyanine. A substituted phthalocyanine compound, which has a substituent introduced into the phthalocyanine ring thereof, can also be used. Also effective is an azaphthalocyanine in which a carbon atom in the phthalocyanine ring thereof is replaced with an nitrogen atom. As to the morphology of the phthalocyanines amorphous phthalocyanine and all crystalline phthalocyanine can be used in the present invention.

Among these phthalocyanine compounds, because of their particularly excellent sensitivity to light, metal-free phthalocyanine, titanyl phthalocyanine, chlorogallium phthalocyanine, hydroxygallium phthalocyanine and dichloro-tin phthalocyanine are particularly preferable for use in the present invention.

Most phthalocyanine compounds exhibit the property of a p-type semiconductor whose main transport charge is a hole. In contrast with these p-type properties, dichloro-tin phthalocyanine, phthalocyanine having an electron-withdrawing group and aza phthalocyanine are an n-type semiconductor whose main transport charge is an electron. Therefore, if these phthalocyanine compounds are used as a charge generating material in a charge generating layer and this charge generating layer is laminated together with a charge transporting layer to form a photoreceptor, the resultant photoreceptor has an excellent electrophotographic property that, when the photoreceptor is negatively charged, it exhibits high sensitivity, little dark decay and high chargeability, because the injection of positive charge from the electroconductive substrate is inhibited.

Because of their excellent charge generating efficiency, hexagonal selenium, polycyclic quinone pigments, azo pigments and perylene pigments are also preferable as a charge generating material. Since these compounds have sensitivity to light ranging from the ultraviolet region to the visible region, these compounds are particularly suitable as a charge generating material for a short wavelength laser which is currently of interest from the viewpoint of producing a higher quality of image, because the beam diameter of laser light can be made smaller as the wavelength of the laser light becomes shorter.

The charge generating layer can be made by a direct vacuum deposition of the above-mentioned charge generating material or can be made by dispersing or dissolving the charge generating material in a binder resin.

Where a binder resin is used in the charge generating layer, the kind of the binder resin is not particularly limited. Examples of the binder resin which can be used include polyvinyl butyral resins, polyvinyl formal resins, partially modified polyvinyl acetal resins, polycarbonate resins, polyester resins, acrylic resins, polyvinyl chloride resins, polystyrene resins, polyvinyl acetate resins, poly(maleic anhydride) resins, silicone resins, phenol resins and polyvinyl carbazole resins. These binder resins may be any of a homopolymer, a block copolymer, a random copolymer and an alternating copolymer. These binder resins may be used alone or in a combination of two or more.

The weight ratio (volume ratio) between the charge generating material and the binder resin is preferably in the range of 10:1 to 1:10 and more preferably in the range of 3:1 to 1:1. If the ratio of the charge generating material to the binder resin is greater than 10/1, the disadvantage is that the dark decay increases, and the formation of a homogeneous film by a wet-application method is difficult. If the ratio of the charge generating material to the binder resin is smaller than 1/10, the disadvantage are, for example, a decrease in sensitivity and an increase in residual potential.

The appropriate thickness of the charge generating layer in the present invention is generally in the range of 0.05 to 5 μm and the thickness is preferably in the range of 0.1 to 2.0 μm. The coating methods for producing the charge generating layer can be conventional methods as in the case of the subbing layer.

In the present invention, the heterogeneous charge transporting layer comprises a block copolymer or a graft copolymer containing in the repeating unit at least a charge transporting block having a triarylamine structure and an insulating block, wherein the charge transporting block and the insulating block are in a phase-separated state.

The charge transporting block constituting the copolymer of the present invention can be any block if the repeating unit contains a triarylamine structure. However, in view of the mobility of the charge, ease in the injection of the charge, life of the charge, transmissivity of visible light and infrared light, chemical stability and the like, a preferable charge transporting block contains as a repeating unit at least one structure represented by the general formula (1) or (2) where n is 1. $Ar^1$, $Ar^2$, $X^1$, $X^2$, $X^3$, $L^1$, m and $L^2$ are as defined previously and the preferable examples are also given previously. In the repeating unit represented by the general formula (2), $Ar^3$ and $Ar^4$ are each preferably a $C_{(6-18)}$ substituted or unsubstituted aryl group.

In the present invention, since the charge mobility of the charge transporting block is a factor governing the response speed of the electrophotographic photoreceptor, a charge transporting block exhibiting a higher level of charge mobility is more suitable for use in a high-speed electrophotographic apparatus. In the electrophotographic apparatus of the present invention, the charge mobility of the charge transporting block is preferably $10^{-6}$ cm$^2$/Vs or greater, more preferably $5\times10^{-6}$ cm$^2$/Vs or greater, in an electric field having a strength of $1\times10^5$ V/cm.

Since it is difficult to measure directly the charge mobility of the charge transporting block, the charge mobility of a charge transporting polymer, which has the same structure as that of the charge transporting block is used as a substitute for the charge mobility of the charge transporting block. The mobility can be measured by a Time-of-Flight method.

The insulating block of the present invention can be any block only if the block is electrically inert to the main charge to be transported.

Examples of the insulating block in the present invention include block copolymers, graft copolymers, random copolymers and alternating copolymers such as polyvinyl acetal, polyalkyl methacrylate, polyalkyl acrylate, polyvinyl chloride, polystyrene, polyvinyl acetate, polyalkyl vinyl ether, polycarbonate, polyester and polysiloxane. Among them, a vinyl polymer is preferable. However, in view of mechanical strength, flexibility, transmissivity of visible light and infrared light, chemical stability, insulation properties and the like, a particularly preferable insulating block is a polymer which contains as a repeating unit at least one structure represented by the general formula (3).

In the general formula (3), $R^1$ to $R^3$ are as previously defined and preferable examples are given previously. $R^4$ is preferably selected from the group consisting of a substituted or unsubstituted alkyl, a substituted or unsubstituted aryl, a substituted or unsubstituted alkoxy, a substituted or unsubstituted acyl, a substituted or unsubstituted acyloxy, and a substituted or unsubstituted alkoxycarbonyl group. The number of carbon atoms of the alkyl group, alkoxy group, acyl group, acyloxy, or alkoxycarbonyl group is preferably 1 to 21, while the number of carbon atoms of the aryl group is preferably 6 to 16. Specific examples include a phenyl group, a naphthyl group, a pyrenyl group, and the like. Examples of the substituent include a halogen atom, a phenyl group, a hydroxyl group, an amino group, an isocyanate group, an epoxy group, and an alkoxysilyl group, and the like.

Among the structures represented by the general formula (3), the most preferable structure is represented by the following formula (4).

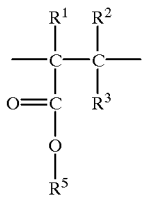

General Formula (4)

In the general formula (4), $R^1$ to $R^3$ are the same as those defined for $R^1$ to $R^3$ in the general formula (3). $R^5$ is selected from a substituted or unsubstituted alkyl group or a substituted or unsubstituted aryl group. Preferably, $R^5$ is selected from substituted or unsubstituted $C_{(1-20)}$ alkyl group or a substituted or unsubstituted $C_{(6-16)}$ aryl group. Examples of these groups include methyl, ethyl, propyl, isopropyl, butyl, isobutyl, tert-butyl, hexyl, cyclohexyl, octyl, decyl, dodecyl, benzyl, hydroxyethyl, (trimethoxysilyl)propyl, chloromethyl, phenyl, tolyl, and the like.

Examples of the partial structures represented by the general formula (4) are as follows.

TABLE 16

| | general formula (4) | | | |
|---|---|---|---|---|
| * | $R^1$ | $R^2$ | $R^3$ | $R^5$ |
| 287 | methyl | H | H | methyl |
| 288 | methyl | H | H | ethyl |
| 289 | methyl | H | H | propyl |
| 290 | methyl | H | H | isopropyl |
| 291 | methyl | H | H | butyl |
| 292 | methyl | H | H | isobutyl |
| 293 | methyl | H | H | tert-butyl |
| 294 | methyl | H | H | pentyl |
| 295 | methyl | H | H | hexyl |
| 296 | methyl | H | H | cyclohexyl |
| 297 | methyl | H | H | heptyl |
| 298 | methyl | H | H | octyl |
| 299 | methyl | H | H | decyl |
| 300 | methyl | H | H | dodecyl |
| 301 | methyl | H | H | eicosyl |
| 302 | methyl | H | H | phenyl |
| 303 | methyl | H | H | benzyl |
| 304 | methyl | H | H | 3-(trimethoxysilyl)propyl |
| 305 | methyl | H | H | 2-hydroxyethyl |
| 306 | methyl | H | H | 3,4-epoxybutyl |
| 307 | H | H | H | butyl |

TABLE 16-continued general formula (4)

| * | $R^1$ | $R^2$ | $R^3$ | $R^5$ |
|---|---|---|---|---|
| 308 | ethyl | H | H | butyl |
| 309 | F | H | H | butyl |
| 310 | Cl | H | H | butyl |
| 311 | F | H | H | butyl |
| 312 | Cl | Cl | H | butyl |
| 313 | F | F | F | butyl |
| 314 | Cl | Cl | Cl | butyl |
| 315 | phenyl | H | H | butyl |
| 316 | methyl | methyl | methyl | butyl | note: * = partial structural formula

In the present invention, from the viewpoint of ease of transporting the charge, it is preferable that the polarity of the insulating block be low. The factor, which governs the polarity of the insulating block, is the polarity of the repeating unit. In the case of a vinyl polymer, the dipole moment of the hydrogen adduct of the vinyl group of the constituent vinyl monomer can be a substitute. The value of the dipole moment is preferably 2D or less, more preferably 1.5D or less, and most preferably 1D or less. The dipole moment can be measured by a method described in, for example, "Chemical Handbook, basics" (edited by Chem. Soc. of Japan, Maruzen Ltd., 1993). The dipole moment can also be calculated by a molecular orbital method, a molecular force field and the like. Alternatively, the listed values in, for example, "Solvent Handbook" (Ed. S. Asahara et al., Kodansha Ltd., 1976) can also be used. For example, according to the Solvent Handbook, the dipole moment of ethylbenzene, which is the hydrogen adduct of a styrene monomer, is 0.35D, the dipole moment of 2-methylbutane, which is the hydrogen adduct of a 2-methylbutene, is 0.0D, the dipole moment of diethyl ether, which is the hydrogen adduct of vinyl ethyl ether, is 1.2D, the dipole moment of methyl propionate, which is the hydrogen adduct of methyl acrylate, is 1.73D, the dipole moment of ethyl acetate, which is the hydrogen adduct of vinyl acetate, is 1.88D, and the dipole moment of chloroethane, which is the hydrogen adduct of vinyl chloride, is 1.96D.

An insulating block having a structure made up of the general formula (3), where $R^1$ to $R^3$ are a hydrogen atom or an alkyl group, and $R^4$ is selected from an alky, aryl, aryl-substituted alkyl, or an alkyl-substituted aryl group, is particularly preferable, because the hydrogen adduct of the corresponding vinyl monomer has a dipole moment of ID or less.

The volume resistivity of the insulating block of the present invention is preferably $10^{12}$Ω·cm or greater, and more preferably $10^{14}$Ω·cm or greater. If the volume resistivity is smaller than this value, the electrical insulation of the electrically inert matrix is impaired, and the S-type property will be lost and the dark decay will increase.

In view of durability, mechanical strength, flexibility and chemical stability, the glass transition temperature of the insulating block is preferably 30° C. or higher, more preferably 60° C. or higher, and most preferably 90° C. or higher.

In the block copolymer or the graft copolymer of the present invention, the constituent blocks may be formed by any form of linkage.

The weight average molecular weight of the charge transporting block and the weight average molecular weight of the insulating block of the present invention are each preferably 2,000 or more.

In order to exhibit an S-type photo-induced potential attenuation characteristic, the above-mentioned blocks are required to be in a state of phase separation and preferably in a state of a minute phase separation of submicron order.

In the heterogeneous charge transporting layer of the block copolymer or the graft copolymer of the present invention, the phase separation may take any structure where the domain is composed of the charge transporting block and the matrix is composed of the insulating block. However, in order to obtain a satisfactory S-type photo-induced potential attenuation characteristic, a preferable phase separation structure is a structure where the phase composed of the charge transporting block is an island and the phase composed of the insulating block is a sea. A modulated structure obtained by spinodal degradation also provides a preferable S-type property. The S-type property is also exhibited as long as the domain composed of the insulating block takes a form capable of creating the aforementioned structural trap, even in the structure where the charge transporting block is a matrix and the insulating block is domain. Further, in the case where the charge transporting block is crystalline and the insulating block is amorphous, the S-type property is also obtained, because a phase separated structure is obtained in which the fine crystals of the charge transporting block form domains in the matrix composed of the insulating block.

In the heterogeneous charge transporting layer, the formation of a helical charge transporting pathway depends on the probability of contact between charge transporting domains themselves. If the probability of contact is too high, the S-shape is impaired because the charge transporting pathway is not helical, whereas, if the probability of contact is too low, the residual potential increases because the formation of charge transporting pathway which extends continuously through the whole charge transporting layer is impossible. The contact between the charge transporting domains themselves is not always required to be direct, and a very thin insulating layer may be present between the charge transporting domains, only if the charge can pass through the gap and the entrapment of the charge in the gap is negligible. As used herein, a helical charge transporting pathway means a charge transporting pathway which is formed in such a manner that the movement of charge is reversed one or more times in the direction of the thickness. The average particle diameter of the charge transporting domains is in the range of 0.005 to 3 µm, more preferably in the range of 0.01 to 1 µm, and most preferably in the range of 0.02 to 0.5 µm.

If the average particle diameter in the charge transporting domains is greater than 3µm, the probability of forming a heterogeneous structure of the charge transporting pathway required for the formation of S-shape within a preferable range of film thickness is lowered, and therefore the S-type property is reduced. On the other hand, if the average particle diameter in the charge transporting domains is smaller than 0.005 µm, the charge transporting pathway approaches a homogeneous structure and therefore the S-type property diminishes.

In the block copolymer or graft copolymer to be used in the present invention, the composition ratio of the charge transporting block to the insulating block can be expressed in the volume ratio of the charge transporting domain to the electrically inert domain matrix in a resultant phase separated structure. In the present invention, the above-mentioned volume ratio may be arbitrarily set within the range of 10/1 to 1/10. A more preferable volume ratio of the charge transporting domain to the electrically inert matrix is in the range of 4/1 to 1/2. If the volume ratio of the charge transporting domain to the electrically inert matrix exceeds 10/1, the S-type property is likely to be lost, because a charge transporting pathway having a substantially homogeneous structure is formed due to intimate contact between the charge transporting domains and the formation of a matrix of the charge transporting blocks, thereby leading to the disappearance of the S-type property due to loss of the heterogeneity in structure which is indispensable for the creation of the S-type photo-induced potential attenuation characteristic. On the other hand, if the volume ratio of the charge transporting domain to the electrically inert matrix is less than 1/10, the charge transporting pathway is severed, thereby leading to an increase in the residual potential and a decrease in the speed of response.

The weight average molecular weight of the copolymer of the present invention is not limited. However, in order to fully exhibit the properties of a polymer, the weight average molecular weight is preferably 4,000 or more. Although electrical properties set no particular upper limit to the weight average molecular weight, the molecular weight should be generally not greater than 10,000,000 if a film is to be made by means of a wet-application because the solution needs to have a suitable viscosity.

Examples of the block copolymers that can be used in the present invention are given below.

TABLE 17

| compound | charge-transport block (A) partial structure | charge-transport block (A) molar ratio | charge-transport block (B) partial structure | charge-transport block (B) molar ratio | type of linkage | composition of block (A/B weight ratio) |
| --- | --- | --- | --- | --- | --- | --- |
| CTP-1 | 2 | — | 291 | — | BAB Type | 1/1 |
| CTP-2 | 9 | — | 287 | — | BAB Type | 1/1 |
| CTP-3 | 9 | — | 292 | — | BAB Type | 1/1 |
| CTP-4 | 9 | — | 296 | — | BAB Type | 1/1 |
| CTP-5 | 9 | — | 288/306 | 9/1 | BAB Type | 1/1 |
| CTP-6 | 13 | — | 295 | — | BAB Type | 1/1 |
| CTP-7 | 13 | — | 299 | — | BAB Type | 1/1 |
| CTP-8 | 16 | — | 291 | — | BAB Type | 1/1 |
| CTP-9 | 16 | — | 300 | — | BAB Type | 1/1 |
| CTP-10 | 16 | — | 292/304 | 9/1 | BAB Type | 1/1 |
| CTP-11 | 16 | — | 313 | — | BAB Type | 1/1 |
| CTP-12 | 21 | — | 291 | — | BAB Type | 1/1 |
| CTP-13 | 22 | — | 291 | — | BAB Type | 1/1 |
| CTP-14 | 23 | — | 291 | — | BAB Type | 1/1 |
| CTP-15 | 24 | — | 291 | — | BAB Type | 1/1 |
| CTP-16 | 25 | — | 291 | — | BAB Type | 1/1 |
| CTP-17 | 26 | — | 291 | — | BAB Type | 1/1 |
| CTP-18 | 30 | — | 300 | — | AB Type | 1/1 |
| CTP-19 | 34 | — | 300 | — | AB Type | 1/1 |
| CTP-20 | 30/34 | 1/1 | 300 | — | AB Type | 1/1 |

TABLE 18

| compound | charge-transport block (A) partial structure | charge-transport block (A) molar ratio | charge-transport block (B) partial structure | charge-transport block (B) molar ratio | type of linkage | composition of block (A/B weight ratio) |
| --- | --- | --- | --- | --- | --- | --- |
| CTP-21 | 36 | — | 302 | — | AB Type | 1/1 |
| CTP-22 | 37 | — | 291 | — | BAB Type | 1/1 |

TABLE 18-continued

| compound | charge-transport block (A) partial structure | charge-transport block (A) molar ratio | charge-transport block (B) partial structure | charge-transport block (B) molar ratio | type of linkage | composition of block (A/B weight ratio) |
| --- | --- | --- | --- | --- | --- | --- |
| CTP-23 | 37 | — | 300 | — | BAB Type | 1/1 |
| CTP-24 | 37 | — | 292/304 | 9/1 | BAB Type | 1/1 |
| CTP-25 | 37 | — | 313 | — | BAB Type | 1/1 |
| CTP-26 | 16/37 | 1/1 | 300 | — | BAB Type | 1/1 |
| CTP-27 | 16/37 | 1/1 | 292/293 | 1/1 | BAB Type | 1/1 |
| CTP-28 | 35 | — | 300 | — | BAB Type | 1/1 |
| CTP-29 | 38 | — | 300 | — | BAB Type | 1/1 |
| CTP-30 | 39 | — | 300 | — | BAB Type | 1/1 |
| CTP-31 | 40 | — | 300 | — | BAB Type | 1/1 |
| CTP-32 | 16 | — | 291 | — | BAB Type | 4/1 |
| CTP-33 | 16 | — | 291 | — | BAB Type | 7/3 |
| CTP-34 | 16 | — | 291 | — | BAB Type | 6/4 |
| CTP-35 | 16 | — | 300 | — | BAB Type | 7/3 |
| CTP-36 | 16 | — | 296 | — | AB Type | 1/1 |
| CTP-37 | 16 | — | 298 | — | AB Type | 1/1 |
| CTP-38 | 16 | — | 299 | — | AB Type | 1/1 |
| CTP-39 | 16 | — | 302 | — | AB Type | 1/1 |
| CTP-40 | 16 | 1/1 | 259/303 | 7/3 | AB Type | 1/1 |

The copolymer of the present invention can be synthesized by any method selected from those methods for preparing a block copolymer or a graft copolymer which are described in aforementioned references such as "Experimental Chemistry Course 28: Synthesis of Polymers", $4^{th}$ edition (Maruzen Ltd., 1992) as well as by the aforementioned methods (1) to (6).

By an alloying method, characterized by the introduction of a charge transporting block highly capable of transporting charge and an insulating block, the copolymer of the present invention as described above makes it possible to control various properties, such as mechanical strength, glass transition temperature, degree of crystallization, refractive index, adhesion, adsorption, flexibility, solubility, fusibility and phase separation, without impairing the charge transporting function. An even better functioning material can be obtained if a component having another desired property is introduced by way of copolymerization.

The heterogeneous charge transporting layer may contain a compound capable of transporting only a charge whose polarity is opposite to that of the main charge to be transported. The addition of this compound brings about advantages such as a reduction in the residual potential and stability in repeated use.

The heterogeneous charge transporting layer may also contain a charge transporting polymer and/or an insulating polymer. The charge transporting polymer which is added preferably has compatibility with the charge transporting block of the block copolymer or graft copolymer of the present invention. Further, the insulating polymer which is added preferably has compatibility with the insulating block of the block copolymer or graft copolymer of the present invention.

When coating the heterogeneous charge transporting layer, a conventionally employed coating method previously described as a coating method for a subbing layer may also be used. Further, a homogeneous solution or a micell solution can be used as a coating liquid.

The appropriate thickness of the heterogeneous charge transporting layer containing the block copolymer or graft copolymer is in the range of 0.1 to 50 $\mu$m, and the thickness is preferably in the range of 0.2 to 15 μm, more preferably in the range of 0.5 to 5 μm. If the thickness of the heterogeneous charge transporting layer is less than 0.15 μm, the S-type property tends to diminish. The upper limit depends on the charge transporting capability of the heterogeneous charge transporting layer employed and is determined so that the response speed, residual potential and the like fall within an allowable range.

The homogeneous charge transporting layer, which is optional, maybe selected from any used as a charge transporting layer designed for a J-type multilayer photoreceptor. For example, a film in the form of a solid solution can be used which is produced by a procedure comprising dispersing a single compound or a mixture of two or more compounds, which are selected from the group consisting of a benzidine compound, an amine compound, a hydrazone compound, a stilbene compound and a carbazole compound, uniformly in an insulating resin selected from, for example, a group consisting of polycarbonates, polyarylates, polyesters, polysulfones and polymethyl methacrylates, in a state of molecular dispersion. Further, it is also possible to use a polymeric compound which itself is capable of transporting charge as a homogeneous charge transporting layer. Examples of this compound include a polymeric compound such as polyvinyl carbazole having a side chain containing a group capable of transporting charge, a polymeric compound having a main chain containing a group capable of transporting charge as described in, for example, JP-A No. 5-232,727, and polysilanes. Also, it is possible to use as a homogeneous charge transporting layer an inorganic material capable of transporting charge, such as amorphous selenium, a-Si and a-SiC. The homogeneous charge transporting layer may be single-layered or multilayered.

Particularly in view of the advantages pertaining to production, a charge transporting polymeric compound is preferably used for the homogeneous charge transporting layer in the electrophotographic photoreceptor of the present invention. This is because, when forming a film by laminating a heterogeneous charge transporting layer and a homogeneous charge transporting layer, if a charge transporting compound having a low molecular weight is used in the homogeneous charge transporting layer, the charge transporting compound having a low molecular weight mixes into the heterogeneous charge transporting layer and causes damage such as the S-type property diminishing because the insulating property against the main charge of the electrically inert matrix in the heterogeneous charge transporting layer decreases, or the charge transporting compound having a low molecular weight, which mixes into the heterogeneous charge transporting layer, serving as a charge trap in the heterogeneous charge transporting layer thereby leading to an increase in the residual potential, or decreases in the charge transporting function and decreases in the sensitivity to light. These problems are conspicuous particularly when the layers are formed by a wet-application method. of course, these problems can be avoided by selecting a solvent for the formation of the upper layer that does not easily dissolve or swell the underlying layer, or by giving crosslinking curing properties to the heterogeneous charge transporting layer in order that the solvent for the upper layer may not dissolve or swell the underlying heterogeneous charge transporting layer and the like. However, it is generally known that polymers are incompatible with each other and cause phase separation. Therefore, if a charge transporting polymer is used in the homogeneous charge transporting layer, the homogeneous charge transporting polymer is not compatible with a resin of the heterogeneous charge transporting layer and phase-separation occurs. Consequently, the above-mentioned problem of mixing rarely occurs, which brings about the advantage that the limitation on selecting materials and manufacturing methods is lifted.

A charge transporting resin, which is composed of a repeating unit having at least one structure represented by the general formula (1) or (2), is preferable as a charge transporting polymeric compound for use in the homogeneous charge transporting layer, because this charge transporting resin has both a high charge transporting capability and excellent mechanical properties. It is preferable that the homogeneous charge transporting layer contain a charge transporting polymer having the same structure as that of the charge transporting block of a block or graft copolymer used in the heterogeneous charge transporting layer, because this combination of structures enables a very smooth injection of charge from the heterogeneous charge transporting layer into the homogeneous charge transporting layer.

Meanwhile, the homogeneous charge transporting layer may include an electrically inert region which is surrounded by a charge transporting matrix. For example, the homogeneous charge transporting layer may contain insulating particles having a low surface energy for the purpose of reducing the surface-friction force, reducing wear, or reducing adhesion of foreign matters on the surface. Further, the homogeneous charge transporting layer may contain charge transporting particles for the purpose of enhancing the charge transporting capability.

In the structure where a homogeneous charge transporting layer is the uppermost layer, from the viewpoint of mechanical strength, the homogeneous charge transporting layer preferably employs a material which cures by means of crosslinking.

Examples of the above-mentioned homogeneous charge transporting layer employing a material which cures by means of crosslinking include: a homogeneous charge transporting layer produced by a procedure comprising the steps of forming a layer composed singly of a charge transporting polymer having a curable group at the end and/or side of the polymer, or a layer composed of a mixture of the foregoing polymer and a curing agent and/or a curing catalyst and thereafter curing the layer by a curing-promoting means such as heating; a homogeneous charge transporting layer produced by a procedure comprising the steps of forming a layer composed of a mixture of a low-molecular-weight charge transporting compound having a curable group and a binder polymer having a curable group at the end and/or side of the polymer or a layer composed of the foregoing mixture together with a curing agent and/or a curing catalyst and thereafter curing the layer by a curing-promoting means such as heating; and a homogeneous charge transporting layer produced by a procedure comprising the steps of forming a layer composed singly of a low-molecular-weight charge-transport compound having a curable group or a layer composed of the foregoing compound together with a curing agent and/or a curing catalyst and thereafter curing the layer by a curing-promoting means such as heating.

Also employable is a procedure comprising the steps of forming a layer without using a curing agent and a curing catalyst, and then impregnating the whole or surface of the layer with the curing agent and/or the curing catalyst and thereafter curing the layer by using a curing-promoting means such as heating, if necessary.

An example of a low-molecular-weight charge transporting compound having a curable group is represented by the following general formula (5):

$$F-(J_p-G)_r$$ General Formula (5)

where F represents an organic group which has a charge transporting activity and a valency of r and which preferably has a skeleton composed of a structure selected from the group consisting of oxadiazole, triarylmethane, triarylamine, carbazole, benzidine, stilbene, hydrazone, anthracene and butadiene. J is a divalent hydrocarbon or heteroatom-containing hydrocarbon group, and is preferably a $C_{(1-15)}$ hydrocarbon group or a $C_{(1-15)}$ heteroatom-containing hydrocarbon group wherein no hydrogen atom is linked directly to the heteroatom. The group represented by G is not particularly limited in so far as it exhibits a crosslinking reactivity by itself or by the addition thereto of a hardener. Examples of G include vinyl, hydroxyl, mercapto, nitrile, carboxyl, halogenated carbonyl, halogenated sulfonyl, isocyanate and amino groups as well as a group containing a titanium atom to which an alkoxy group is directly linked, a group containing a titanium atom to which an alkoxy group is directly linked, a group containing a zirconium atom to which an alkoxy group is directly linked, a group containing an aluminum atom to which an alkoxy group is directly linked, and an alkoxysilyl group. p represents 0 or 1, and r represents an integer of 1 to 6.

Among the compounds represented by the general formula (5), the compounds represented by the general formula (6) are particularly preferable from the viewpoint of charge transporting capability, mechanical strength and the like.

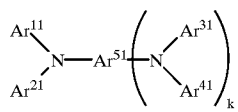

General Formula (6)

In the general formula (6), $Ar^{11}$ to $Ar^{41}$ each independently represent a substituted or unsubstituted aryl group, $Ar^{51}$ represents a divalent hydrocarbon or heteroatom-containing hydrocarbon group having an aromatic ring structure, and k represents 0 or 1. It is necessary that 1 to 4 groups out of $Ar^{11}$ to $Ar^{41}$ have a curable substituent represented by $-T-SiR^{11}{}_{(3-a)}(OR^{21})_a$, where $R^{11}$ represents a hydrogen atom, a halogen atom, a substituted or unsubstituted alkyl group, or a substituted or unsubstituted aryl group, and $R^{21}$ represents a hydrogen atom, an alkyl group, an aryl group, or a trialkylsilyl group, and a represents an integer of 1 to 3, and T represents a divalent hydrocarbon or heteroatom-containing hydrocarbon group.

From the viewpoint of stability to changes in humidity, it is preferable that T have no hydrogen atom linked directly to a heteroatom.

Examples of $Ar^{11}$ to $Ar^{41}$ and examples of $Ar^{51}$ where k is 0 include the following groups.

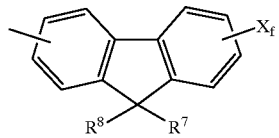

-continued

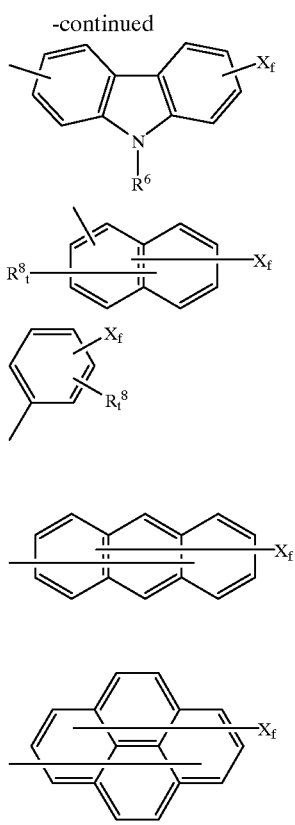

Examples of $Ar^{51}$ where k is 1 include the following groups.

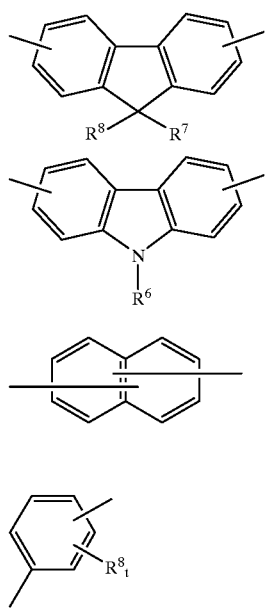

-continued

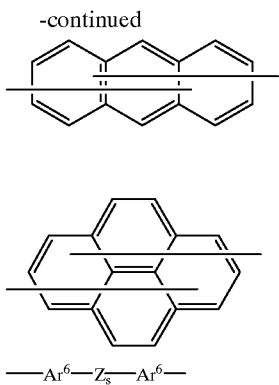

—Ar⁶—Z_s—Ar⁶— where —X is —T—SiR¹¹_(3-a)(OR²¹)_a. Examples of T include the following groups.

—(C_xH_{2x})—

—(C_{x'}H_{2x'-2})—

—(C_{x''}H_{2x''-4})—

—(C_yH_{2y})-J'-(C_zH_{2z})—

Examples of J' include the following groups.

—O—  —S—  —COO—  —N=CH—

—S—S—  —CH=CH—  —OCON(R⁶)—

—OCOO—  —N(R⁶)CON(R⁷)—  —CON(R⁶)—

—CH₂—

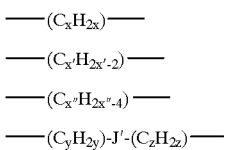

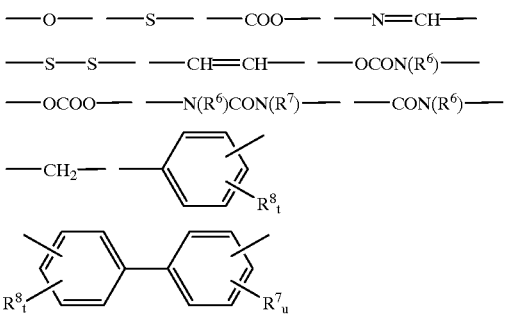

Ar⁶⁻ is selected from the following.

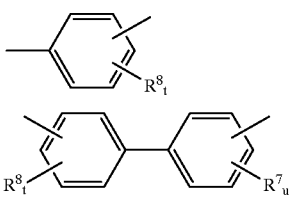

Z is selected from the following.

—O—  —S—  —CH₂—  —C(CH₃)₂—

—C(CF₃)₂—  —Si(CH₃)₂—

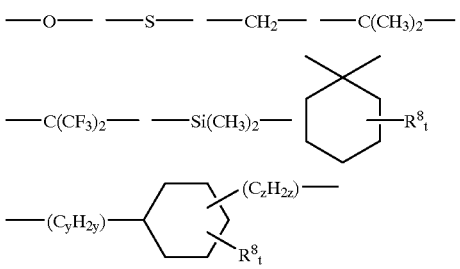

-continued

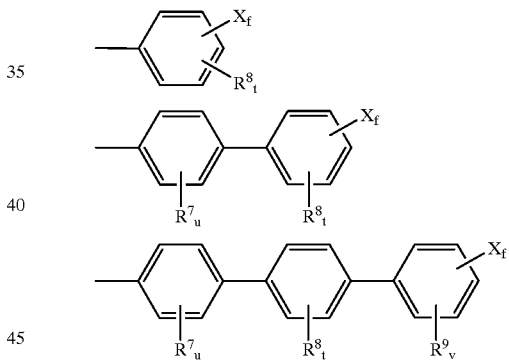

$R^6$ is selected from the group consisting of a $C_{(1-4)}$ alkyl group, a phenyl group, a phenyl group substituted with a $C_{(1-4)}$ alkyl or a $C_{(1-4)}$ alkoxy group and a $C_{(7-10)}$ aralkyl group. $R^7$ to $R^9$ are each selected independently from the group consisting of a hydrogen atom, a $C_{(1-4)}$ alkyl group, a $C_{(1-4)}$ alkoxy group, a phenyl group, a phenyl group substituted with a $C_{(1-4)}$ alkyl or $C_{(1-4)}$ alkoxy group, and a halogen atom. s is 0 or 1; w and f are an integer of 0 to 3; t, u and v are an integer of 0 to 4; x is an integer of 1 to 15; x' and x'' are an integer of 2 to 15; and y and z are an integer of 0 to 15.

It is particularly preferable that at least one group selected from $Ar^{11}$ to $Ar^{51}$ have a structure composed of two or more conjugated aromatic rings from the viewpoint of chemical stability such as resistance to oxidation. Further, from the viewpoint of enhanced charge mobility, it is particularly preferable that $Ar^{51}$ be selected from the following.

if k is 0

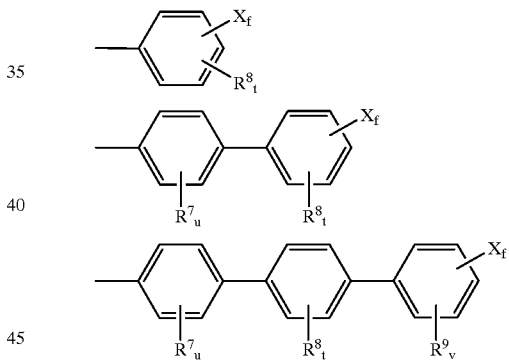

if k is 1

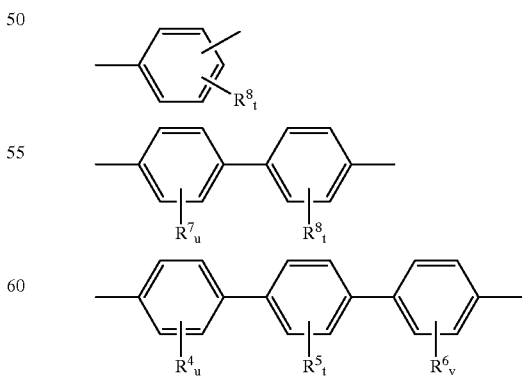

Tables 19 to 42 show the examples of the compounds represented by the general formula (6).

TABLE 19
| compound | k | Ar¹¹ | Ar²¹ | Ar³¹ | Ar⁴¹ | Ar⁵¹ | X |
|---|---|---|---|---|---|---|---|
| 1 | 0 | 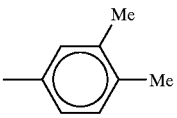 | 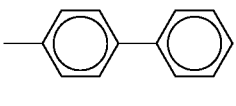 | — | — | 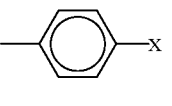 | —CH=N—CH₂—Si(OMe)₂Me |
| 2 | 0 | 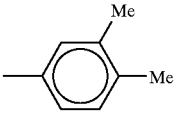 | 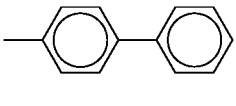 | — | — | 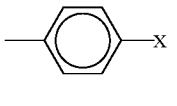 | —CH=N—(CH₂)₃—Si(OMe)₃ |
| 3 | 0 | 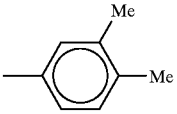 | 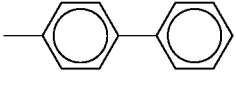 | — | — | 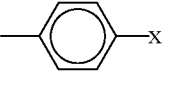 | —CH=N—(CH₂)₃—Si(OEt)₃ |
| 4 | 0 | 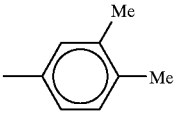 | 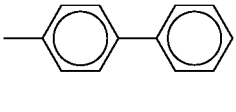 | — | — | 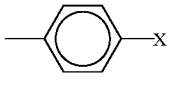 | —CH=N—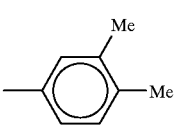(CH₂)₂—Si(OMe)₃ |
| 5 | 0 | 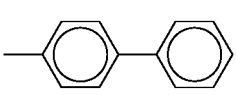 | 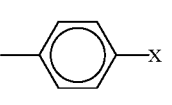 | — | — | 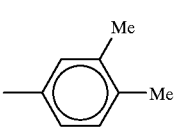 | —CH=N—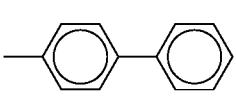—Si(OMe)₃ |
| 6 | 0 | 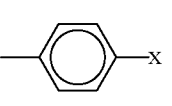 | 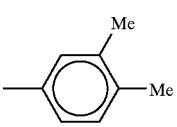 | — | — | 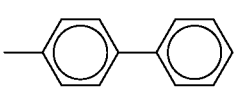 | —O—(CH₂)₃—Si(OMe)₃ |
| 7 | 0 | 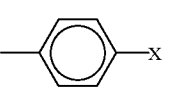 | 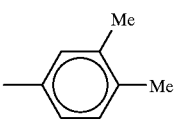 | — | — | 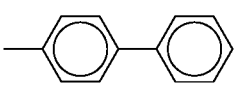 | —O—(CH₂)₃—SiMe(OMe)₂ |
| 8 | 0 | 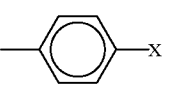 | 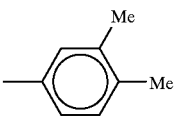 | — | — | 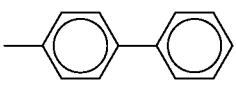 | —O—(CH₂)₃—Si(OEt)₃ |
| 9 | 0 | 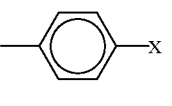 | 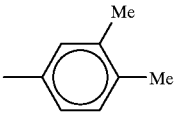 | — | — | 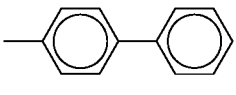 | —CH₂—O—(CH₂)₃—Si(OMe)₃ |
| 10 | 0 | 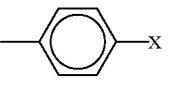 | | — | — | | —(CH₂)₃O—(CH₂)₃—Si(OMe)₃ |

TABLE 20

| compound | k | Ar¹¹ | Ar²¹ | Ar³¹ | Ar⁴¹ | Ar⁵¹ | X |
|---|---|---|---|---|---|---|---|
| 11 | 0 | 2,4-dimethylphenyl | 2,4-dimethylphenyl | — | — | biphenyl-X | —COO—(CH$_2$)$_3$—Si(OMe)$_3$ |
| 12 | 0 | 2,4-dimethylphenyl | 2,4-dimethylphenyl | — | — | biphenyl-X | —CH$_2$—COO—(CH$_2$)$_3$—Si(OMe)$_3$ |
| 13 | 0 | 2,4-dimethylphenyl | 2,4-dimethylphenyl | — | — | biphenyl-X | —(CH$_2$)$_2$—COO—(CH$_2$)$_3$Si(OMe)$_3$ |
| 14 | 0 | 2,4-dimethylphenyl | phenyl | — | — | biphenyl-X | —COO—(CH$_2$)$_3$—Si(OMe)$_3$ |
| 15 | 0 | 2,4-dimethylphenyl | phenyl | — | — | biphenyl-X | —CH$_2$—COO—(CH$_2$)$_3$—Si(OMe)$_3$ |
| 16 | 0 | 2,4-dimethylphenyl | phenyl | — | — | biphenyl-X | —(CH$_2$)$_2$—COO—(CH$_2$)$_3$—Si(OMe)$_3$ |
| 17 | 0 | 4-methylphenyl | 4-methylphenyl | — | — | biphenyl-X | —COO—(CH$_2$)$_3$—Si(OMe)$_3$ |
| 18 | 0 | 4-methylphenyl | 4-methylphenyl | — | — | biphenyl-X | —CH$_2$—COO—(CH$_2$)$_3$—Si(OMe)$_3$ |
| 19 | 0 | 4-methylphenyl | 4-methylphenyl | — | — | biphenyl-X | —(CH$_2$)$_2$—COO—(CH$_2$)$_3$—Si(OMe)$_3$ |

TABLE 21

| compound | k | Ar¹¹ | Ar²¹ | Ar³¹ | Ar⁴¹ | Ar⁵¹ | X |
|---|---|---|---|---|---|---|---|
| 20 | 0 | 4-methylphenyl | 4-methylphenyl | — | — | phenyl-X | —COO—(CH$_2$)$_3$—Si(OMe)$_3$ |
| 21 | 0 | 4-methylphenyl | 4-methylphenyl | — | — | phenyl-X | —COO—CH$_2$—C$_6$H$_4$—Si(OMe)$_3$ |

TABLE 21-continued
| compound | k | Ar¹¹ | Ar²¹ | Ar³¹ | Ar⁴¹ | Ar⁵¹ | X |
|---|---|---|---|---|---|---|---|
| 22 | 0 | 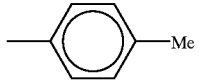 |  | — | — | 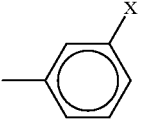 | —COO—CH₂C₆H₄—(CH₂)₂—Si(OMe)₃ |
| 23 | 0 |  |  | — | — | 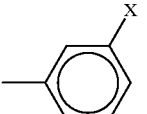 | —CH₂—COO—(CH₂)₃—Si(OMe)₃ |
| 24 | 0 |  |  | — | — | 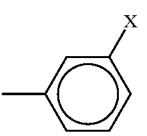 | —CH₂—COO—CH₂—C₆H₄—Si(OMe)₃ |
| 25 | 0 | 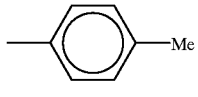 |  | — | — | 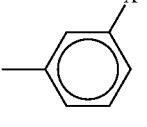 | —CH₂—COO—CH₂C₆H₄—(CH₂)₂—Si(OMe)₃ |
| 26 | 0 |  |  | — | — | 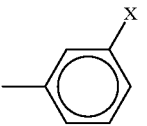 | —(CH₂)₂—COO—(CH₂)₃—Si(OMe)₃ |
| 27 | 0 | 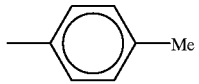 |  | — | — | 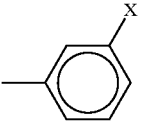 | —(CH₂)₂—COO—CH₂C₆H₄—Si(OMe)₃ |
| 28 | 0 |  |  | — | — | 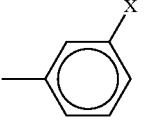 | —(CH₂)₂—COO—CH₂C₆H₄—(CH₂)₂—Si(OMe)₃ |
TABLE 22
| compound | k | Ar¹¹ | Ar²¹ | Ar³¹ | Ar⁴¹ | Ar⁵¹ | X |
|---|---|---|---|---|---|---|---|
| 29 | 0 | 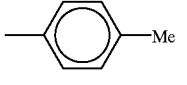 | 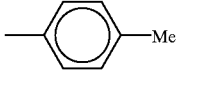 | — | — | 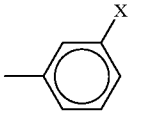 | —COO—(CH₂)₃—Si(OMe)₃ |
| 30 | 0 | 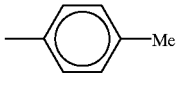 | 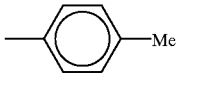 | — | — | 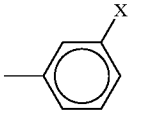 | —COO—CH₂C₆H₄—(CH₂)₂—Si(OMe)₃ |

TABLE 22-continued

| compound | k | Ar¹¹ | Ar²¹ | Ar³¹ | Ar⁴¹ | Ar⁵¹ | X |
|---|---|---|---|---|---|---|---|
| 31 | 0 | —C₆H₄—Me (para) | —C₆H₄—Me (para) | — | — | —C₆H₄—X (meta, with Me) | —(CH₂)₂—COO—(CH₂)₃—Si(OMe)₃ |
| 32 | 0 | —C₆H₄—Me (para) | —C₆H₄—Me (para) | — | — | —C₆H₄—X (meta, with Me) | —(CH₂)₂—COO—CH₂C₆H₄—(CH₂)₃—Si(OMe)₃ |
| 33 | 0 | —C₆H₃(Me)₂ (3,4-diMe) | —C₆H₃(Me)₂ (3,4-diMe) | — | — | —C₆H₄—C₆H₄—X | —COO—(CH₂)₃—Si(OMe)₃ |
| 34 | 0 | —C₆H₃(Me)₂ (3,4-diMe) | —C₆H₃(Me)₂ (3,4-diMe) | — | — | —C₆H₄—C₆H₄—X | —COO—CH₂—C₆H₄Si(OMe)₃ |
| 35 | 0 | —C₆H₃(Me)₂ (3,4-diMe) | —C₆H₅ | — | — | —C₆H₄—C₆H₄—X | —COO—(CH₂)₃—Si(OMe)₃ |
| 36 | 0 | —C₆H₃(Me)₂ (3,4-diMe) | —C₆H₅ | — | — | —C₆H₄—C₆H₄—X | —COO—(CH₂)₃—Si(OMe)₃ |

TABLE 23

| compound | k | Ar¹¹ | Ar²¹ | Ar³¹ | Ar⁴¹ | Ar⁵¹ | X |
|---|---|---|---|---|---|---|---|
| 37 | 0 | —C₆H₃(Me)₂ (3,4-diMe) | —C₆H₃(Me)₂ (3,4-diMe) | — | — | —C₆H₄—X | —COO—(CH₂)₃—Si(OMe)₃ |
| 38 | 0 | —C₆H₃(Me)₂ (3,4-diMe) | —C₆H₃(Me)₂ (3,4-diMe) | — | — | —C₆H₄—X | —COO—CH₂C₆H₅—(CH₂)₂—Si(OMe)₃ |
| 39 | 0 | —C₆H₃(Me)₂ (3,4-diMe) | —C₆H₃(Me)₂ (3,4-diMe) | — | — | —C₆H₄—X | —CH₂—COO—(CH₂)₃—Si(OMe)₃ |
| 40 | 0 | —C₆H₃(Me)₂ (3,4-diMe) | —C₆H₃(Me)₂ (3,4-diMe) | — | — | —C₆H₄—X | —CH₂—COO—CH₂—C₆H₄—(CH₂)₂—Si(OMe)₃ |

TABLE 23-continued
| compound | k | Ar¹¹ | Ar²¹ | Ar³¹ | Ar⁴¹ | Ar⁵¹ | X |
|---|---|---|---|---|---|---|---|
| 41 | 0 | 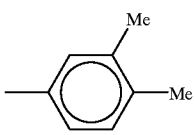 | 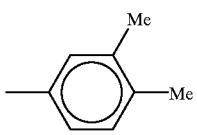 | — | — |  | —(CH₂)₂—COO—<br>(CH₂)₃—Si(OMe)₃ |
| 42 | 0 | 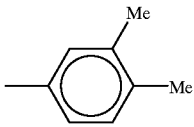 | 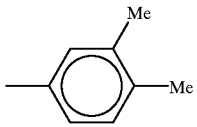 | — | — |  | —(CH₂)₂—COO—<br>CH₂C₆H₄—(CH₂)₂—<br>Si(OMe)₃ |
| 43 | 0 | 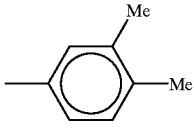 | 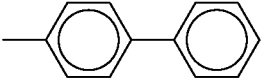 | — | — | 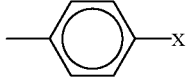 | —COO—(CH₂)₃—<br>Si(OMe)₃ |
| 44 | 0 | 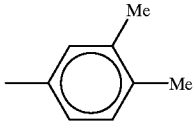 | 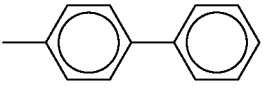 | — | — |  | —COO—CH₂C₆H₄—<br>(CH₂)₂—Si(OMe)₃ |
| 45 | 0 | 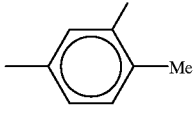 | 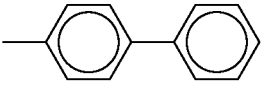 | — | — |  | —CH₂—COO—(CH₂)₃—<br>Si(OMe)₃ |
| 46 | 0 | 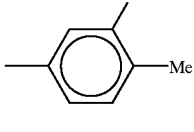 | 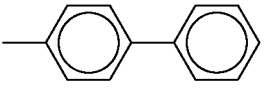 | — | — |  | —CH₂—COO—<br>CH₂C₆H₄—(CH₂)₂—<br>Si(OMe)₃ |
| 47 | 0 | 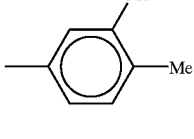 | 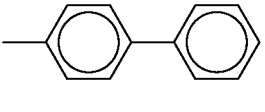 | — | — |  | —(CH₂)₂—COO—<br>(CH₂)₃—Si(OMe)₃ |
| 48 | 0 | 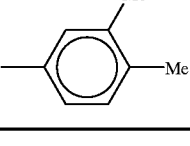 | 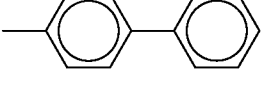 | — | — |  | —(CH₂)₂—COO—<br>CH₂C₆H₄—(CH₂)₂—<br>Si(OMe)₃ |
TABLE 24
| compound | k | Ar¹¹ | Ar²¹ | Ar³¹ | Ar⁴¹ | Ar⁵¹ | X |
|---|---|---|---|---|---|---|---|
| 49 | 0 | 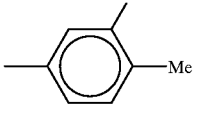 | 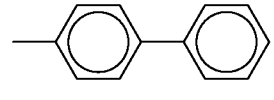 | — | — | 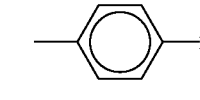 | —CH=CH—Si(OEt)₃ |

TABLE 24-continued

| compound | k | Ar¹¹ | Ar²¹ | Ar³¹ | Ar⁴¹ | Ar⁵¹ | X |
|---|---|---|---|---|---|---|---|
| 50 | 0 | 2,4-di-Me-phenyl | biphenyl | — | — | phenyl-X | —CH=CH—CH₂—Si(OMe)₃ |
| 51 | 0 | 2,4-di-Me-phenyl | biphenyl | — | — | phenyl-X | —CH=CH—(CH₂)₂—Si(OEt)₃ |
| 52 | 0 | 2,4-di-Me-phenyl | biphenyl | — | — | phenyl-X | —CH=CH—(CH₂)₂—SiMe(OMe)₂ |
| 53 | 0 | 2,4-di-Me-phenyl | biphenyl | — | — | phenyl-X | —CH=CH—CH₂—Si(OMe)₂Me |
| 54 | 0 | 2,4-di-Me-phenyl | biphenyl | — | — | phenyl-X | —CH=CH—(CH₂)₂—Si(OEt)₃ |
| 55 | 0 | 2,4-di-Me-phenyl | biphenyl | — | — | phenyl-X | —CH=CH—(CH₂)₁₀—Si(OMe)₃ |
| 56 | 0 | 2,4-di-Me-phenyl | biphenyl | — | — | phenyl-X | —CH=CH—C₅H₄—Si(OMe)₃ |
| 57 | 0 | 2,4-di-Me-phenyl | biphenyl | — | — | phenyl-X | —CH=CH—C₅H₄—(CH₂)₂—Si(OMe)₃ |
| 58 | 0 | 2,6-di-Me-4-OMe-phenyl | biphenyl | — | — | phenyl-X | —CH=CH—(CH₂)₂—Si(OMe)₃ |

TABLE 25

| compound | k | Ar11 | Ar21 | Ar31 | Ar41 | Ar51 | X |
|---|---|---|---|---|---|---|---|
| 59 | 0 | dimethylphenyl (2,3-Me) | biphenyl | — | — | phenyl-X | $-(CH_2)_2-Si(OEt)_3$ |
| 60 | 0 | dimethylphenyl | biphenyl | — | — | phenyl-X | $-(CH_2)_3-Si(OEt)_3$ |
| 61 | 0 | dimethylphenyl | biphenyl | — | — | phenyl-X | $-(CH_2)_4-Si(OMe)_3$ |
| 62 | 0 | dimethylphenyl | biphenyl | — | — | phenyl-X | $-(CH_2)_4-SiMe(OMe)_2$ |
| 63 | 0 | dimethylphenyl | biphenyl | — | — | phenyl-X | $-(CH_2)_4-SiMe_2(OMe)$ |
| 64 | 0 | dimethylphenyl | biphenyl | — | — | phenyl-X | $-(CH_2)_4-Si(OEt)_3$ |
| 65 | 0 | dimethylphenyl | biphenyl | — | — | phenyl-X | $-(CH_2)_6-SiMe(OEt)_2$ |
| 66 | 0 | dimethylphenyl | biphenyl | — | — | phenyl-X | $-(CH_2)_{12}-Si(OMe)_3$ |
| 67 | 0 | dimethylphenyl | biphenyl | — | — | phenyl-X | $-(CH_2)_2-C_6H_4-$<br>$(CH_2)_2-Si(OMe)_3$ |
| 68 | 0 | dimethylphenyl | biphenyl | — | — | phenyl-X | $-CH_2-CH_2-C_6H_4$<br>$-Si(OMe)_3$ |

TABLE 26

| compound | k | Ar¹¹ | Ar²¹ | Ar³¹ | Ar⁴¹ | Ar⁵¹ | X |
|---|---|---|---|---|---|---|---|
| 69 | 1 | 2,4-diMe-phenyl | phenyl | 4-X-phenyl | 2,3-diMe-phenyl | 3,3'-diMe-biphenyl | —CH=N—(CH₂)₃—Si(OMe)₃ |
| 70 | 1 | 2,4-diMe-phenyl | phenyl | 4-X-phenyl | 2,3-diMe-phenyl | biphenyl | —CH=N—(CH₂)₃—Si(OMe)₃ |
| 71 | 1 | 2,6-diMe-4-OMe-phenyl | phenyl | 4-X-phenyl | 2,6-diMe-4-OMe-phenyl | 3,3'-diMe-biphenyl | —CH=N—(CH₂)₃—Si(OMe)₃ |
| 72 | 1 | 2,6-diMe-4-OMe-phenyl | phenyl | 4-X-phenyl | 2,6-diMe-4-OMe-phenyl | biphenyl | —CH=N—(CH₂)₃—Si(OMe)₃ |
| 73 | 1 | 4-Me-phenyl | phenyl | 4-X-phenyl | 4-Me-phenyl | 3,3'-diMe-biphenyl | —CH=N—(CH₂)₃—Si(OMe)₃ |
| 74 | 1 | 2,4-diMe-phenyl | phenyl | 4-X-phenyl | 2,4-diMe-phenyl | 3,3'-diMe-biphenyl | —CH=N—(3-Me-phenyl)—Si(OMe)₃ |

TABLE 26-continued

| compound | k | Ar¹¹ | Ar²¹ | Ar³¹ | Ar⁴¹ | Ar⁵¹ | X |
|---|---|---|---|---|---|---|---|
| 75 | 1 | 2,4-diMe-phenyl | phenyl | 4-X-phenyl | 2,4-diMe-phenyl | 3,3'-diMe-biphenyl | —O—(CH$_2$)$_3$—Si(OMe)$_3$ |
| 76 | 1 | 2,4-diMe-phenyl | phenyl | 4-X-phenyl | 2,4-diMe-phenyl | 3,3'-diMe-biphenyl | —O—(CH$_2$)$_3$—Si(OEt)$_3$ |
| 77 | 1 | 2,4-diMe-phenyl | phenyl | 4-X-phenyl | 2,4-diMe-phenyl | 3,3'-diMe-biphenyl | —CH$_2$—O—(CH$_2$)$_3$—Si(OMe)$_3$ |
| 78 | 1 | 2,4-diMe-phenyl | phenyl | 4-X-phenyl | 2,4-diMe-phenyl | 3,3'-diMe-biphenyl | —(CH$_2$)$_3$O—(CH$_2$)$_3$—Si(OMe)$_3$ |

TABLE 27

| compound | k | Ar¹¹ | Ar²¹ | Ar³¹ | Ar⁴¹ | Ar⁵¹ | X |
|---|---|---|---|---|---|---|---|
| 79 | 1 | 2,4-diMe-C₆H₃ | C₆H₄ | C₆H₄-X | 2,4-diMe-C₆H₃ | 3,3'-diMe-biphenyl | —(CH₂)₄—Si(OMe)₃ |
| 80 | 1 | 2,4-diMe-C₆H₃ | C₆H₄ | C₆H₄-X | 2,4-diMe-C₆H₃ | 3,3'-diMe-biphenyl | —(CH₂)₂—C₆H₄—Si(OMe)₃ |
| 81 | 1 | 2,4-diMe-C₆H₃ | C₆H₄ | C₆H₄-X | 2,4-diMe-C₆H₃ | biphenyl | —(CH₂)₄—Si(OMe)₃ |
| 82 | 1 | 2,6-diMe-4-OMe-C₆H₂ | C₆H₄ | C₆H₄-X | 2,6-diMe-4-OMe-C₆H₂ | 3,3'-diMe-biphenyl | —(CH₂)₄—Si(OMe)₃ |
| 83 | 1 | 2,6-diMe-4-OMe-C₆H₂ | C₆H₄ | C₆H₄-X | 2,6-diMe-4-OMe-C₆H₂ | biphenyl | —(CH₂)₄—Si(OMe)₃ |
| 84 | 1 | 2,4-diMe-C₆H₃ | C₆H₄ | C₆H₄-X | 2,4-diMe-C₆H₃ | 3,3'-diMe-biphenyl | —CH=CH—(CH₂)₂—Si(OMe)₃ |

TABLE 27-continued

| compound | k | Ar¹¹ | Ar²¹ | Ar³¹ | Ar⁴¹ | Ar⁵¹ | X |
|---|---|---|---|---|---|---|---|
| 85 | 1 | 2,4-diMe-phenyl | phenyl | 4-X-phenyl | 2,4-diMe-phenyl | 3,4'-diMe-biphenyl | $-CH=CH-(CH_2)_2-Si(OMe)_3$ |
| 86 | 1 | 3,5-diMe-4-OMe-phenyl | phenyl | 4-X-phenyl | 3,5-diMe-4-OMe-phenyl | 3,3',5-triMe-biphenyl | $-CH=CH-(CH_2)_2-Si(OMe)_3$ |
| 87 | 1 | 3,5-diMe-4-OMe-phenyl | phenyl | 4-X-phenyl | 3,5-diMe-4-OMe-phenyl | biphenyl | $-CH=CH-(CH_2)_2-Si(OMe)_3$ |
| 88 | 1 | 4-Me-phenyl | phenyl | 4-X-phenyl | 4-Me-phenyl | 3,3'-diMe-biphenyl | $-CH=CH-(CH_2)_2-Si(OMe)_3$ |

TABLE 28

| compound | k | Ar¹¹ | Ar²¹ | Ar³¹ | Ar⁴¹ | Ar⁵¹ | X |
|---|---|---|---|---|---|---|---|
| 89 | 0 | 2,3-dimethylphenyl | -C₆H₄-X | — | — | -C₆H₄-X | —(CH₂)₂—Si(OEt)₃ |
| 90 | 0 | 2,3-dimethylphenyl | -C₆H₄-X | — | — | -C₆H₄-X | —(CH₂)₃—Si(OEt)₃ |
| 91 | 0 | 2,3-dimethylphenyl | -C₆H₄-X | — | — | -C₆H₄-X | —(CH₂)₃—Si(OMe)₂Me |
| 92 | 0 | 2,3-dimethylphenyl | -C₆H₄-X | — | — | -C₆H₄-X | —(CH₂)₄—Si(OMe)₃ |
| 93 | 0 | 2,3-dimethylphenyl | -C₆H₄-X | — | — | -C₆H₄-X | —(CH₂)₁₂—Si(OMe)₃ |
| 94 | 0 | 2,3-dimethylphenyl | -C₆H₄-X | — | — | -C₆H₄-X | —(CH₂)₄—Si(OEt)₃ |
| 95 | 0 | 2,3-dimethylphenyl | -C₆H₄-X | — | — | -C₆H₄-X | —(CH₂)₂—C₆H₄—Si(OMe)₃ |
| 96 | 0 | 2,3-dimethylphenyl | -C₆H₄-X | — | — | -C₆H₄-X | —(CH₂)₂—C₆H₄—(CH₂)₂—Si(OMe)₃ |
| 97 | 0 | 2,3-dimethylphenyl | -C₆H₄-X | — | — | -C₆H₄-X | —(CH₂)₄—Si(OMe)₃ |
| 98 | 0 | biphenyl | -C₆H₄-X | — | — | -C₆H₄-X | —(CH₂)₄—Si(OMe)₃ |

TABLE 29

| compound | k | Ar¹¹ | Ar²¹ | Ar³¹ | Ar⁴¹ | Ar⁵¹ | X |
|---|---|---|---|---|---|---|---|
| 99 | 0 | 3,4-dimethylphenyl | –C₆H₄–X | — | — | –C₆H₄–X | —CH=CH—Si(OEt)₃ |
| 100 | 0 | 3,4-dimethylphenyl | –C₆H₄–X | — | — | –C₆H₄–X | —CH=CH—CH₂—Si(OMe)₂Me |
| 101 | 0 | 3,4-dimethylphenyl | –C₆H₄–X | — | — | –C₆H₄–X | —CH=CH—(CH₂)₂—Si(OMe)₃ |
| 102 | 0 | 3,4-dimethylphenyl | –C₆H₄–X | — | — | –C₆H₄–X | —CH=CH—(CH₂)₂—Si(OMe)₂Me |
| 103 | 0 | 3,4-dimethylphenyl | –C₆H₄–X | — | — | –C₆H₄–X | —CH=CH—(CH₂)₂—SiMe₂(OMe) |
| 104 | 0 | 3,4-dimethylphenyl | –C₆H₄–X | — | — | –C₆H₄–X | —CH=CH—(CH₂)₂—Si(OEt)₃ |
| 105 | 0 | 3,4-dimethylphenyl | –C₆H₄–X | — | — | –C₆H₄–X | —CH=CH—(CH₂)₁₀—Si(OMe)₃ |
| 106 | 0 | 3,4-dimethylphenyl | –C₆H₄–X | — | — | –C₆H₄–X | —CH=CH—C₆H₄—Si(OMe)₃ |
| 107 | 0 | 3,4-dimethylphenyl | –C₆H₄–X | — | — | –C₆H₄–X | —CH=CH—C₆H₄—(CH₂)₂—Si(OMe)₃ |
| 108 | 0 | biphenyl | –C₆H₄–X | — | — | –C₆H₄–X | —CH=CH—(CH₂)₂—Si(OMe)₃ |

TABLE 30

| compound | k | Ar$^{11}$ | Ar$^{21}$ | Ar$^{31}$ | Ar$^{41}$ | Ar$^{51}$ | X |
|---|---|---|---|---|---|---|---|
| 109 | 0 | 2,4-dimethylphenyl | –C$_6$H$_4$–X | — | — | –C$_6$H$_4$–X | —CH=N—(CH$_2$)$_3$—Si(OMe)$_3$ |
| 110 | 0 | 2,4-dimethylphenyl | –C$_6$H$_4$–X | — | — | –C$_6$H$_4$–X | —CH=N—(CH$_2$)$_3$—Si(OEt)$_3$ |
| 111 | 0 | 2,4-dimethylphenyl | –C$_6$H$_4$–X | — | — | –C$_6$H$_4$–X | —CH=N—CH$_2$—Si(OMe)$_2$Me |
| 112 | 0 | 2,4-dimethylphenyl | –C$_6$H$_4$–X | — | — | –C$_6$H$_4$–X | —CH=N—C$_6$H$_4$—(CH$_2$)$_2$—Si(OMe)$_3$ |
| 113 | 0 | biphenyl | –C$_6$H$_4$–X | — | — | –C$_6$H$_4$–X | —CH=N—(CH$_2$)$_3$—Si(OMe)$_3$ |
| 114 | 0 | 2,4-dimethylphenyl | –C$_6$H$_4$–X | — | — | –C$_6$H$_4$–X | —O—(CH$_2$)$_3$—Si(OMe)$_3$ |
| 115 | 0 | 2,4-dimethylphenyl | –C$_6$H$_4$–X | — | — | –C$_6$H$_4$–X | —O—(CH$_2$)$_3$—Si(OEt)$_3$ |
| 116 | 0 | 2,4-dimethylphenyl | –C$_6$H$_4$–X | — | — | –C$_6$H$_4$–X | —CH$_2$—O—(CH$_2$)$_3$—Si(OMe)$_3$ |
| 117 | 0 | 2,4-dimethylphenyl | –C$_6$H$_4$–X | — | — | –C$_6$H$_4$–X | —(CH$_2$)$_3$—O—(CH$_2$)$_3$—Si(OMe)$_3$ |
| 118 | 0 | biphenyl | –C$_6$H$_4$–X | — | — | –C$_6$H$_4$–X | —CH$_2$—O—(CH$_2$)$_3$—Si(OMe)$_3$ |

TABLE 31

| compound | k | Ar¹¹ | Ar²¹ | Ar³¹ | Ar⁴¹ | Ar⁵¹ | X |
|---|---|---|---|---|---|---|---|
| 119 | 0 | 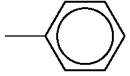 | -X | — | — | -X | —CH₂—COO—(CH₂)₃—Si(OMe)₃ |
| 120 | 0 | 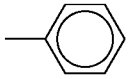 | 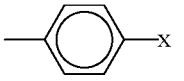-X | — | — | -X | —(CH₂)₂—COO—(CH₂)₃—Si(OMe)₃ |
| 121 | 0 | 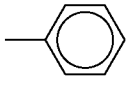 | -X | — | — | -X | —(CH₂)₂—COO—CH₂C₉H₄—(CH₂)₂—Si(OMe)₃ |
| 122 | 0 | 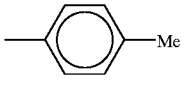-Me | 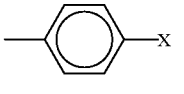-X | — | — | -X | —CH₂—COO—CH₂C₉H₄—(CH₂)₂—Si(OMe)₃ |
| 123 | 0 | 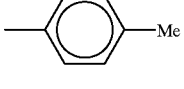-Me | 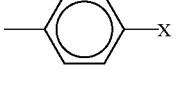-X | — | — | -X | —(CH₂)₂—COO—(CH₂)₃—Si(OMe)₃ |
| 124 | 0 | 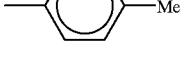-Me | -X | — | — | -X | —(CH₂)₂—COO—CH₂C₉H₄—(CH₂)₂—Si(OMe)₃ |
| 125 | 0 | 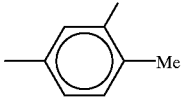 (Me, Me) | 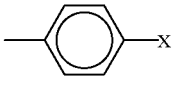-X | — | — | -X | —CH₂—COO—CH₂C₉H₄—(CH₂)₂—Si(OMe)₃ |
| 126 | 0 | 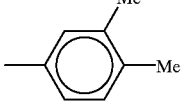 (Me, Me) | -X | — | — | -X | —(CH₂)₂—COO—(CH₂)₃—Si(OMe)₃ |
| 127 | 0 | 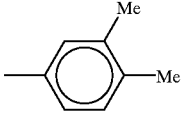 (Me, Me) | 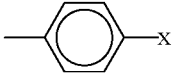-X | — | — | -X | —(CH₂)₂—COO—CH₂C₉H₄—Si(OMe)₃ |
| 128 | 0 | 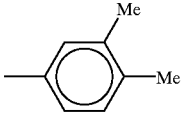 (Me, Me) | 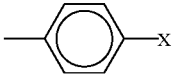-X | — | — | -X | —(CH₂)₂—COO—CH₂C₉H₄—(CH₂)₂—Si(OMe)₃ |
| 129 | 0 | 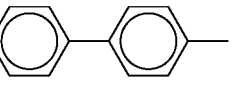 | 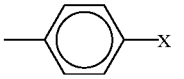-X | — | — | -X | —CH₂—COO—(CH₂)₃—Si(OMe)₃ |
| 130 | 0 | 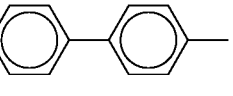 | 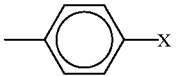-X | — | — | -X | —(CH₂)₂—COO—(CH₂)₃—Si(OMe)₃ |
| 131 | 0 | 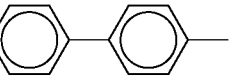 | -X | — | — | -X | —(CH₂)₂—COO—CH₂C₉H₄—(CH₂)₂—Si(OMe)₃ |

TABLE 32

| compound | k | Ar¹¹ | Ar²¹ | Ar³¹ | Ar⁴¹ | Ar⁵¹ | X |
|---|---|---|---|---|---|---|---|
| 132 | 0 | 2,4-dimethylphenyl | 4,4'-biphenyl (X at 4') | — | — | 4,4'-biphenyl (X at 4') | —COO—(CH₂)₂—Si(OMe)₃ |
| 133 | 0 | 2,4-dimethylphenyl | 4,4'-biphenyl (X at 4') | — | — | 4,4'-biphenyl (X at 4') | —COO—CH₂C₆H₄—(CH₂)₂—Si(OMe)₃ |
| 134 | 0 | 4-methoxyphenyl | 4-phenyl (X) | — | — | 4-phenyl (X) | —CH₂—COO—CH₂C₆H₄—(CH₂)₂—Si(OMe)₃ |
| 135 | 0 | 4-methoxyphenyl | 4-phenyl (X) | — | — | 4-phenyl (X) | —(CH₂)₂—COO—(CH₂)₃—Si(OMe)₃ |
| 136 | 0 | 4-methoxyphenyl | 4-phenyl (X) | — | — | 4-phenyl (X) | —(CH₂)₂—COO—CH₂C₆H₄—(CH₂)₂—Si(OMe)₃ |
| 137 | 0 | 2,4-dimethylphenyl | 3-methylphenyl (X) | — | — | 3-methylphenyl (X) | —(CH₂)₂—COO—(CH₂)₃—Si(OMe)₃ |
| 138 | 0 | 2,4-dimethylphenyl | 3-methylphenyl (X) | — | — | 3-methylphenyl (X) | —(CH₂)₂—COO—CH₂C₆H₄—Si(OMe)₃ |

TABLE 32-continued

| compound | k | Ar11 | Ar21 | Ar31 | Ar41 | Ar51 | X |
|---|---|---|---|---|---|---|---|
| 139 | 0 | 2,4-dimethylphenyl | 3-X-phenyl (meta-methyl) | — | — | 3-X-phenyl (meta-methyl) | —(CH$_2$)$_2$—COO—CH$_2$C$_6$H$_4$—(CH$_2$)$_2$—Si(OMe)$_3$ |
| 140 | 0 | biphenyl | 3-X-phenyl (meta-methyl) | — | — | 3-X-phenyl (meta-methyl) | —CH$_2$—COO—(CH$_2$)$_3$—Si(OMe)$_3$ |
| 141 | 0 | biphenyl | 3-X-phenyl (meta-methyl) | — | — | 3-X-phenyl (meta-methyl) | —(CH$_2$)$_2$—COO—(CH$_2$)$_3$—Si(OMe)$_3$ |
| 142 | 0 | biphenyl | 3-X-phenyl (meta-methyl) | — | — | 3-X-phenyl (meta-methyl) | —(CH$_2$)$_2$—COO—CH$_2$C$_6$H$_4$—(CH$_2$)$_2$—Si(OMe)$_3$ |

TABLE 33

| compound | k | Ar¹¹ | Ar²¹ | Ar³¹ | Ar⁴¹ | Ar⁵¹ | X |
|---|---|---|---|---|---|---|---|
| 143 | 1 | 2,4-Me-phenyl | p-phenylene | p-phenylene | 2,4-Me-phenyl | 3,3'-Me-4,4'-biphenyl | —(CH$_2$)$_2$—Si(OEt)$_3$ |
| 144 | 1 | 2,4-Me-phenyl | p-phenylene | p-phenylene | 2,4-Me-phenyl | 3,3'-Me-4,4'-biphenyl | —(CH$_2$)$_3$—Si(OEt)$_3$ |
| 145 | 1 | 2,4-Me-phenyl | p-phenylene | p-phenylene | 2,4-Me-phenyl | 3,3'-Me-4,4'-biphenyl | —(CH$_2$)$_4$—Si(OMe)$_3$ |
| 146 | 1 | 2,4-Me-phenyl | p-phenylene | p-phenylene | 2,4-Me-phenyl | 3,3'-Me-4,4'-biphenyl | —(CH$_2$)$_4$—SiMe(OMe)$_2$ |
| 147 | 1 | 2,4-Me-phenyl | p-phenylene | p-phenylene | 2,4-Me-phenyl | 3,3'-Me-4,4'-biphenyl | —(CH$_2$)$_4$—SiMe$_2$(OMe) |
| 148 | 1 | 2,4-Me-phenyl | p-phenylene | p-phenylene | 2,4-Me-phenyl | 3,3'-Me-4,4'-biphenyl | —(CH$_2$)$_4$—Si(OEt)$_3$ |

TABLE 33-continued

| compound | k | Ar11 | Ar21 | Ar31 | Ar41 | Ar51 | X |
|---|---|---|---|---|---|---|---|
| 149 | 1 | 2,4-Me-C6H3 | 4-C6H4-X | 4-C6H4-X | 2,4-Me-C6H3 | 3,3',4,4'-tetramethylbiphenyl | $-(CH_2)_2-C_6H_4-Si(OMe)_3$ |
| 150 | 1 | 2,4-Me-C6H3 | 4-C6H4-X | 4-C6H4-X | 2,4-Me-C6H3 | 3,3',4,4'-tetramethylbiphenyl | $-(CH_2)_2-C_6H_4-(CH_2)_2-Si(OMe)_3$ |
| 151 | 1 | 2,4-Me-C6H3 | 4-C6H4-X | 4-C6H4-X | 2,4-Me-C6H3 | biphenyl | $-(CH_2)_3-Si(OMe)_2Me$ |
| 152 | 1 | 2,4-Me-C6H3 | 4-C6H4-X | 4-C6H4-X | 2,4-Me-C6H3 | biphenyl | $-(CH_2)_4-Si(OMe)_3$ |

TABLE 34

| compound | k | Ar¹¹ | Ar²¹ | Ar³¹ | Ar⁴¹ | Ar⁵¹ | X |
|---|---|---|---|---|---|---|---|
| 153 | 1 | 2,4-Me-phenyl | 1,4-phenyl-X | 1,4-phenyl-X | 2,4-Me-phenyl | 3,3'-diMe-biphenyl-4,4' | —CH=CH—Si(OEt)₃ |
| 154 | 1 | 2,4-Me-phenyl | 1,4-phenyl-X | 1,4-phenyl-X | 2,4-Me-phenyl | 3,3'-diMe-biphenyl-4,4' | —CH=CH—CH₂—Si(OMe)₂Me |
| 155 | 1 | 2,4-Me-phenyl | 1,4-phenyl-X | 1,4-phenyl-X | 2,4-Me-phenyl | 3,3'-diMe-biphenyl-4,4' | —CH=CH—(CH₂)₂—Si(OMe)₃ |
| 156 | 1 | 2,4-Me-phenyl | 1,4-phenyl-X | 1,4-phenyl-X | 2,4-Me-phenyl | 3,3'-diMe-biphenyl-4,4' | —CH=CH—(CH₂)₂—Si(OMe)₂ |
| 157 | 1 | 2,4-Me-phenyl | 1,4-phenyl-X | 1,4-phenyl-X | 2,4-Me-phenyl | 3,3'-diMe-biphenyl-4,4' | —CH=CH—(CH₂)₂—SiMe₂(OMe) |
| 158 | 1 | 2,4-Me-phenyl | 1,4-phenyl-X | 1,4-phenyl-X | 2,4-Me-phenyl | 3,3'-diMe-biphenyl-4,4' | —CH=CH—(CH₂)₂—Si(OEt)₃ |

TABLE 34-continued
| compound | k | Ar11 | Ar21 | Ar31 | Ar41 | Ar51 | X |
|---|---|---|---|---|---|---|---|
| 159 | 1 | 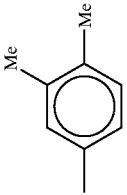 | 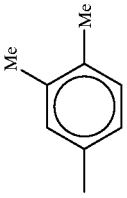 |  | 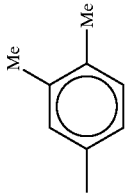 |  | —CH=CH—C₆H₄—Si(OMe)₃ |
| 160 | 0 | 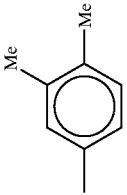 |  | 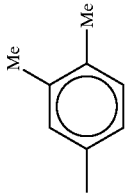 |  | 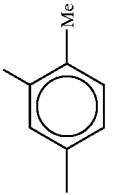 | —CH=CH—C₆H₄—(CH₂)₂—Si(OMe)₃ |
| 161 | 1 | 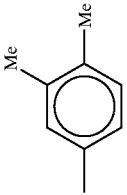 |  | 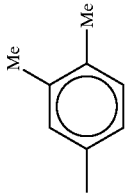 |  | 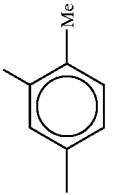 | —CH=CH—CH₂—Si(OMe)₂Me |
| 162 | 1 | 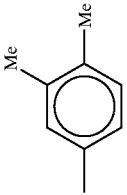 |  | 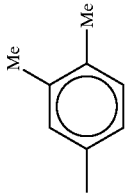 |  | 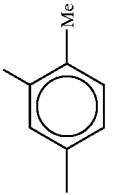 | —CH=CH—(CH₂)₂—Si(OMe)₃ |

TABLE 35

| compound | k | $Ar^{11}$ | $Ar^{21}$ | $Ar^{31}$ | $Ar^{41}$ | $Ar^{51}$ | X |
|---|---|---|---|---|---|---|---|
| 163 | 1 | | | | | | —CH=N—CH$_2$—Si(OMe)$_2$Me |
| 164 | 1 | | | | | | —CH=N—(CH$_2$)$_2$—Si(OEt)$_3$ |
| 165 | 1 | | | | | | —CH=N—(CH$_2$)$_2$—Si(OMe)$_3$ |
| 166 | 1 | | | | | | (CH$_2$)$_2$—SiOMe$_3$ on phenyl-CH=N— |
| 167 | 1 | | | | | | —CH=N—CH$_2$—Si(OMe)$_2$Me |
| 168 | 1 | | | | | | —O—(CH$_2$)$_2$—Si(OMe)$_3$ |

TABLE 35-continued

| compound | k | Ar11 | Ar21 | Ar31 | Ar41 | Ar51 | X |
|---|---|---|---|---|---|---|---|
| 169 | 1 | 2,4-Me-C6H3 | 1,4-C6H4 | 1,4-C6H4 | 2,4-Me-C6H3 | 3,3'-Me2-biphenyl | —O—(CH2)3—SiMe(OMe)2 |
| 170 | 1 | 2,4-Me-C6H3 | 1,4-C6H4 | 1,4-C6H4 | 2,4-Me-C6H3 | 3,3'-Me2-biphenyl | —O—(CH2)3—Si(OEt)3 |
| 171 | 1 | 2,4-Me-C6H3 | 1,4-C6H4 | 1,4-C6H4 | 2,4-Me-C6H3 | 3,3'-Me2-biphenyl | —CH2—O—(CH2)3—Si(OMe)3 |
| 172 | 1 | 2,4-Me-C6H3 | 1,4-C6H4 | 1,4-C6H4 | 2,4-Me-C6H3 | 3,3'-Me2-biphenyl | —(CH2)3—O—(CH2)3—Si(OMe)3 |

TABLE 36

| compound | k | Ar¹¹ | Ar²¹ | Ar³¹ | Ar⁴¹ | Ar⁵¹ | X |
|---|---|---|---|---|---|---|---|
| 173 | 1 | 2,4-Me-phenyl | 1,4-phenyl (X) | 1,4-phenyl (X) | 2,4-Me-phenyl | 3,3'-Me,Me-biphenyl | —COO—(CH₂)₃—Si(OMe)₃ |
| 174 | 1 | 2,4-Me-phenyl | 1,4-phenyl (X) | 1,4-phenyl (X) | 2,4-Me-phenyl | 3,3'-Me,Me-biphenyl | —COO—CH₂—C₆H₄—(CH₂)₂—Si(OMe)₃ |
| 175 | 1 | 2,4-Me-phenyl | 1,4-phenyl (X) | 1,4-phenyl (X) | 2,4-Me-phenyl | 3,3'-Me,Me-biphenyl | —CH₂—COO—(CH₂)₃—Si(OMe)₃ |
| 176 | 1 | 2,4-Me-phenyl | 1,4-phenyl (X) | 1,4-phenyl (X) | 2,4-Me-phenyl | 3,3'-Me,Me-biphenyl | —CH₂—COO—CH₂C₆H₄—(CH₂)₂—Si(OMe)₃ |
| 177 | 1 | 2,4-Me-phenyl | 1,4-phenyl (X) | 1,4-phenyl (X) | 2,4-Me-phenyl | 3,3'-Me,Me-biphenyl | —(CH₂)₂—COO—(CH₂)₃—Si(OMe)₃ |
| 178 | 1 | 2,4-Me-phenyl | 1,4-phenyl (X) | 1,4-phenyl (X) | 2,4-Me-phenyl | 3,3'-Me,Me-biphenyl | —(CH₂)₂—COO—CH₂C₆H₄—(CH₂)₂—Si(OMe)₃ |

TABLE 36-continued

| compound | k | Ar11 | Ar21 | Ar31 | Ar41 | Ar51 | X |
|---|---|---|---|---|---|---|---|
| 179 | 1 | phenyl | phenyl (X) | phenyl (X) | phenyl | 3,4'-dimethylbiphenyl | —COO—CH$_2$C$_6$H$_4$—(CH$_2$)$_2$—Si(OMe)$_3$ |
| 180 | 1 | phenyl | phenyl (X) | phenyl (X) | phenyl | 3,4'-dimethylbiphenyl | —CH$_2$—COO—(CH$_2$)$_3$—Si(OMe)$_3$ |
| 181 | 1 | phenyl | phenyl (X) | phenyl (X) | phenyl | 3,4'-dimethylbiphenyl | —CH$_2$—COO—CH$_2$—C$_6$H$_4$—Si(OMe)$_3$ |
| 182 | 1 | phenyl | phenyl (X) | phenyl (X) | phenyl | 3,4'-dimethylbiphenyl | —CH$_2$—COO—CH$_2$C$_6$H$_4$—(CH$_2$)$_2$—Si(OMe)$_3$ |
| 183 | 1 | phenyl | phenyl (X) | phenyl (X) | phenyl | 3,4'-dimethylbiphenyl | —(CH$_2$)$_2$—COO—(CH$_2$)$_3$—Si(OMe)$_3$ |
| 184 | 1 | phenyl | phenyl (X) | phenyl (X) | phenyl | 3,4'-dimethylbiphenyl | —(CH$_2$)$_2$—COO—CH$_2$C$_6$H$_4$—(CH$_2$)$_2$—Si(OMe)$_3$ |

TABLE 37

| compound | k | Ar¹¹ | Ar²¹ | Ar³¹ | Ar⁴¹ | Ar⁵¹ | X |
|---|---|---|---|---|---|---|---|
| 185 | 1 | phenyl | biphenyl-X | biphenyl-X | phenyl | biphenyl | —COO—(CH$_2$)$_3$—Si(OMe)$_3$ |
| 186 | 1 | phenyl | biphenyl-X | biphenyl-X | phenyl | biphenyl | —COO—CH$_2$C$_6$H$_4$—Si(OMe)$_3$ |
| 187 | 1 | phenyl | biphenyl-X | biphenyl-X | phenyl | biphenyl | —COO—CH$_2$C$_6$H$_4$—(CH$_2$)$_2$—Si(OMe)$_3$ |
| 188 | 1 | 2,4-diMe-phenyl | phenyl-X | phenyl-X | 2,4-diMe-phenyl | terphenyl | —COO—(CH$_2$)$_3$—Si(OMe)$_3$ |
| 189 | 1 | 2,4-diMe-phenyl | phenyl-X | phenyl-X | 2,4-diMe-phenyl | terphenyl | —COO—CH$_2$C$_6$H$_4$—Si(OMe)$_3$ |
| 190 | 1 | 2,4-diMe-phenyl | phenyl-X | phenyl-X | 2,4-diMe-phenyl | terphenyl | —COO—CH$_2$C$_6$H$_4$—(CH$_2$)$_2$—Si(OMe)$_3$ |

TABLE 37-continued

| compound | k | Ar¹¹ | Ar²¹ | Ar³¹ | Ar⁴¹ | Ar⁵¹ | X |
|---|---|---|---|---|---|---|---|
| 191 | 1 | 2,4-Me₂-C₆H₃− | 4-X-C₆H₄− | 4-X-C₆H₄− | 2,4-Me₂-C₆H₃− | 4,4'-biphenyl-4-yl (terphenyl) | —CH₂—COO—(CH₂)₃—Si(OMe)₃ |
| 192 | 1 | 2,4-Me₂-C₆H₃− | 4-X-C₆H₄− | 4-X-C₆H₄− | 2,4-Me₂-C₆H₃− | terphenyl | —(CH₂)₂—COO—(CH₂)₃—Si(OMe)₃ |
| 193 | 1 | 2,4-Me₂-C₆H₃− | 4-X-C₆H₄− | 4-X-C₆H₄− | 2,4-Me₂-C₆H₃− | terphenyl | —(CH₂)₂—COO—CH₂C₆H₄—(CH₂)₂—Si(OMe)₃ |

TABLE 38

| compound | k | $Ar^{11}$ | $Ar^{21}$ | $Ar^{31}$ | $Ar^{41}$ | $Ar^{51}$ | X |
|---|---|---|---|---|---|---|---|
| 194 | 0 | —⌬—X | —⌬—X | — | — | —⌬—X | —$(CH_2)_3$—Si(OMe)$_2$Me |
| 195 | 0 | —⌬—X | —⌬—X | — | — | —⌬—X | —$(CH_2)_3$—Si(OEt)$_3$ |
| 196 | 0 | —⌬—X | —⌬—X | — | — | —⌬—X | —$(CH_2)_4$—Si(OMe)$_3$ |
| 197 | 0 | —⌬—X | —⌬—X | — | — | —⌬—X | —$(CH_2)_4$—SiMe(OMe)$_2$ |
| 198 | 0 | —⌬—X | —⌬—X | — | — | —⌬—X | —$(CH_2)_4$—SiMe$_2$(OMe) |
| 199 | 0 | —⌬—X | —⌬—X | — | — | —⌬—X | —$(CH_2)_4$—Si(OEt)$_3$ |
| 200 | 0 | —⌬—X | —⌬—X | — | — | —⌬—X | —$(CH_2)_{12}$—Si(OMe)$_3$ |
| 201 | 0 | —⌬—X | —⌬—X | — | — | —⌬—X | —$(CH_2)_2$—$C_6H_4$—Si(OMe)$_3$ |
| 202 | 0 | —⌬—X | —⌬—X | — | — | —⌬—X | —$(CH_2)_2$—$C_6H_4$—$(CH_2)_2$—Si(OMe)$_3$ |
| 203 | 0 | —⌬—X | —⌬—X | — | — | Me-substituted ring (2,6-diMe)—X | —$(CH_2)_4$—Si(OMe)$_3$ |

TABLE 39

| compound | k | $Ar^{11}$ | $Ar^{21}$ | $Ar^{31}$ | $Ar^{41}$ | $Ar^{51}$ | X |
|---|---|---|---|---|---|---|---|
| 204 | 0 | —⌬—X | —⌬—X | — | — | —⌬—X | —CH=CH—Si(OMe)$_3$ |
| 205 | 0 | —⌬—X | —⌬—X | — | — | —⌬—X | —CH=CH—$CH_2$—Si(OMe)$_2$Me |

TABLE 39-continued

| compound | k | Ar$^{11}$ | Ar$^{21}$ | Ar$^{31}$ | Ar$^{41}$ | Ar$^{51}$ | X |
|---|---|---|---|---|---|---|---|
| 206 | 0 | —⌬—X | —⌬—X | — | — | —⌬—X | —CH=CH—(CH$_2$)$_2$—Si(OMe)$_3$ |
| 207 | 0 | —⌬—X | —⌬—X | — | — | —⌬—X | —CH=CH—(CH$_2$)$_2$—SiMe(OMe)$_2$ |
| 208 | 0 | —⌬—X | —⌬—X | — | — | —⌬—X | —CH=CH—(CH$_2$)$_2$—SiMe$_2$(OMe) |
| 209 | 0 | —⌬—X | —⌬—X | — | — | —⌬—X | —CH=CH—(CH$_2$)$_2$—Si(OEt)$_3$ |
| 210 | 0 | —⌬—X | —⌬—X | — | — | —⌬—X | —CH=CH—(CH$_2$)$_{10}$—Si(OMe)$_3$ |
| 211 | 0 | —⌬—X | —⌬—X | — | — | —⌬—X | —CH=CH—C$_6$H$_4$—Si(OMe)$_3$ |
| 212 | 0 | —⌬—X | —⌬—X | — | — | —⌬—X | —CH=CH—C$_6$H$_4$—(CH$_2$)$_2$—Si(OMe)$_3$ |
| 213 | 0 | —⌬—X | —⌬—X | — | — | —⌬(Me,Me)—X | —CH=CH—(CH$_2$)$_2$—Si(OMe)$_3$ |

TABLE 40

| compound | k | Ar$^{11}$ | Ar$^{21}$ | Ar$^{31}$ | Ar$^{41}$ | Ar$^{51}$ | X |
|---|---|---|---|---|---|---|---|
| 214 | 0 | —⌬—X | —⌬—X | — | — | —⌬—X | —CH=N—(CH$_2$)$_3$—Si(OMe)$_3$ |
| 215 | 0 | —⌬—X | —⌬—X | — | — | —⌬—X | —CH=N—(CH$_2$)$_3$—Si(OEt)$_3$ |
| 216 | 0 | —⌬—X | —⌬—X | — | — | —⌬—X | —CH=N—CH$_2$—Si(OMe)$_2$Me |
| 217 | 0 | —⌬—X | —⌬—X | — | — | —⌬—X | —CH=N—C$_6$H$_4$—(CH$_2$)$_3$Si(OMe)$_3$ |

TABLE 40-continued

| compound | k | Ar¹¹ | Ar²¹ | Ar³¹ | Ar⁴¹ | Ar⁵¹ | X |
|---|---|---|---|---|---|---|---|
| 218 | 0 | —⟨C₆H₄⟩—X | —⟨C₆H₄⟩—X | — | — | —⟨C₆H₄⟩—X | —CH=N—(CH$_2$)$_2$—Si(OMe)$_3$ |
| 219 | 0 | —⟨C₆H₄⟩—X | —⟨C₆H₄⟩—X | — | — | —⟨C₆H₄⟩—X | —O—(CH$_2$)$_3$—Si(OMe)$_3$ |
| 220 | 0 | —⟨C₆H₄⟩—X | —⟨C₆H₄⟩—X | — | — | —⟨C₆H₄⟩—X | —O—(CH$_2$)$_3$—Si(OMe)$_2$Me |
| 221 | 0 | —⟨C₆H₄⟩—X | —⟨C₆H₄⟩—X | — | — | —⟨C₆H₄⟩—X | —O—(CH$_2$)$_3$—Si(OEt)$_3$ |
| 222 | 0 | —⟨C₆H₄⟩—X | —⟨C₆H₄⟩—X | — | — | —⟨C₆H₄⟩—X | —CH$_2$—O—(CH$_2$)$_3$—Si(OMe)$_3$ |
| 223 | 0 | —⟨C₆H₄⟩—X | —⟨C₆H₄⟩—X | — | — | —⟨C₆H₄⟩—X | —(CH$_2$)$_3$—O—(CH$_2$)$_3$—Si(OMe)$_2$Me |

TABLE 41

| compound | k | Ar^{11} | Ar^{21} | Ar^{31} | Ar^{41} | Ar^{51} | X |
|---|---|---|---|---|---|---|---|
| 224 | 1 | —C₆H₄—X | —C₆H₄—X | —C₆H₄—X | —C₆H₄—X | 3,3'-dimethyl-biphenyl-4,4'-diyl | —(CH₂)₄—Si(OMe)₃ |
| 225 | 1 | —C₆H₄—X | —C₆H₄—X | —C₆H₄—X | —C₆H₄—X | 3,3'-dimethyl-biphenyl-4,4'-diyl | —(CH₂)₃—Si(OEt)₃ |
| 226 | 1 | —C₆H₄—X | —C₆H₄—X | —C₆H₄—X | —C₆H₄—X | biphenyl-4,4'-diyl | —CH₂CH₂—C(CH₃)₂—Si(OMe)₃ |
| 227 | 1 | —C₆H₄—X | —C₆H₄—X | —C₆H₄—X | —C₆H₄—X | p-terphenyl-4,4''-diyl | —CH₂CH₂—C(CH₃)₂—Si(OMe)₃ |
| 228 | 1 | —C₆H₄—X | —C₆H₄—X | —C₆H₄—X | —C₆H₄—X | biphenyl-4,4'-diyl | —CH₂CH₂—CH₂—Si(OMe)₂Me |
| 229 | 1 | —C₆H₄—X | —C₆H₄—X | —C₆H₄—X | —C₆H₄—X | biphenyl-4,4'-diyl | —CH₂CH₂—C₆H₄—Si(OMe)₃ |

TABLE 41-continued

| compound | k | Ar¹¹ | Ar²¹ | Ar³¹ | Ar⁴¹ | Ar⁵¹ | X |
|---|---|---|---|---|---|---|---|
| 230 | 1 | —C₆H₄— | —C₆H₄— | —C₆H₄— | —C₆H₄— | 3,3'-dimethyl-4,4'-biphenyl (Me groups shown) | —CH=CH—(CH₂)₂—Si(OMe)₃ |
| 231 | 1 | —C₆H₄— | —C₆H₄— | —C₆H₄— | —C₆H₄— | 4,4'-biphenyl | —CH=CH—(CH₂)₂—Si(OMe)₃ |
| 232 | 1 | —C₆H₄— | —C₆H₄— | —C₆H₄— | —C₆H₄— | 4,4''-terphenyl | —CH=CH—(CH₂)₂—Si(OMe)₃ |
| 233 | 1 | —C₆H₄— | —C₆H₄— | —C₆H₄— | —C₆H₄— | 4,4'-biphenyl | —CH=CH—CH₂—Si(OMe)₃Me |
| 234 | 1 | —C₆H₄— | —C₆H₄— | —C₆H₄— | —C₆H₄— | 4,4'-biphenyl | —CH=CH—C₆H₄—Si(OMe)₃ |

TABLE 42

| compound | k | Ar^11 | Ar^21 | Ar^31 | Ar^41 | Ar^51 | X |
|---|---|---|---|---|---|---|---|
| 235 | 1 | –C₆H₄–X | –C₆H₄–X | –C₆H₄–X | –C₆H₄–X | 3,3'-Me₂-biphenyl | —CH=N—(CH₂)₃—Si(OMe)₃ |
| 236 | 1 | –C₆H₄–X | –C₆H₄–X | –C₆H₄–X | –C₆H₄–X | biphenyl | —CH=N—(CH₂)₃—Si(OMe)₃ |
| 237 | 1 | –C₆H₄–X | –C₆H₄–X | –C₆H₄–X | –C₆H₄–X | terphenyl | —CH=N—(CH₂)₃—Si(OMe)₃ |
| 238 | 1 | –C₆H₄–X | –C₆H₄–X | –C₆H₄–X | –C₆H₄–X | biphenyl | —CH=N—CH₂—Si(OMe)₂Me |
| 239 | 1 | –C₆H₄–X | –C₆H₄–X | –C₆H₄–X | –C₆H₄–X | biphenyl | —CH=N—C₆H₄—(CH₂)₂—Si(OMe)₃ |
| 240 | 1 | –C₆H₄–X | –C₆H₄–X | –C₆H₄–X | –C₆H₄–X | 3,3'-Me₂-biphenyl | —O—(CH₂)₃—Si(OMe)₃ |

TABLE 42-continued

| compound | k | Ar11 | Ar21 | Ar31 | Ar41 | Ar51 | X |
|---|---|---|---|---|---|---|---|
| 241 | 1 | phenyl-X | phenyl-X | phenyl-X | phenyl-X | 3,3'-dimethyl-4-methylbiphenyl | —O—(CH$_2$)$_3$—Si(OEt)$_3$ |
| 242 | 1 | phenyl-X | phenyl-X | phenyl-X | phenyl-X | 3,3'-dimethyl-4-methylbiphenyl | —CH$_2$—O—(CH$_2$)$_3$—Si(OMe)$_3$ |
| 243 | 1 | phenyl-X | phenyl-X | phenyl-X | phenyl-X | 3,3'-dimethyl-4-methylbiphenyl | —CH$_2$—O—(CH$_2$)$_3$—Si(OEt)$_3$ |
| 244 | 1 | phenyl-X | phenyl-X | phenyl-X | phenyl-X | 3,3'-dimethyl-4-methylbiphenyl | —(CH$_2$)$_3$—O—(CH$_2$)$_3$—Si(OMe)$_3$ |

In the present invention, the compounds represented by the general formulas (5) or (6) include those compounds which can cure by themselves and those which cure only if a curing agent and/or a curing catalyst are added to the compounds. The compounds which can cure by themselves show a higher degree of curing and a faster rate of curing, if a curing agent and/or a curing catalyst are added to the compounds. Depending on the kinds of curing agent and/or curing catalyst to be mixed with the compounds, the resultant mixture which is a coating liquid may harden at room temperature. In this case, a crosslinking reaction proceeds in the coating liquid and the liquid may gel, giving rise to the problem that the pot-life is significantly shortened. Of course, the cross linking reaction in the coating liquid can be suppressed to some extent by such measures as selection of solvent and hermetically sealing the coating liquid from surrounding atmosphere.

On the other hand, a coating liquid system in which the crosslinking reaction substantially proceeds only after the heating of the system is preferably employed, because such a system provides a higher stability and a longer pot-life of the coating liquid.

Examples of the curing agent include polyfunctional isocyanate compounds, polyfunctional epoxy compounds, polyfunctional alcoholic compounds, polyfunctional amine compounds, polyfunctional acid anhydride compounds, melamine compounds, phenol compounds, aluminum-based coupling agents, silane coupling agents, titanium-based coupling agents and zirconium-based coupling agents.

Examples of the aluminum-based coupling agents include acetoxyaluminum diisopropylate, acetoethoxyaluminum diisopropylate, acetopropoxyaluminum diisopropylate, and the like. Examples of the silane coupling agent include vinyltrichlorosilane, vinyltrimethoxysilane, vinyltriethoxysilane,γ-glycidoxypropylmethyldiethoxysilane, γ-glycidoxypropyltrimethoxysilane, γ-glycidoxypropyltriethoxysilane, γ-aminopropyltriethoxysilane,γ-aminopropyltrimethoxysilane, γ-aminopropylmethyldimethoxysilane, N-β(aminoethyl)-γ-aminopropyltriethoxysilane, tetramethoxysilane, methyltrimethoxysilane, dimethyldimethoxysilane, phenyltrimethoxysilane, phenyltriethoxysilane, and the like, and partially condensed products of the foregoing compounds. Silicone-based hardcoat agents are known as the partially condensed products mentioned above. Examples of the titanium-based coupling agents include titanium tetra-n-butoxide, titanium tetraisopropoxide, titanium tetraethoxide, and the like, and partially condensed products of the foregoing compounds. Examples of the zirconium-based coupling agents include zirconium tetra-n-butoxide, tri-n-butoxyzirconium acetylacetonate, and the like, and partially condensed products of the foregoing compounds.

In the present invention, if the compound represented by the general formula (5) or (6) is used in a combination with the above-mentioned curing agent, the ratio (by weight) of the compound represented by the general formula (5) or (6) to the curing agent is in the range of 100/1 to 1/100, preferably 90/10 to 10/90, and more preferably 70/30 to 20/80.

Examples of the curing catalyst include acids such as hydrochloric acid, sulfuric acid, formic acid, acetic acid, trifluoroacetic acid, and the like; bases such as ammonia, triethylamine and pyridine; tin compounds such as dibutyltin diacetate, dibutyltin dioctoate; titanium compounds such as tetra-n-butyl titanate and tetraisopropyl titanate; and organocarbonic acid salts such as iron salts, manganese salts, cobalt salts, zinc salts and zirconium salts.

Processes for promoting the curing include heating, addition of water, humidification, light irradiation, electron beam irradiation, X-ray irradiation, compression and treatment with ultrasonic waves. However, from the viewpoint of ease in operation and insignificance of chemical or mechanical damage, heating and humidification are preferable.

In the present invention, if a surface layer composed of a homogeneous charge transporting layer which is cured by crosslinking is formed, the thickness of the surface layer is in the range of 0.1–10 μm, preferably 0.5–7 μm, and more preferably 1–5 μm.

In the present invention, although the surface layer of the electrophotographic photoreceptor is not particularly limited, the surface is preferably a homogeneous charge transporting layer composed of a charge transporting polymeric compound or a homogeneous charge transporting layer which is cured by crosslinking, from the viewpoint of mechanical strength and quality of image.

The total film thickness of the homogeneous charge transporting layer is generally 50 μm or less, and preferably 30 μm or less. The coating method for forming the homogeneous charge transporting layer may be a conventional method described previously as a coating method for forming a subbing layer. A layer such as an amorphous selenium layer, which can be made by a vapor phase process, may be prepared directly by, for example, a vacuum deposition process.

In the present invention, the total film thickness of the charge transporting layer which comprises a heterogeneous charge transporting layer and, if necessary, the homogeneous charge transporting layer is generally in the range of 5 to 50 μm, and preferably in the range of 10 to 40 μm.

In the case where a charge transporting layer is present between a charge generating layer and a light source for exposure, it is preferable that the charge transporting layer is virtually transparent to the light of the exposure wavelength in order that the effective sensitivity to light may not be decreased. The light transmittance of the charge transporting layer to the light for exposure is preferably 50% or greater, more preferably70% orgreater, and most preferably 90% or greater. However, if it is desired to use the photoreceptor in a lower sensitivity range thereof, the effective sensitivity to light can be adjusted to a desired value by adding a substance which absorbs the light of the exposure wavelength to the charge transporting layer.

The protective layer, which is optional, is effective in substantially prolonging the life of the photosensitive layer by protecting it from chemical stresses such as ozone, oxidant gases and ultraviolet rays generated from the charging members of an electrophotographic apparatus, and also from mechanical stresses induced by contact with developer, paper, cleaning members and the like. A thin charge generating layer as an upper layer of the photosensitive layer is remarkably effective.

The protective layer is composed of a binder resin and an electroconductive material which is incorporated in the binder resin. Some examples of the electroconductive material, but which are not limited thereto include metaloxides compounds such as dimethylferrocene, and metal oxides such as antimony oxide, tin oxide, titanium oxide, indium oxide, ITO, and the like. As for the binder resin for the protective layer, known resins can be used and examples of the binder include polyamide, urethane, polyester, polycarbonate, polystyrene, polyacrylamide, silicone resins, melamine resins, phenol resins, epoxy resins and the like.

Further, inorganic film which is a semiconductor, such as amorphous carbon and the like, can also be used as the protective layer.

If the above-described protective layer which controls the electric resistance is used, the resistivity is preferably in the range of $10^9$ to $10^{14}$ Ω·cm. If the resistivity exceeds $10^{14}$ Ω·cm, the residual potential increases, whereas if the resistivity is less than $10^9$ Ω·cm, the charge leakage in the direction of the surface of the layer cannot be disregarded and the resolution of the image drops.

An appropriate film thickness of the protective layer is in the range of 0.5 to 20 μm and a preferable film thickness is in the range of 1 to 10 μm.

Where the protective layer is employed, a blocking layer may be formed between the photosensitive layer and the protective layer, if necessary, in order to prevent charge leakage from the protective layer to the photosensitive layer. As in the case of the protective layer, a known layer can be used as the blocking layer.

In the electrophotographic photoreceptor of the present invention, in order to protect the photoreceptor from deterioration due to the action of ozone, oxidant gas, light and heat which are generated in the electrophotographic apparatus, anantioxidant, a light stabilizer and a heat stabilizer can be added to any constituent layer or to the uppermost layer.

The antioxidant may be a known one and examples of the antioxidant include hindered phenol, hindered amine, p-phenylenediamine, hydroquinone, spirochroman, spiroindanone, derivatives of the foregoing compounds, organosulfur compounds, and organophosphorus compounds.

The light stabilizer may be a known one and examples of the light stabilizer include derivatives of such compounds as benzophenone, benzotriazole, dithiocarbamate and tetramethylpiperidine, and an electron-withdrawing or donating compound capable of deactivating a light excitation state by energy transfer or charge transfer.

Further, for the purpose of reducing surface wear, enhancing transferability of toner image, and improving surface cleaning efficiency, the uppermost layer may contain dispersed therein insulating particles which have a low surface energy such as a fluorine-containing resin.

In the present invention, the order of the above-mentioned layers to be formed on an electroconductive substrate is not limited.

As stated previously, the charge generated in a charge generating layer moves until the charge encounters the barrier of the electrically inert matrix of the heterogeneous charge transporting layer and stops moving for the first time. If the distance of this movement is small in comparison with the total film thickness of the photosensitive layer, the attenuation of potential due to the movement is negligible and therefore a more ideal S-type property is obtained. That is, a better S-type property is obtained, if the charge generating layer is close to, or preferably adjacent to, the heterogeneous charge transporting layer which is designed to provide the S-type property. However, in order to assist in the injection or generation of charge, an appropriate intermediate layer may be formed between the charge generating layer and the heterogeneous charge transporting layer.

As a measure to determine whether a photo-induced potential attenuation characteristic is S-type or J-type, use can be made of a ratio $E_{50\%}/E_{10\%}$, i.e., the ratio of an exposure amount $E_{50\%}$, which is necessary to attenuate the charge potential of the electrophotographic photoreceptor by 50%, to an exposure amount $E_{10\%}$, which is necessary to attenuate the charge potential of the electrophotographic photoreceptor by 10%. In the case of an ideal J-type photoreceptor, i.e., where attenuation of potential is proportional to exposure amount, the ratio $E_{50\%}/E_{10\%}$ is 5. In an ordinary J-type photoreceptor, the ratio $E_{50\%}/E_{10\%}$ exceeds 5, because the charge generating efficiency and/or the charge transporting capability decrease as the strength of the electric filed drops.

On the other hand, although the ratio $E_{50\%}/E_{10\%}$ is 1 in an ideal S-type photoreceptor, the ratio $E_{50\%}/E_{10\%}$ is 1 to 5 in an ordinary S-type photoreceptor. The ratio $E_{50\%}/E_{10\%}$ of a photoreceptor suitable for use in a digitized electrophotographic apparatus is preferably 3 or less and more preferably 2 or less.

The ratio $E_{50\%}/E_{10\%}$ can be adjusted by, for example, inserting an intermediate layer such as a homogeneous charge transporting layer between the charge generating layer and the heterogeneous charge generating layer, and by changing the film thickness of the intermediate layer.

Figure 6:
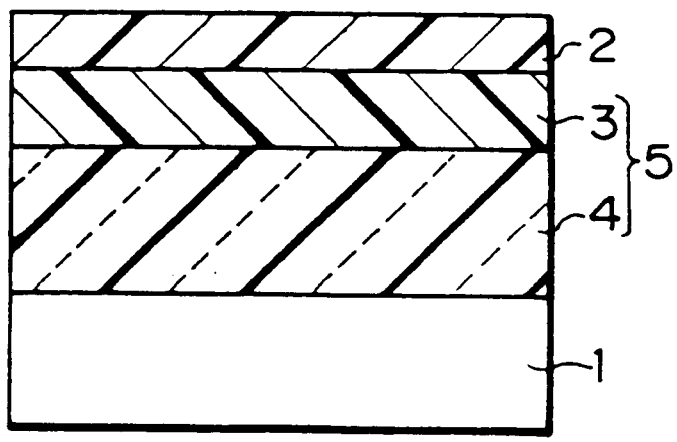
FIG. 6 is a cross-sectional view of an electrophotographic photoreceptor of a fourth embodiment of the present invention.
Figure 7:
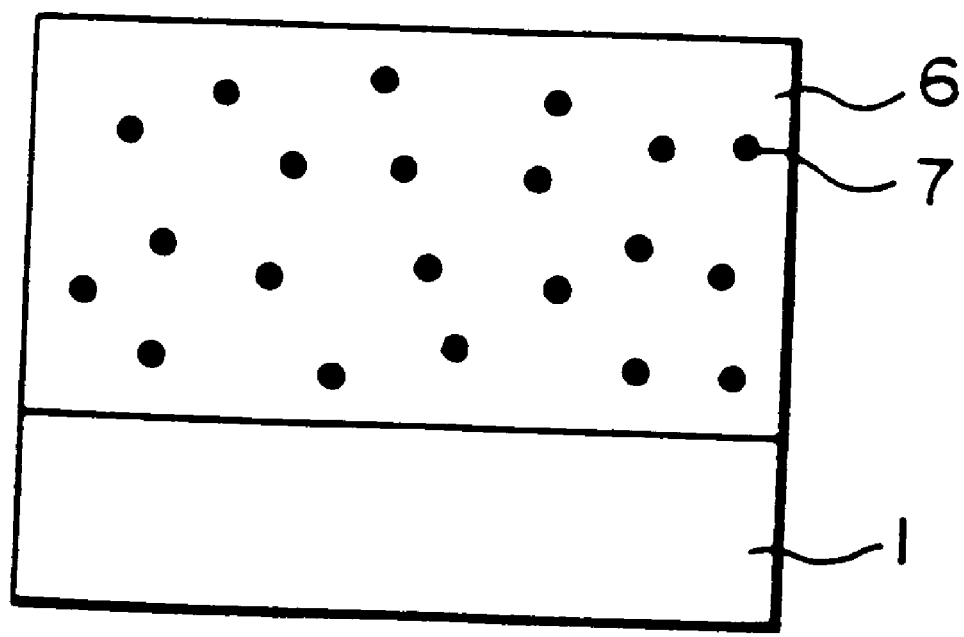
FIG. 7 is a cross-sectional view of an electrophotographic photoreceptor a fifth embodiment of the present invention.

FIGS. 3 to 7 show, respectively, the above-described 1st to 5th embodiments of the electrophotographic photoreceptor of the present invention. As shown in FIG. 3, the electrophotographic photoreceptor comprises an electroconductive substrate 1, a charge generating layer 2 which is formed on the electroconductive substrate 1 and generates a photoelectric charge and a heterogeneous charge transporting layer 3 formed on the charge generating layer 2. As shown in FIG. 4, the electrophotographic photoreceptor comprises an electroconductive substrate 1, a charge generating layer 2 formed on the electroconductive substrate 1, a heterogeneous charge transporting layer 3 formed on the charge generating layer 2 and a homogeneous charge transporting layer 4 formed on the heterogeneous charge transporting layer 3. As shown in FIG. 5, the electrophotographic photoreceptor comprises an electroconductive substrate 1, a heterogeneous charge transporting layer 3 formed on the electroconductive substrate 1 and a charge generating layer 2 formed on the heterogeneous charge transporting layer 3. As shown in FIG. 6, the electrophotographic photoreceptor comprises an electroconductive substrate 1, a homogeneous charge transporting layer 4 formed on the electroconductive substrate 1, a heterogeneous charge transporting layer 3 formed on the homogeneous charge transporting layer 4, and a charge generating layer 2 formed on the heterogeneous charge transporting layer 3. As shown in FIG. 7, the electrophotographic photoreceptor comprises an electroconductive substrate 1, and formed thereon a heterogeneous charge transporting layer 6 in which a charge generating material 7 designed for the generation of charge is dispersed.

The electrophotographic photoreceptor of the present invention can be mounted in any electrophotographic apparatus in which exposure is carried out based on a digitized image signal. By an electrophotographic apparatus in which exposure is carried out based on a digitized image signal, is meant an electrophotographic apparatus in which a light source such as a laser or LED is used and exposure is carried out by means of a binary light or a many-valued light which has undergone a pulse-width modulation or a strength modulation. Examples of the electrophotographic apparatus include an LED printer, a laser printer and a digital copying machine based on a laser-exposure system.

Meanwhile, for the purpose of initializing the photoreceptor after development, or for the purpose of stabilizing the electrophotographic properties, an additional light source can be used along with the exposure light source for forming the image. The wavelength region of the additional light source may or may not be absorbed in the heterogeneous charge transporting layer, but it is preferable that the light reach at least the charge generating layer.

Figure 8:
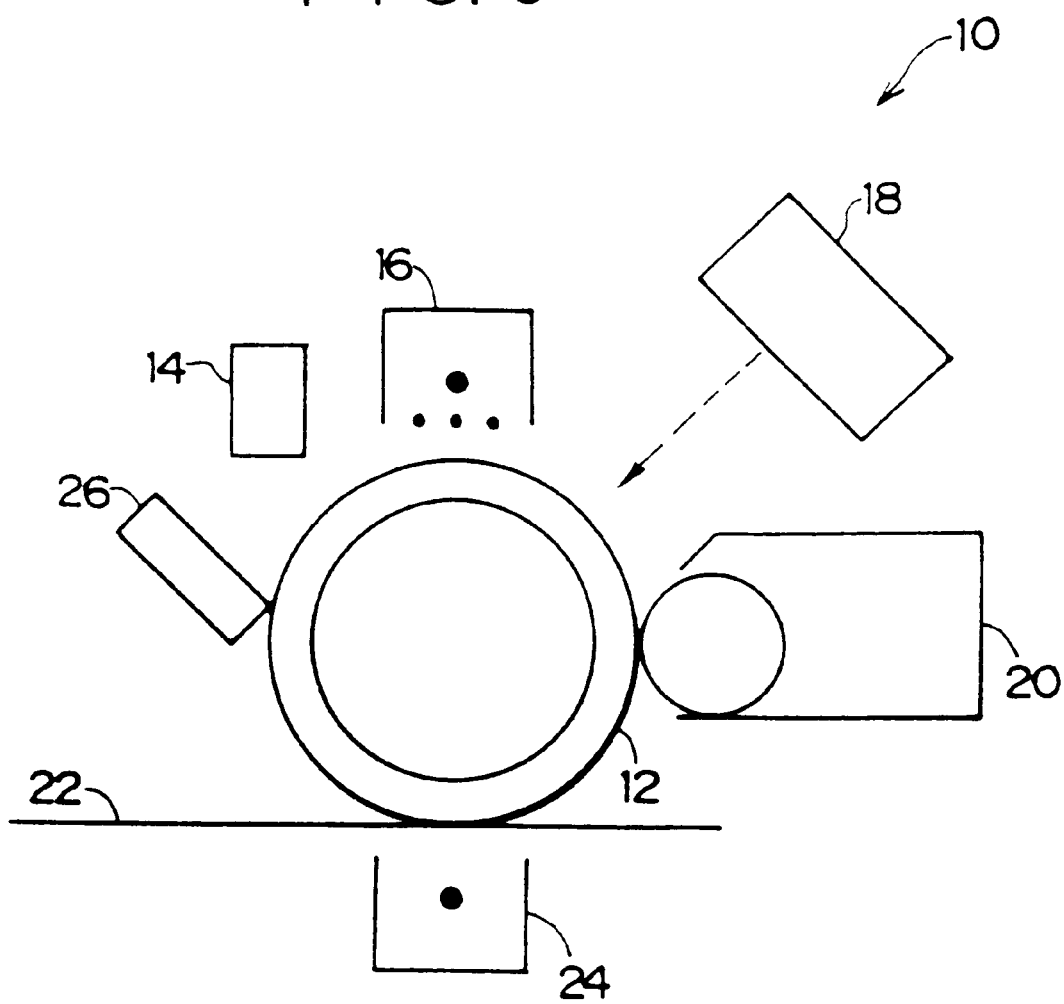
FIG. 8 is a schematic structural diagram illustrating an electrophotographic apparatus in which an electrophotographic photoreceptor of the present invention is mounted and in which an image is formed based on a digitally processed image signal.

As an example of electrophotographic apparatus of the present invention, FIG. 8 illustrates a schematic diagram of a laser printer 10. The laser printer 10 comprises a cylindrical photoreceptor drum 12 as an electrophotographic photoreceptor of the present invention. The photoreceptor drum 12 has on the periphery thereof, in the order following, a pre-exposure light source (red LED) 14 for the removal of residual charge of the photoreceptor drum 12, a charging scorotron 16 for charging the photoreceptor drum 12, an exposing laser optical system 18 for exposure of the photoreceptor drum 12 based on an image signal, a developer 20 for adhering toner to an electrostatic latent image formed on the photoreceptor drum 12, a corotron 24 as a transferring means for the transfer of the toner image on the photoreceptor drum 12 to a sheet of paper 22, and a cleaning blade 26 for removal of the toner remaining on the photoreceptor drum 12.

The exposing laser optical system 18 has a laser diode (for example, a generated wavelength of 780 nm) which emits a laser light based on a digitally processed image signal, a polygon mirror which deflects the radiated laser light, and a lens system capable of passing the laser light in a predetermined size at a constant speed.

A mixture of 100 g of 3,3'-dimethyl-N,N'-bis(p,m-dimethylphenyl)-N,N-bis[4-(2-methoxycarbonylethyl)phenyl]-[1,1'-biphenyl]-4,4'-diamine, 200 g of ethylene glycol and 5 g of titanium tetrabutoxide was heated at reflux for 3 hours under a nitrogen gas stream. Then, after the confirmation of the consumption of the 3,3'-dimethyl-N,N'-bis(p,m-dimethylphenyl)-N,N-bis[4-(2-methoxycarbonylethyl)phenyl]-[1,1'-biphenyl]-4,4'-diamine, the ethylene glycol was distilled off while the reaction mixture was being heated to 230° C. at a reduced pressure of 0.5 mm Hg, and the reaction mixture was kept at that temperature for 3 hours to continue the reaction. The reaction mixture was then cooled down to room temperature, and the resultant insoluble matter was dissolved by the addition of methylene chloride to produce a solution. By use of acetone, a precipitate was produced from the solution, and this precipitate provided 90 g of a charge transporting polymer which had at both ends thereof a hydroxyl group and which was represented by the following general formula (1). The weight average molecular weight was measured by means of GPC and NMR and the molecular weight was found to be $2.4 \times 10^4$.

Structural Formula (1)

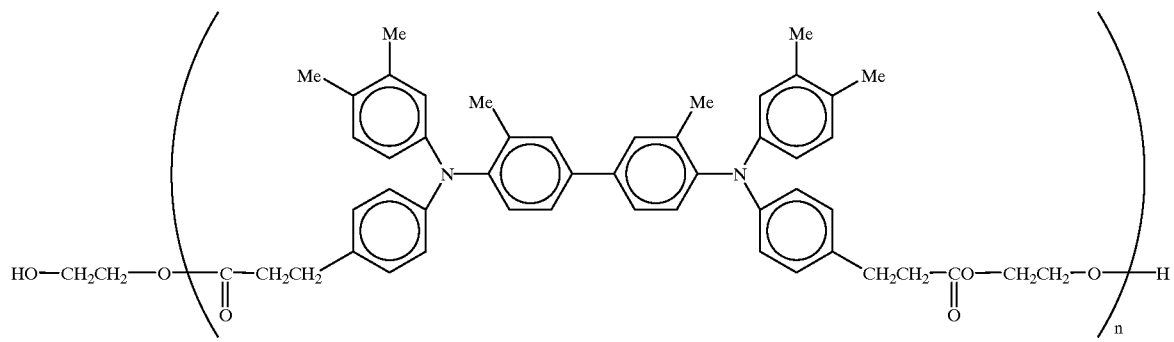

EXAMPLES

The present invention is explained by way of the following examples. However, it must be noted that the present invention is not limited to these examples, and those skilled in the art will be able to alter the examples based on known teachings of the synthetic chemistry of polymers and electrophotographic technologies.

Synthesis 1
(synthesis of a reactive polymerization initiator 4,4'-azobis (4-cyano-valeroyl chloride))

100 g of 4,4'-azobis(4-cyano-valeric acid) was gradually added to 220 ml of ice-cooled thionyl chloride. The reaction mixture was heated at 30° C. for 6 hours and the excess of the thionyl chloride was distilled off at reduced pressure. The residue was subjected to recrystallization using chloroform and 42 g of crystals of 4,4'-azobis(4-cyano-valeroyl chloride) was obtained.

Synthesis 2
(synthesis of a charge transporting polymer having at both ends thereof a hydroxyl group)

Synthesis 3 (Example 1)
(synthesis of a block copolymer represented by the structural formula (2) given below)

72 g of the charge transporting polymer having at both ends thereof a hydroxyl group which was obtained in Synthesis 2, and 1.8 g of triethylamine were dissolved in 140 ml of toluene, and the solution was cooled down to 0° C. To the solution was added dropwise a liquid prepared by suspending 9.5 g of the 4,4'-azobis(4-cyano-valeroyl chloride) which was obtained in Synthesis 1 in 25 ml of toluene. The resultant reaction mixture was allowed to react for 1 hour at room temperature. Then, the reaction mixture was heated up to 30° C., and kept at that temperature for 6 hours to continue the reaction. After that, the reaction mixture was added dropwise to methanol, and the resultant mixture was agitated for 1 hour and was then filtered. This precipitation/filtering operation was further repeated twice. The residue was dried, and 68 g of a charge transporting polymer having at both ends thereof an azo-type initiator, was obtained.

1.0 g of the thus obtained charge transporting polymer having at both ends thereof an azo-type initiator, and 2.0 g of styrene monomer were dissolved in 3 ml of toluene, and the atmosphere of the reaction vessel was replaced with nitrogen. Then, the solution was heated to 65° C., and kept at that temperature for 95 hours. After that, the solution was added dropwise to methanol, and the resultant mixture was agitated for 1 hour and then filtered.

of this example was found to be in a state of micro phase separation as a result of observation by a TEM.

Structural Formula (2)

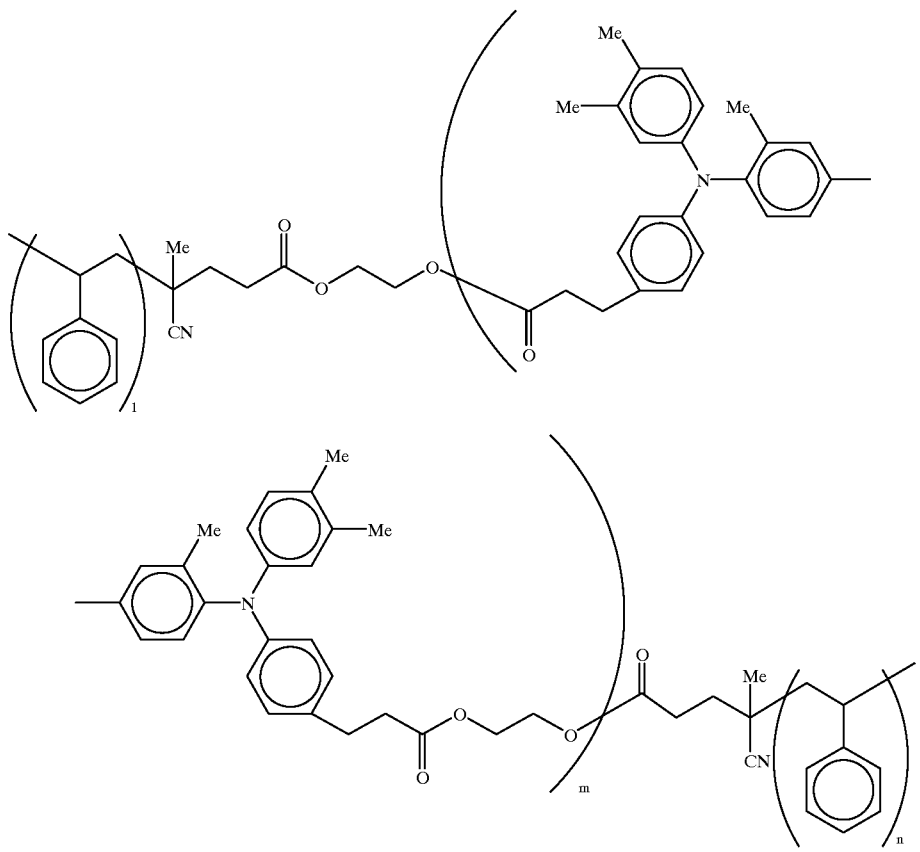

Since the obtained solid substance was a mixture of the block copolymer as a target product and a styrene homopolymer (polystyrene), the styrene homopolymer was removed by a purifying method utilizing the difference in solubility as described below, and, as a result, the desired block copolymer was obtained. That is, the reaction mixture was dissolved in toluene in which both of the charge transporting polymer of Synthesis 2 and the polystyrene were easily soluble. The resultant solution was then added dropwise to cyclohexane in which the charge transporting polymer of Synthesis 2 was insolublebutthepolystyrenewassoluble. By reprecipitating in this way, 1.5 g of the desired block copolymer was obtained.

Figure 9:
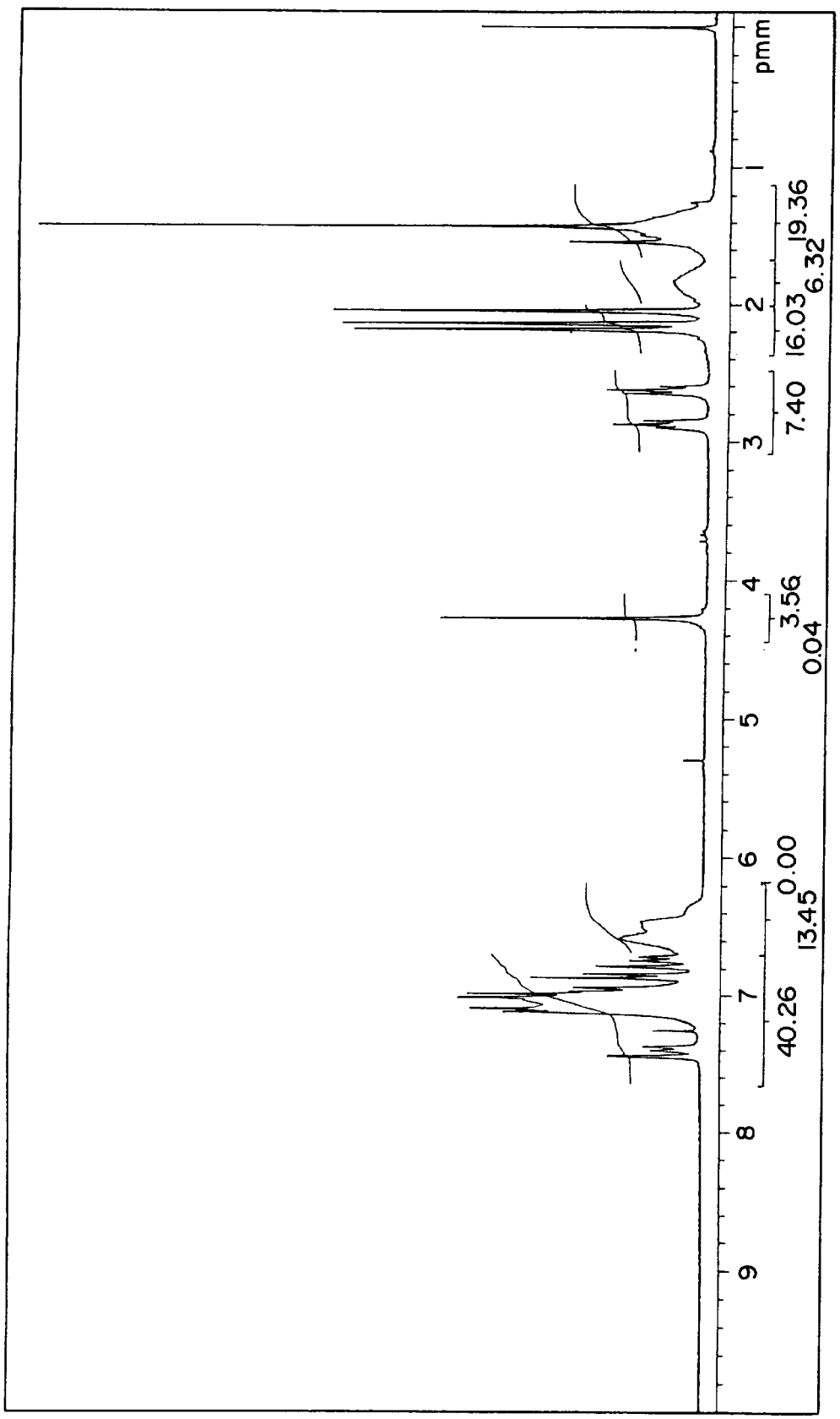
FIG. 9 is an $^1$H-NMR spectrum of the block copolymer of Example 1.

FIG. 9 shows the $^1$H-NMR spectrum of the obtained block copolymer. The weight ratio between a charge transporting block and an insulating block which is a styrene polymer is calculated as approximately 55:45, from the ratio between the integrals of peaks corresponding to protons inherent in the two blocks. Since the weight average molecular weight of the charge transporting block of Synthesis 2 is $2.4 \times 10^4$, the weight average molecular weight of the insulating block is calculated as $1.0 \times 10^4$. Besides, the glass transition temperature of the polystyrene constituting the insulating block of the block copolymer is 100° C., and the glass transition temperature of the charge transporting block of Synthesis 2 constituting the charge transporting block of the block copolymer of this example is 110° C. The block copolymer Synthesis 4 (Example 2)
(synthesis of a block copolymer represented by the structural formula (3) given below)

43 g of the charge transporting polymer having at both ends thereof a hydroxyl group which was obtained in Synthesis 2, and 0.5 g of triethylamine were dissolved in 120 ml of dichloromethane, and the solution was cooled to 0° C. To the solution was added dropwise a solution prepared by dissolving 5.6 g of the 4,4'-azobis(4-cyano-valeroyl chloride) which was obtained as described previously, in 20 ml of dichloromethane. The resultant reaction mixture was allowed to react for 1 hour at room temperature. Then, the reaction mixture was heated up to 30° C., and kept at that temperature for 4 hours to continue the reaction. Next, the solvent was distilled off to provide a residue. Tetrahydrofuran was added to dissolve the residue. The solution obtained was added dropwise to methanol, and the resultant mixture was agitated for 1 hour and thereafter filtered. This precipitation/filtering operation was further repeated twice. The residue was dried, and 41 g of a charge transporting polymer having at both ends thereof an azo-type initiator was obtained.

5.5 g of the thus obtained charge transporting polymer having at both ends thereof an azo-type initiator, and 5.5 of n-dodecyl methacrylate were dissolved in 120 ml of toluene, and the atmosphere of the reaction vessel was replaced with nitrogen. Then, the reaction mixture was heated up to 60° C., and kept at that temperature for 65 hours. Next, the solvent was distilled off to provide a residue. Tetrahydrofuran was added to dissolve the residue. The solution obtained was added dropwise to methanol, and the resultant mixture was agitated for 1 hour and was then filtered. The solid substance obtained was well washed with n-hexane which is a good solvent for poly(n-dodecyl methacrylate), and 6.3 g of a block copolymer as the desired product was obtained.

Figure 10:
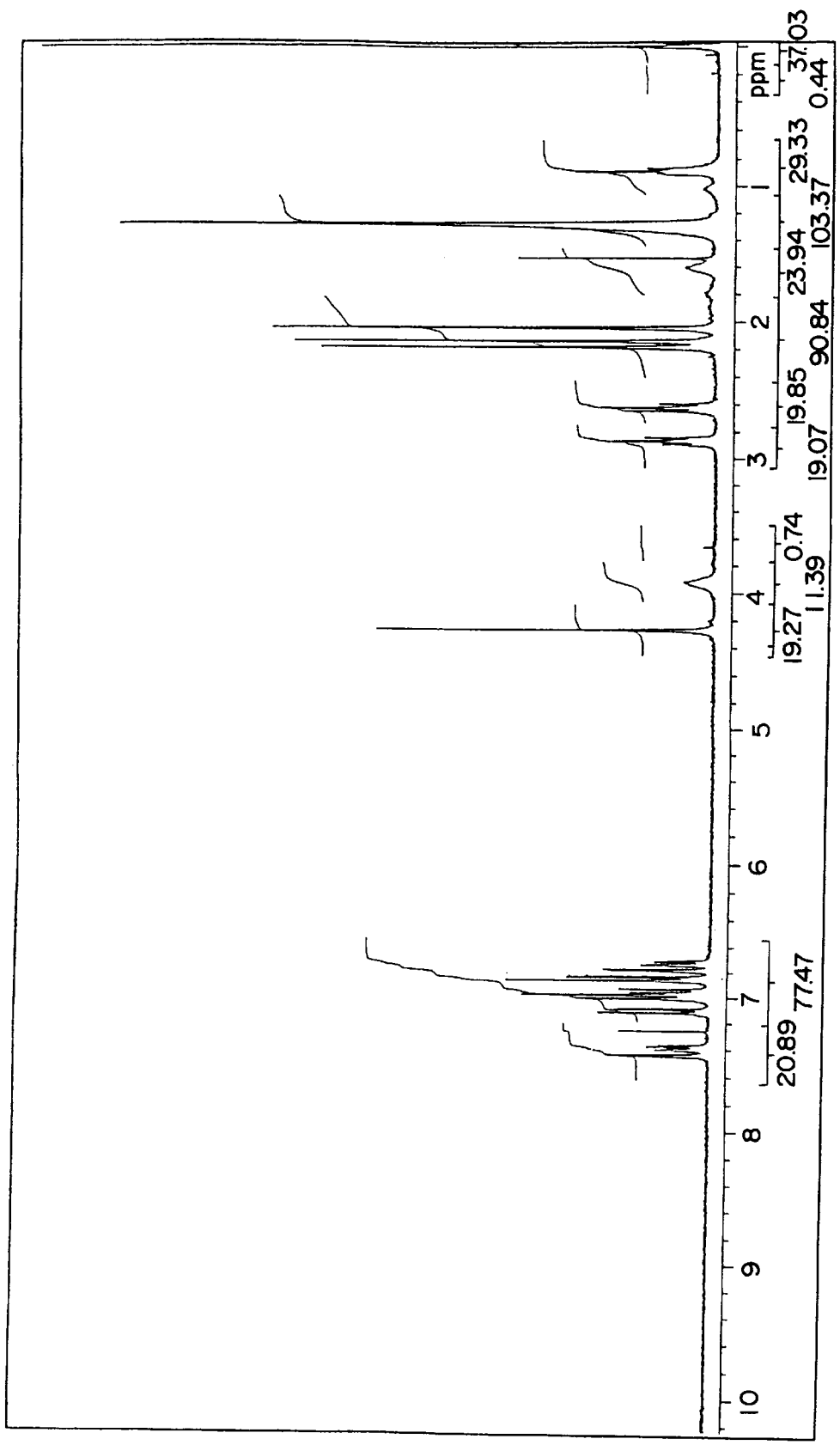
FIG. 10 is an H-NMR spectrum of the block copolymer of Example 2.

FIG. 10 show the H-NMR spectrum of the block copolymer obtained. The weight ratio between a charge transporting block and an insulating block which is a polymer of n-dodecyl methacrylate is calculated as approximately 70:30 from the ratio between the integrals of peaks corresponding to protons inherent in each of the two blocks. As in Example 1, the weight average molecular weight of the charge transporting block and that of the insulating block in the block copolymer of this example, are calculated as $2.4 \times 10^4$ and $5.1 \times 10^3$, respectively. Besides, the glass transition temperature of the poly(n-dodecyl methacrylate) constituting the insulating block of the block copolymer is −65° C., and the glass transition temperature of the charge transporting block of Synthesis 2 constituting the charge transporting block of the block copolymer of this example is 110° C. The block copolymer of this example was found to be in a state of micro phase separation as a result of observation by a TEM.

Synthesis 5 (Example 3)
(synthesis of a block copolymer represented by the structural formula (4) given below)

Figure 11:
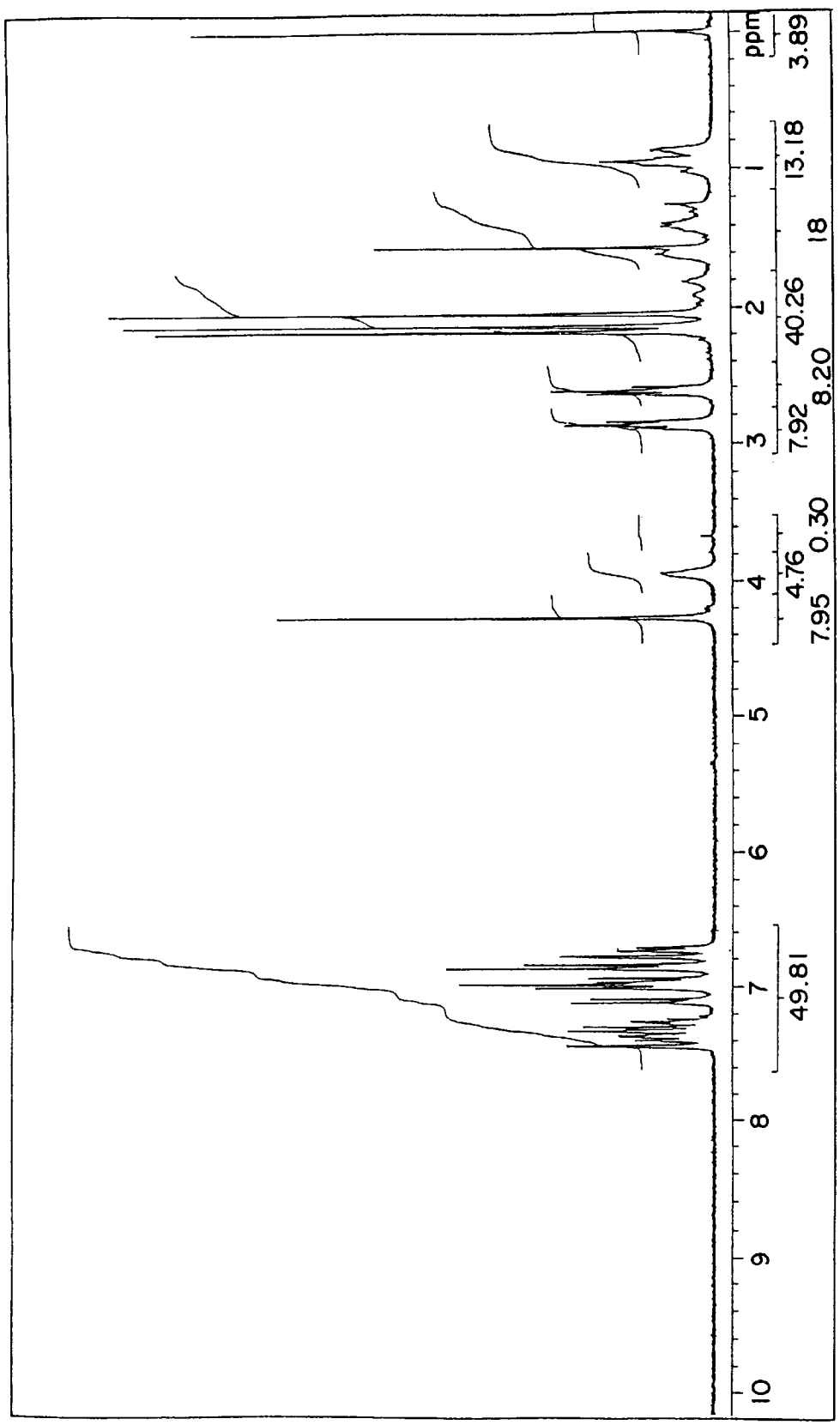
FIG. 11 is an $^1$H-NMR spectrum of the block copolymer of Example 3.

10 g of the charge transporting polymer having at both ends thereof an azo-type initiator which was obtained in Example 2, and 20 g of n-butyl methacrylate were dissolved in 100 ml of tetrahydrofuran, and the atmosphere of the reaction vessel was replaced with nitrogen. Then, the solution was heated to 60° C., and kept at that temperature for 65 hours. The solution was added dropwise to methanol, and the resultant mixture was agitated for 1 hour and was then filtered. The solid substance obtained was well washed with n-hexane which is a good solvent for poly(n-butyl methacrylate), and 6 g of a block copolymer as the desired product was obtained. FIG. 11 show the $^1$H-NMR spectrum of the obtained block copolymer. The weight ratio between the charge transporting block and the insulating block, which is a polymer of n-butyl methacrylate, is calculated as approximately 80:20 from the ratio between the integrals of peaks corresponding to protons inherent in each of the two blocks. As in Example 1, the weight average molecular weight of the charge transporting block and that of the insulating block in the block copolymer of this example are calculated as $2.4 \times 10^4$ and $3.0 \times 10^3$, respectively. Additionally, the glass transition temperature of the poly(n-butyl methacrylate) constituting the insulating block of the block copolymer is 20° C., and the glass transition temperature of the charge transporting block of Synthesis 2, which constitutes the charge transporting block of the block Structural Formula (3)

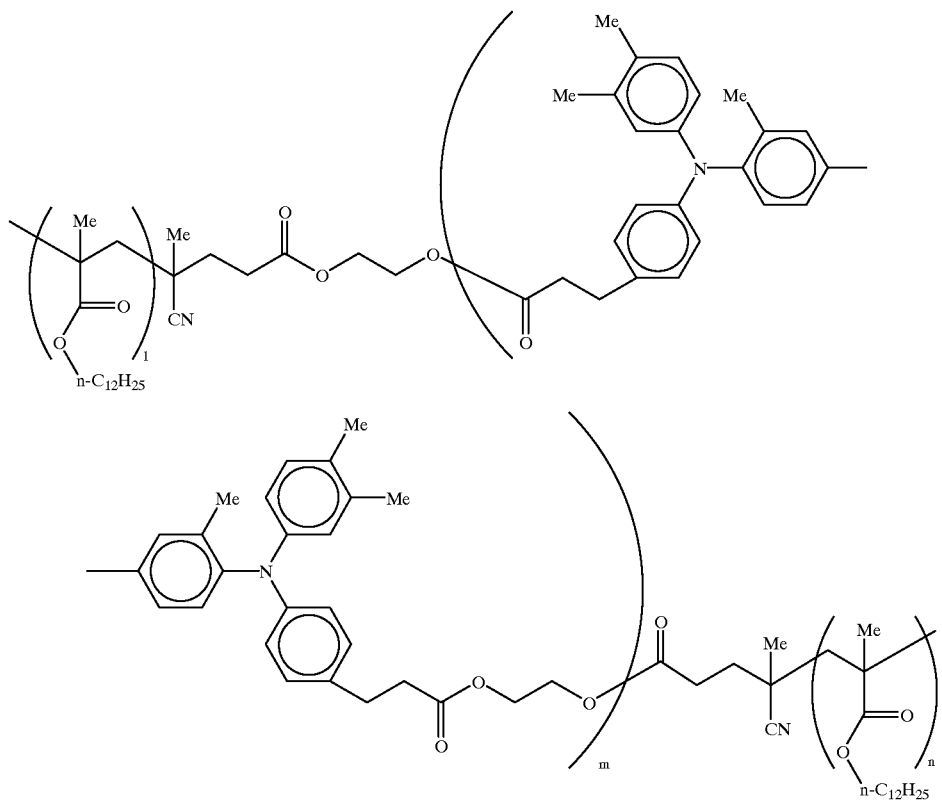

copolymer of this example, is 110° C. The block copolymer of this example was found to be in a state of micro phase separation as a result of observation by a TEM.

block and an insulating block, which is a random polymer of tert-butyl methacrylate and 2-hydroxyethyl methacrylate, is calculated as approximately 60:40 from the ratio between the integrals of peaks corresponding to protons inherent in each of the two blocks. In the same way, the proportion of the repeating units derived from the 2-hydroxyethyl methacrylate in the insulating block is calculated from the $^1$H-NMR spectrum as approximately 10% by weight. As in Example 1, the weight average molecular weight of the charge transporting block, and that of the insulating block in the block copolymer of this example, are calculated as $2.4 \times 10^4$ and $8.0 \times 10^3$, respectively. Besides, the glass transition temperature of the poly(tert-butyl methacrylate), which constitutes the insulating block of the block copolymer, is 107° C., and the glass transition temperature of the charge transporting block of Synthesis 2, which constitutes the charge transporting block of the block copolymer of this example, is 110° C. The block copolymer of this example was found to be in a state of micro phase separation as a result of observation by a TEM.

Structural Formula (4)

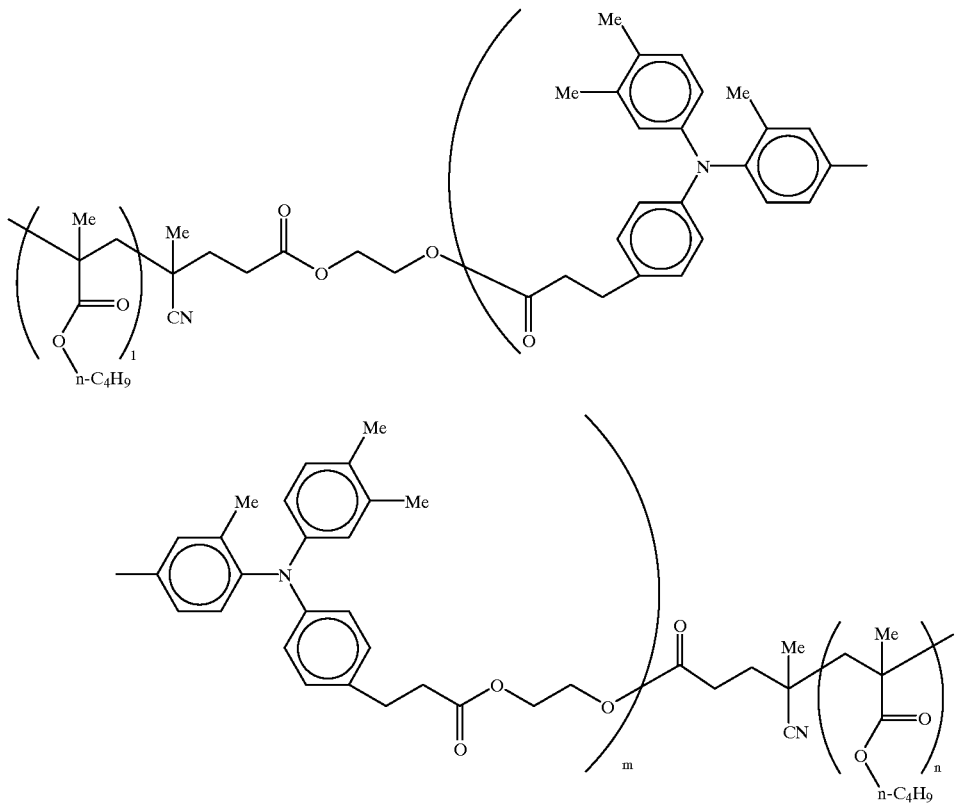

Synthesis 6 (Example 4)

(synthesis of a block copolymer represented by the structural formula (5) given below)

Figure 12:
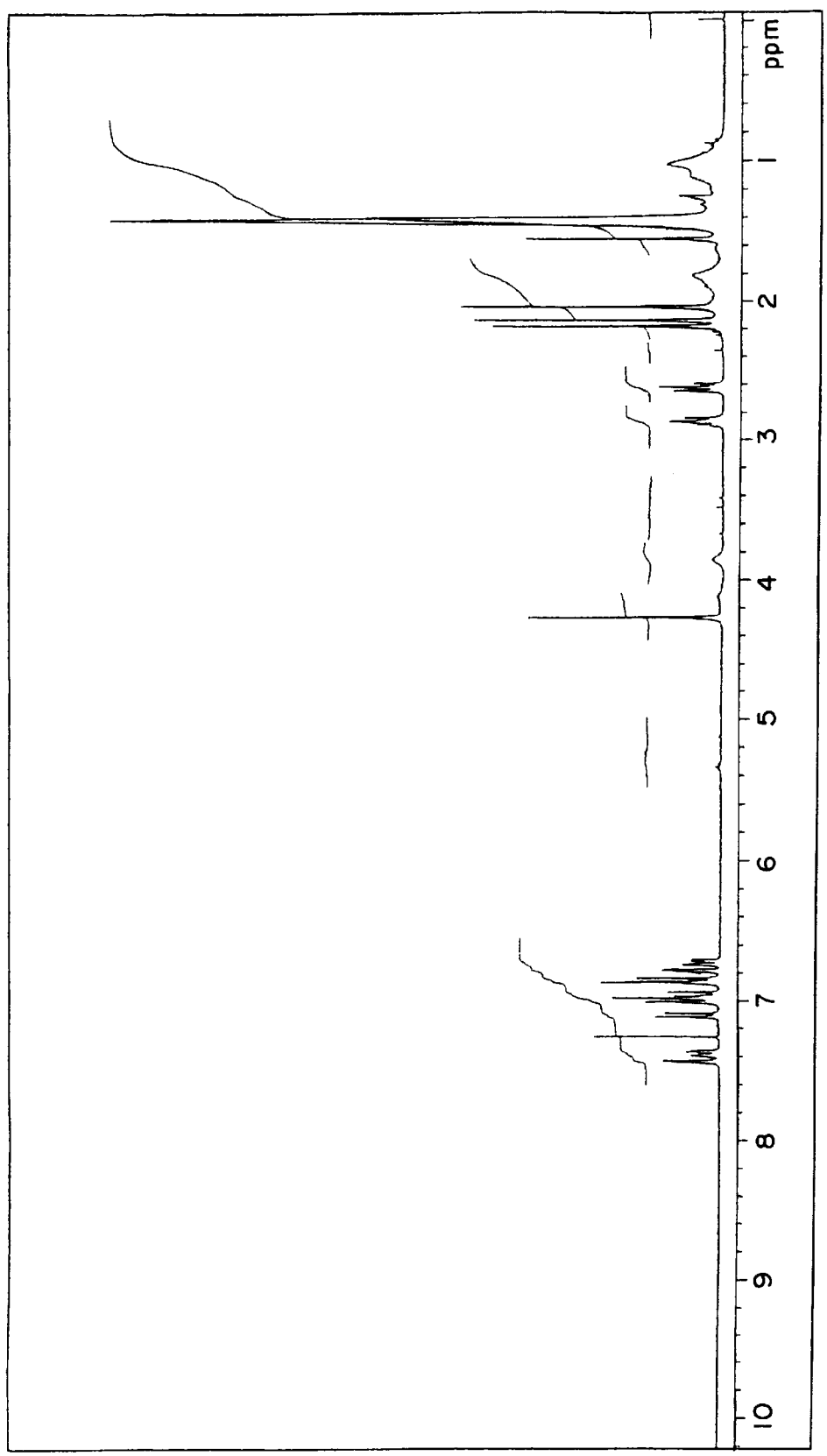
FIG. 12 is an $^1$H-NMR spectrum of the block copolymer of Example 4.

16.5 g of the charge transporting polymer having at both ends thereof an azo-type initiator which was obtained in Example 1, 24.3 g of tert-butyl methacrylate, and 2.7 g of 2-hydroxyethyl methacrylate were dissolved in 390 ml of toluene, and the atmosphere of the reaction vessel was replaced with nitrogen. Then, the solution was heated to 60° C., and kept at that temperature for 95 hours. The solution was added dropwise to methanol, and the resultant mixture was agitated for 1 hour and thereafter filtered. The obtained solid substance was well washed with n-butanol, and 25 g of a block copolymer as the desired product was obtained. FIG. 12 show the $^1$H-NMR spectrum of the block copolymer obtained. The weight ratio between a charge transporting Structural Formula (5)

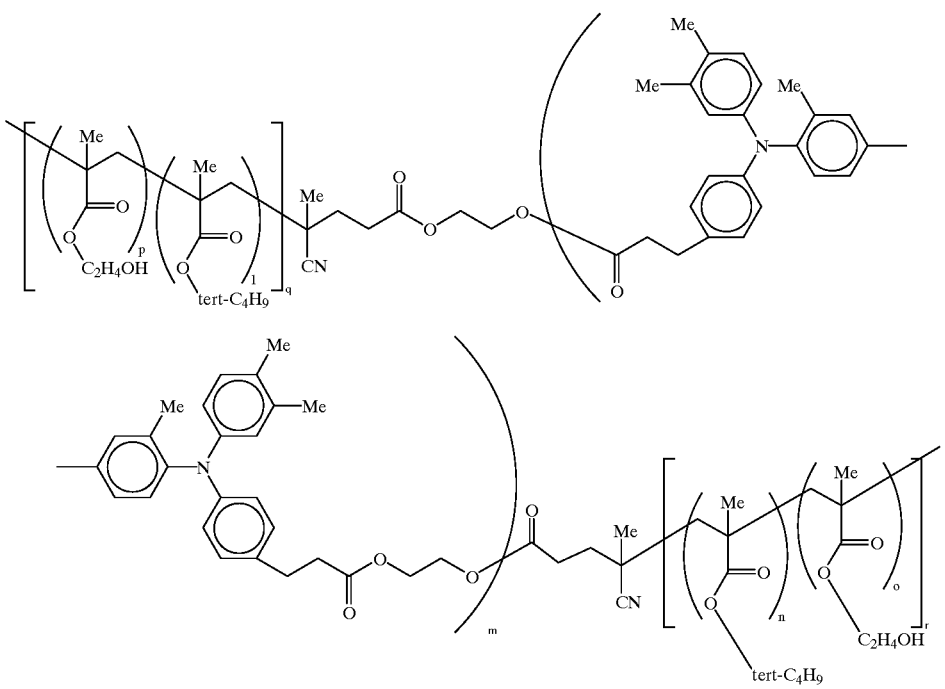

Synthesis 7 (Example 5)
(synthesis of a block copolymer represented by the structural formula (6) given below)

Figure 13:
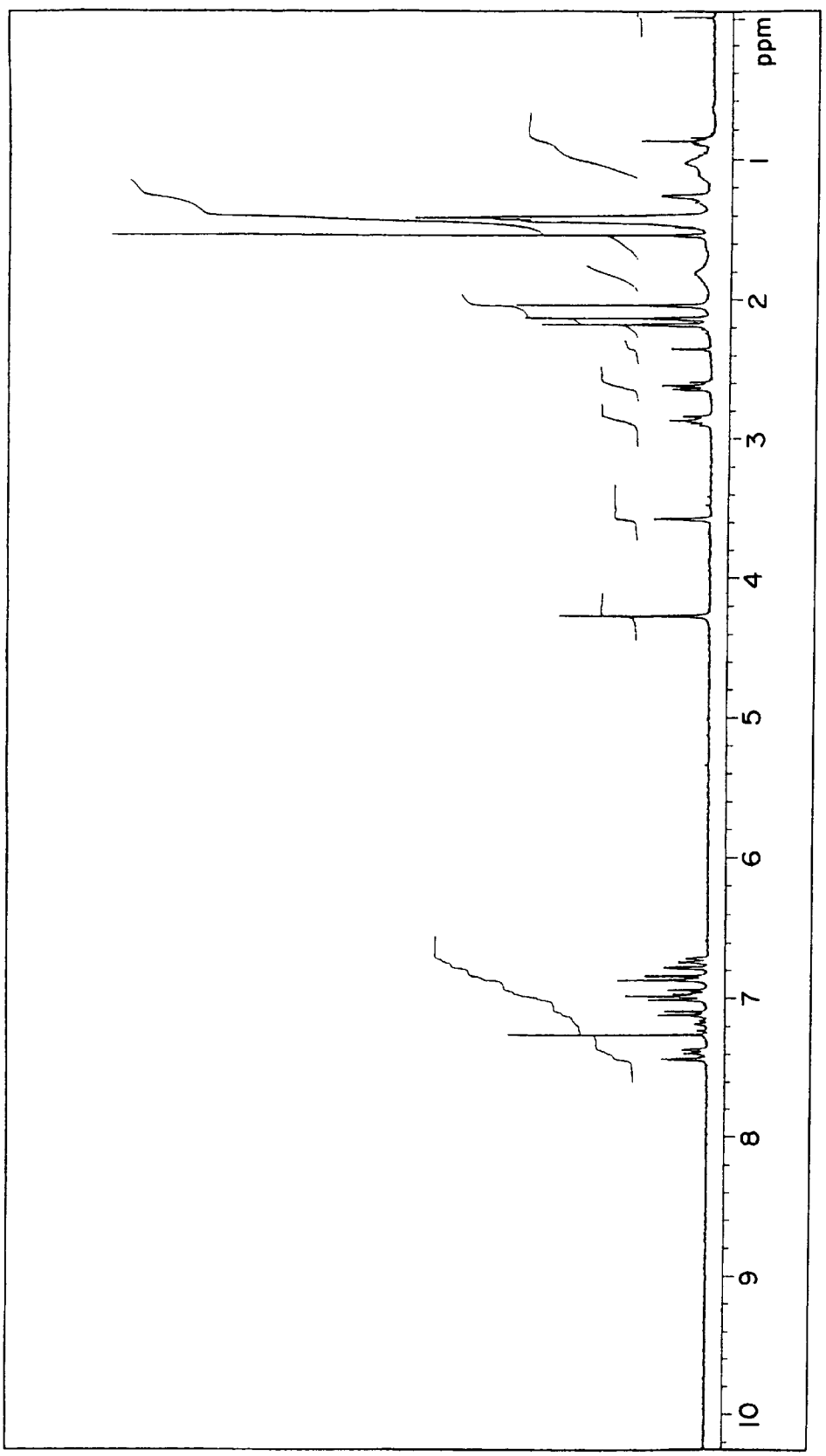
FIG. 13 is an $^1$H-NMR spectrum of the block copolymer of Example 5.

16.5 g of the charge transporting polymer having at both ends thereof an azo-type initiator which was obtained in Example 1, 24.3 g of tert-butyl methacrylate, and 2.7 g of 3-trimethoxysilylpropyl methacrylate, were dissolved in 390 ml of tetrahydrofuran, and the atmosphere of the reaction vessel was replaced with nitrogen. Then, the solution was heated to 60° C., and kept at that temperature for 95 hours. The solution was added dropwise to methanol, and the resultant mixture was agitated for 1 hour and thereafter filtered. The obtained solid substance was well washed with cyclohexane, and 23 g of a block copolymer as the desired product was obtained. FIG. 13 show the $^1$H-NMR spectrum of the obtained block copolymer. The weight ratio between a charge transporting block and an insulating block, which is a random polymer of tert-butyl methacrylate and 3-trimethoxysilylpropyl methacrylate, is calculated as approximately 60:40 from the ratio between the integrals of peaks corresponding to protons inherent in each of the two blocks. In the same way, the proportion of the repeating units derived from the 3-trimethoxysilylpropyl methacrylate in the insulating block, is calculated from the $^1$H-NMR spectrum as approximately as 10% by weight. As in Example 1, the weight average molecular weight of the charge transporting block, and that of the insulating block in the block copolymer of this example, are calculated as $2.4 \times 10^4$ and $8.0 \times 10^3$, respectively. Besides, the glass transition temperature of the poly(tert-butyl methacrylate), which constitutes the main part of the insulating block of the block copolymer, is 107° C., and the glass transition temperature of the charge transporting block of Synthesis 2, which constitutes the charge transporting block of the block copolymer of this example, is 110° C. The block copolymer of this example was found to be in a state of micro phase separation as a result of observation by a TEM.

Structural Formula (6)

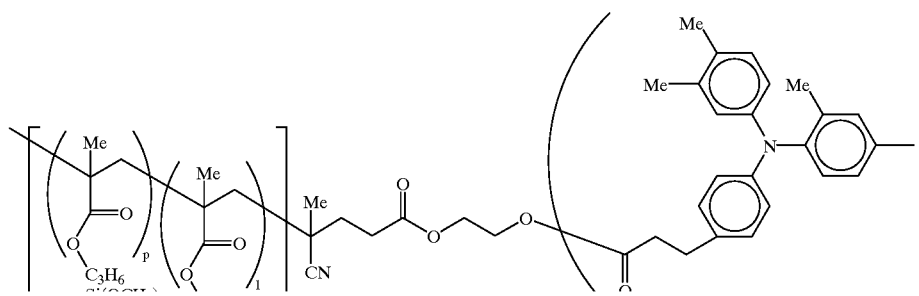

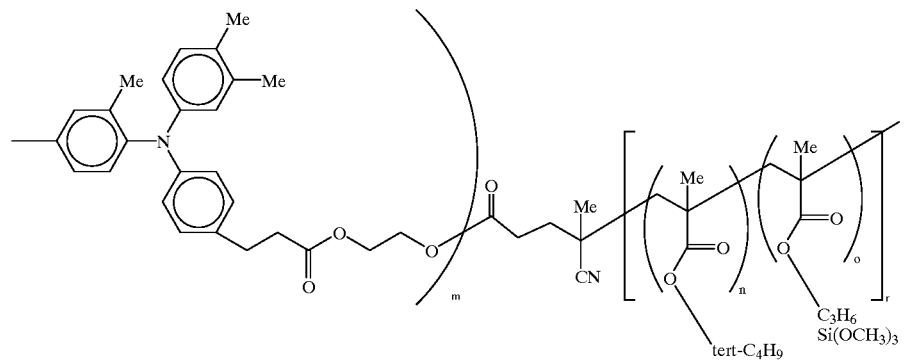

Synthesis 8 (Example 6)
(synthesis of a three-dimensionally crosslinked copolymer composed of the block copolymer represented by the structural formula (5) and a polyvalent isocyanate)

10 g of a copolymer comprising a charge transporting block, which was composed of the charge transporting copolymer of Synthesis 2 obtained in Example 4, and an insulating block, which was composed of a random polymer of tert-butyl methacrylate and 2-hydroxyethyl methacrylate, and 0.9 g of diphenylmethane-4,4'-diisocyanate ("Millionate MT", manufactured by Nippon Polyurethane Industry Co., Ltd.) were dissolved in 90 g of cyclohexanone. The solution was coated on a plate of glass by means of immersion, and the coating was heated at 150° C. for 1 hour so as to link the hydroxyl groups derived from the 2-hydroxyethyl methacrylate by means of the diphenylmethane-4,4'-diisocyanate, which is a divalent isocyanate, and as a result, the desired three-dimensionally crosslinked polymer was obtained. The curing of the film by crosslinking was evidenced by the fact that the film after the above-mentioned heat processing was not dissolved by cyclohexanone despite swelling being observed.

Further examples are given below in order to confirm the usefulness of the copolymers obtained in the preceding examples. Application of the charge transporting copolymers of the present invention is not limited to the following examples, but the charge transporting copolymers of the present invention can be applied to any electronic device which requires a charge transporting function.

Application 1 (Example 7)

An aluminum drum having a diameter of 40 mm, which had undergone a honing process, was coated by means of immersion in a solution comprising 23 parts by weight of a zirconium alkoxide compound ("Orgatics ZC 540" manufactured by Matsumoto Pharmaceutical Manufacturing Co., Ltd.), 3 parts by weight of a silane compound ("A1100" manufactured by Nippon Unicar Co., Ltd.), 1 part by weight of a polyvinyl butyral resin ("Eslec BM-S" manufactured by Sekisui Chemical Co., Ltd.), 25 parts by weight of isopropanol, and 25 parts by weight of butanol. The coating was heated at 170° C. for 15 minutes, and thus a subbing layer having a thickness of 1 μm was formed. On the other hand, 4 parts by weight of fine chlorogallium phthalocyanine crystals exhibiting strong diffraction peaks at least at Bragg angles (2θ±0.2°) of 7.4°, 16.6°, 25.5° and 28.3° in X-ray diffraction spectrum using CuKα as the X-ray source, 2 parts by weight of a vinyl chloride/vinyl acetate copolymer ("UCAR Solution Vinyl Resin VMCH" manufactured by Union Carbide Corporation), 67 parts by weight of xylene, and 33 parts by weight of butyl acetate were mixed with glass beads, and the mixture was shaken in a paint shaker for 2 hours to obtain a dispersion. The dispersion was coated on the subbing layer by means of immersion. The coating was heated at 100° C. for 10 minutes, and thus a charge generating layer having a thickness of 0.3 μm was formed.

Then, a solution, which was obtained by dissolving 10 parts by weight of the block copolymer obtained in Example 3 in 90 parts by weight of chlorobenzene, was coated on the charge generating layer by means of immersion. The coating was heated at 135° C. for 60 minutes, and thus a charge transporting layer having a thickness of 20 μm was formed.

The multilayer electrophotographic photoreceptor obtained above was mounted in a laser printer ("Laser Press 4105" manufactured by Fuji Xerox Co., Ltd.), and a printing test was conducted. In the test, in order to obtain an optimal exposure amount, an ND filter was inserted in the pathway of the laser light, and the strength of the exposure light was adjusted The evaluation of the quality of the image was performed by visually inspecting the first print and the 5,000th print after continuous printing. The quality of print was good, and the durability was also good because no difference was observed between the first print and the 5,000th print.

The block copolymer obtained in Example 1 was also used for the preparation of an electrophotographic photoreceptor in the same way as that described above, and evaluated also in the same way as that described above, with the same result being obtained. In addition, the block copolymer obtained in Example 2 was also used for the preparation of a electrophotographic photoreceptor in the same way as that described above, and evaluated also in the same way as that described above, with the result being that, although the quality of the image in the initial stages was good, continuous printing caused imperfections such as a decrease in image density, fogging of the background, and streaky defects in the image. This is presumably because the glass transition temperature of the insulating block of the block copolymer obtained in Example 2 is as low as −65° C. and therefore the surface layer of the block copolymer was damaged due to the mechanical stress from the cleaning blade.

Application 2 (Example 8)

The procedure for preparing the laminate electrophotographic photoreceptor in Example 7 was repeated, except that the vinyl chloride/vinyl acetate copolymer as used therein as a resin for the charge generating layer, was replaced with a block copolymer obtained in Example 2, and a multilayer electrophotographic photoreceptor was obtained. As in Example 7, the photoreceptor obtained was mounted in the laser printer and the printing test was conducted. The quality of print was good, and the durability was also good because no difference was observed between the first print and the 5,000th print.

The block copolymers obtained in Examples 3 and 4 were also used for the preparation of an electrophotographic photoreceptor in the same way as that described above, and evaluated also in the same way as that described above, with the same results being obtained.

Application 3

10 parts by weight of dichlorotin phthalocyanine crystals exhibiting strong peaks at Bragg angles (2θ±0.2°) of 8.3°, 13.7° and 28.3° in X-ray diffraction spectrum using CuKα as the X-ray source, 10 parts by weight of the block copolymer obtained in Example 3, and 80 parts by weight of chlorobenzene were blended in a ball mill charged with stainless steel beads for 48 hours to produce a dispersion liquid. The dispersion liquid obtained was coated by means of immersion on an aluminum drum having a diameter of 40 mm. The coating was heated at 135° C. for 60 minutes., and thus a single-layer electrophotographic photoreceptor having a thickness of 20 μm was prepared.

As in Example 7, the thus obtained single-layer electrophotographic photoreceptor was mounted in the laser printer and the printing test was conducted. The quality of print was good, and the durability was also good because no difference was observed between the first print and the 5,000th print.

The block copolymers obtained in Examples 4 and 5 were also used for the preparation of a electrophotographic photoreceptor in the same way as that described above and evaluated also in the same way as that described above. And, the same results were obtained.

Application 4 (Example 9)

The aluminum drum which had a subbing layer and a charge generating layer coated thereon, and which was obtained in Example 7, was further coated by means of immersion in a solution prepared by dissolving 10 parts by weight of the block copolymer obtained in Example 4, and 1 part of a trivalent isocyanate represented by the structural formula (a) ("Smidule N3200" manufactured by Sumitomo Bayer Urethane Co., Ltd.) as a curing agent in 100 parts by weight of cyclohexanone. The coating was heated at 150° C. for 60 minutes, and a first charge transporting layer having a thickness of 3 μm was formed on the charge generating layer.

Next, the first charge transporting layer was further coated by means of immersion in a solution prepared by dissolving 20 parts by weight of a charge transporting compound having a low molecular weight represented by the following structural formula (b), and 30 parts by weight of a polycarbonate resin composed of a repeating unit represented by the following structural formula (c), in 200 parts by weight of toluene. In this way, a second charge transporting layer was prepared.

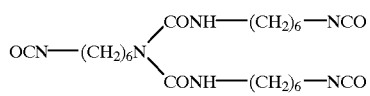

Structural Formula (a)

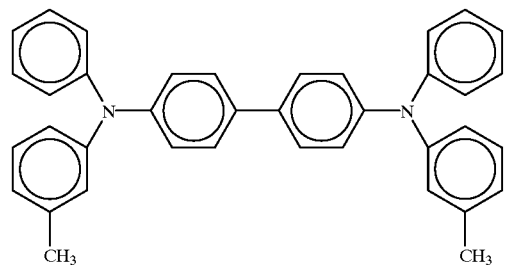

Structural Formula (b)

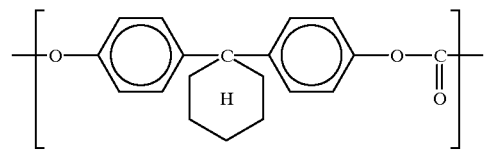

Structural Formula (c)

As in Example 7, the thus obtained multilayer electrophotographic photoreceptor was mounted in the laser printer and the printing test was conducted. The quality of print was good, and the durability was also good because no difference was observed between the first print and the 5, 000th print.

In the case where the first charge transporting layer was formed without the use of the above-mentioned isocyanate, a film defect occurred when the second charge transporting layer was formed, because the first charge transporting layer was attacked by the solvent used in forming the second charge transporting layer.

The block copolymer obtained in Example 5 was also used for the preparation of a electrophotographic photoreceptor in the same way as that described above, and evaluated also in the same way as that described above with the same result being obtained. In this case, however, curing agent was not used in forming the first charge transporting layer, but 1.0 part of acetic acid was used as a curing catalyst in place of the curing agent.

As is apparent from the foregoing results of Applications, the novel copolymers of the present invention were confirmed to exhibit the desired characteristics when used in an electrophotographic photoreceptor.

Synthesis 9 (Example 10)

A mixture of 100 g of N,N'-bis(p,m-dimethylphenyl)-N, N-bis[p-(2-methoxycarbonylethyl)phenyl]-[3,3'-dimethyl-1,1'-biphenyl]-4,4'-diamine, 200 g of ethylene glycol and 5 g of titanium tetrabutoxide was heated at reflux for 3 hours under a nitrogen gas stream. Then, after the confirmation of consumption of the N,N'-bis(p,m-dimethylphenyl)-N,N'-bis [p-(2-methoxycarbonylethyl)phenyl]-[3,3'-dimethyl-1,1'-biphenyl]-4,4'-diamine, the ethylene glycol was distilled off while the reaction mixture was being heating to 230° C. at a reduced pressure of 0.5 mm Hg, and the reaction mixture was kept at that temperature for 1 hour to continue the reaction. The reaction mixture was then cooled down to room temperature, and the resultant insoluble matter was dissolved by the addition of methylene chloride to produce a solution. By use of acetone, a precipitate was produced from the solution, and this precipitate provided 90 g of a prepolymer which had at both ends thereof a hydroxyl group. The weight average molecular weight of the prepolymer was measured by means of GPC and the molecular weight was found to be $2.4 \times 10^4$ (based on styrene).

43 g of the prepolymer obtained above and 0.5 g of triethylamine were dissolved in 120 ml of dichloromethane, and the solution was cooled down to 0° C. To the solution was added dropwise a solution prepared by dissolving 5.6 g of the 4,4'-azobis(4-cyano-valeryl chloride) which was obtained in Synthesis 1 in 20 ml of dichloromethane. The resultant reaction mixture was allowed to react for 1 hour at room temperature. Then, the reaction mixture was heated up to 30° C., and kept at that temperature for 4 hours to continue the reaction. After that, the solvent was distilled off, and tetrahydrofuran was added to dissolve the residue. The solution which was produced was added dropwise to methanol, and the resultant mixture was agitated for 1 hour and thereafter filtered This precipitation/filtering operation was further repeated twice. The residue was dried, and 41 g of a polymer having at both ends thereof an azo-type initiator was obtained.

6 g of the thus obtained polymer having at both ends thereof an azo-type initiator, and 8 g of n-dodecyl methacrylate were dissolved in 120 ml of toluene, and the atmosphere of the reaction vessel was replaced with nitrogen. Then, the solution was heated to 60° C., and kept at that temperature for 65 hours. After that, the solvent was distilled off, and tetrahydrofuran was added to dissolve the residue. The solution which was produced was added dropwise to methanol, and the resultant mixture was agitated for 1 hour and then filtered. The solid substance obtained was well washed with n-hexane, and poly(n-dodecyl methacrylate) as a by-product was removed. In this way, 10 g of a block copolymer having the structural formula (7) given below was obtained. Based on the $^1$H-NMR spectrum of the obtained block copolymer, the weight ratio between a charge transporting block, having a triarylamine structure, and an insulating block composed of poly(n-dodecyl methacrylate), was calculated as approximately 3:2. The weight average molecular weight of the insulating block was calculated as $0.8 \times 10^4$.

Structural Formula (7)

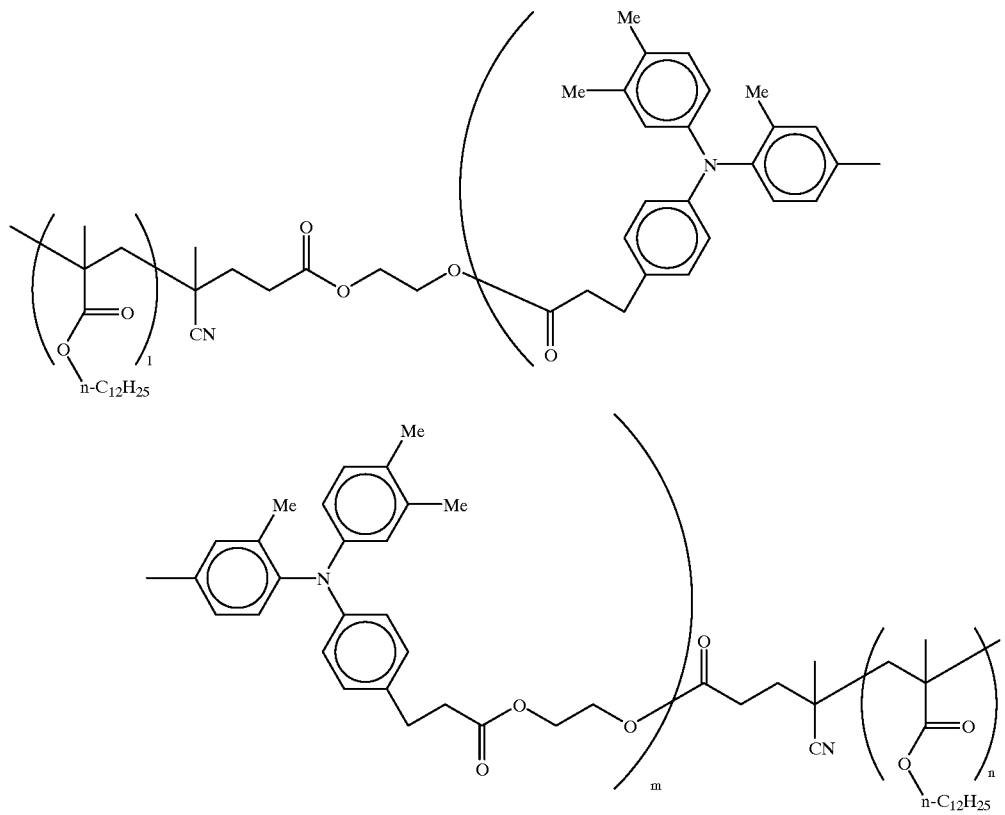

Synthesis 10 (Example 11)

The procedure of Example 10 was repeated, except that the N,N'-bis(p,m-dimethylphenyl)-N,N'-bis[p-(2-methoxycarbonylethyl)phenyl]-[3,3'-dimethyl-1,1'-biphenyl]-4,4'-diamine as used therein was replaced with N,N'-bis(p,m-dimethylphenyl)-N-(m,m'-bismethoxycarbonylethylphenyl)amine, and a block copolymer represented by the structural formula (8) given below was synthesized. The weight average molecular weight of the charge transporting prepolymer comprising a triarylamine structure was calculated as $8.1 \times 10^3$ (based on styrene). In the block copolymer finally obtained, the weight ratio between the charge transporting block and the insulating block was calculated as approximately 3:2. The weight average molecular weight of the insulating block was calculated as $2.7 \times 10^3$.

solution was cooled down to 0° C. To the solution was added dropwise a solution prepared by dissolving 4.5 g of the 4,4'-azobis(4-cyano-valeryl chloride) which was obtained in Synthesis 1 in 50 ml of toluene. The resultant reaction mixture was allowed to react for 1 hour at room temperature.

Structural Formula (8)

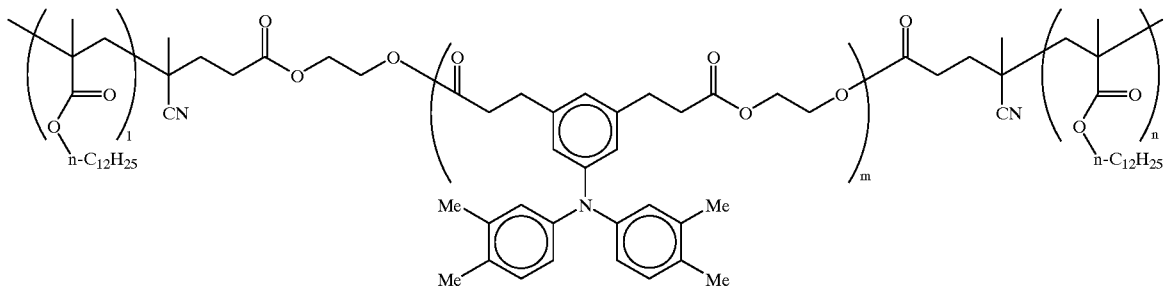

Synthesis 11 (Example 12)

10 of the prepolymer having an initiator introduced therein obtained in Example 10, and 20 g of isobutyl acrylate were dissolved in 100 ml of tetrahydrofuran, and the atmosphere of the reaction vessel was replaced with nitrogen. The solution was heated to 60° C., and kept at that temperature for 65 hours. After that, the solution was added dropwise to methanol, and the resultant mixture was agitated for 1 hour and thereafter filtered. The solid substance obtained was well washed with n-hexane, and 15 g of the desired block copolymer was obtained. In the obtained block copolymer, the weight ratio between a charge transporting block having a triarylamine structure and the insulating block which was composed of poly(isobutyl acrylate) was calculated as approximately 1:1. The weight average molecular weight of the insulating block was calculated as $1.3 \times 10^4$.

Synthesis 12 (Example 13)

A mixture of 100 g of N,N'-bis(p,m-dimethylphenyl)-N,N'-bis[p-(2-methoxycarbonylethyl)phenyl]-[3,3'-dimethyl-1,1'-biphenyl]-4,4'-diamine, 200 g of ethylene glycol, and 5 g of titanium tetrabutoxide was heated at reflux for 3 hours under a nitrogen gas stream. Then, after the confirmation of consumption of the N,N'-bis(p,m-dimethylphenyl)-N,N'-bis[p-(2-methoxycarbonylethyl)phenyl]-[3,3'-dimethyl-1,1'-biphenyl]-4,4'-diamine, the ethylene glycol was distilled off while the reaction mixture was being heated to 230° C. at a reduced pressure of 0.5 mm Hg, and the reaction mixture was kept at that temperature for 5 hours to continue the reaction. The reaction mixture was then cooled down to room temperature, and the resultant insoluble matter was dissolved by the addition of toluene to produce a solution. By use of isopropanol, a precipitate was produced from the solution, and this precipitate provided 89 g of a prepolymer which had at both ends thereof a hydroxyl group. The weight average molecular weight of the prepolymer was measured by means of GPC and was found to be $4.0 \times 10^4$ (based on styrene).

30 g of the prepolymer obtained above and 0.5 g of triethylamine were dissolved in 80 ml of toluene, and the Then, the reaction mixture was heated up to 30° C., and kept at that temperature for 4 hours to continue the reaction. After that, the solution was added dropwise to methanol containing triethylamine, and the resultant mixture was agitated for 1 hour and thereafter filtered. This precipitation/filtering operation by use of toluene/methanol was further repeated twice. The residue was dried at reduced pressure, and 27 g of a polymer having at both ends thereof an azo-type initiator was obtained.

20 g of the thus obtained polymer having at both ends thereof an azo-type initiator and 33 of tert-butyl methacrylate were dissolved in 400 ml of toluene, and the atmosphere of the reaction vessel was replaced with nitrogen. Then, the solution was heated to 65° C., and kept at that temperature for 100 hours. After that, the solution was added dropwise to hexane, and the resultant mixture was agitated for 1 hour and thereafter filtered. This precipitation/filtering operation by use of toluene/hexane was further repeated twice. The residue was dried at reduced pressure, and 32 g of a block copolymer having the structural formula (9) given below was obtained. Based on the ratio between integrals of protons assignable to each of the blocks in the $^1$H-NMR spectrum of the block copolymer obtained, the weight ratio between a charge transporting block having a triarylamine structure and an insulating block was calculated as approximately 57:43.

Since a charge transporting polymer having the same structure as the charge transporting block of the block copolymer of this example is incompatible with poly(tert-butyl methacrylate) having the same structure as the insulating block of the block copolymer of this example, the block copolymer of this example exhibits a state of micro phase separation. The poly(tert-butyl methacrylate) having the same structure as the insulating block of the block copolymer of this example had a volume resistivity of $10^{14} \Omega \cdot cm$ or more and a Tg of about 105° C. (by DSC)

Structural Formula (9)

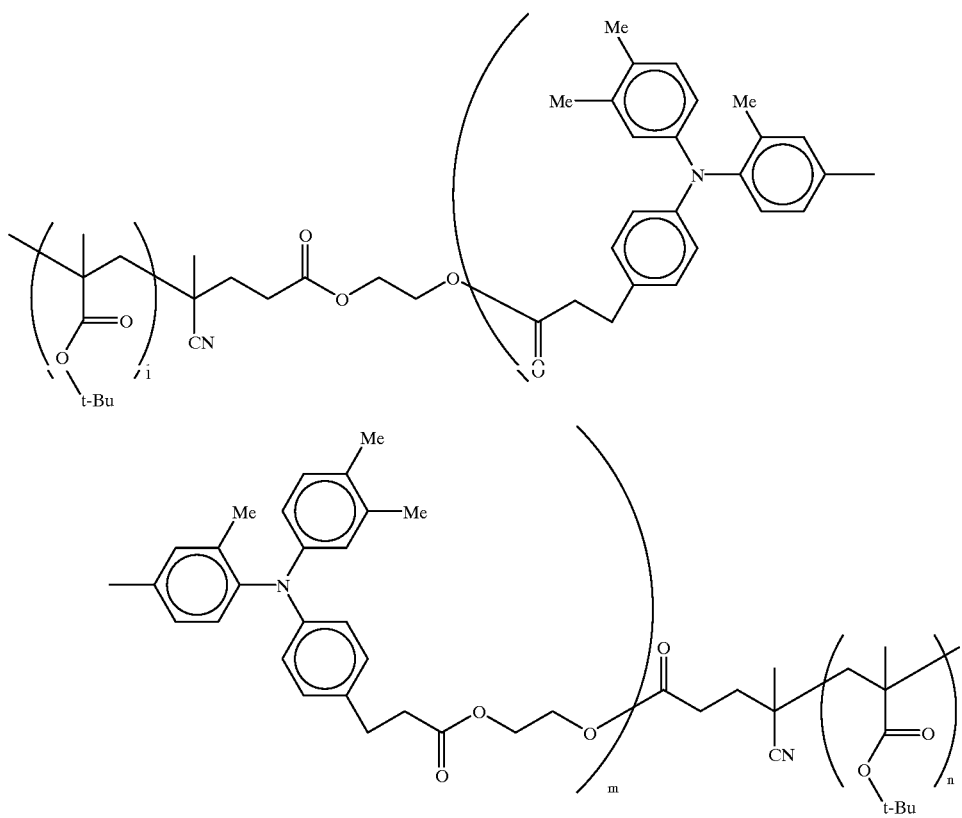

Synthesis 13 (Example 14)

8 g of the polymer having an initiator introduced therein which was obtained in Example 10, and 8 g of styrene monomer were dissolved in 40 ml of toluene, and the atmosphere of the reaction vessel was replaced with nitrogen. Then, the solution was heated to 60° C., and kept at that temperature for 65 hours. After that, 50 ml of toluene was added to the solution, and the resultant solution was added dropwise to methanol. The resultant mixture was agitated for 1 hour and thereafter filtered. The solid substance obtained was well washed with cyclohexanone, and polystyrene as a by-product was removed. In this way, 11 g of a triblock copolymer represented by the structural formula (10) given below was obtained. The weight ratio between a charge transporting block comprising a triarylamine structure and an insulating block composed of polystyrene was calculated as approximately 14:11. The weight average molecular weight of the insulating block was calculated as $9.4 \times 10^3$. The dipole moment of the hydrogen adduct of the styrene monomer which constitutes the insulating block is 0.35D. The polystyrene having the same structure as the insulating block of the block copolymer of this example had a volume resistivity of $10^{14} \Omega \cdot cm$ or more and a Tg of about 100° C. (by DSC).

Structural Formula (10)

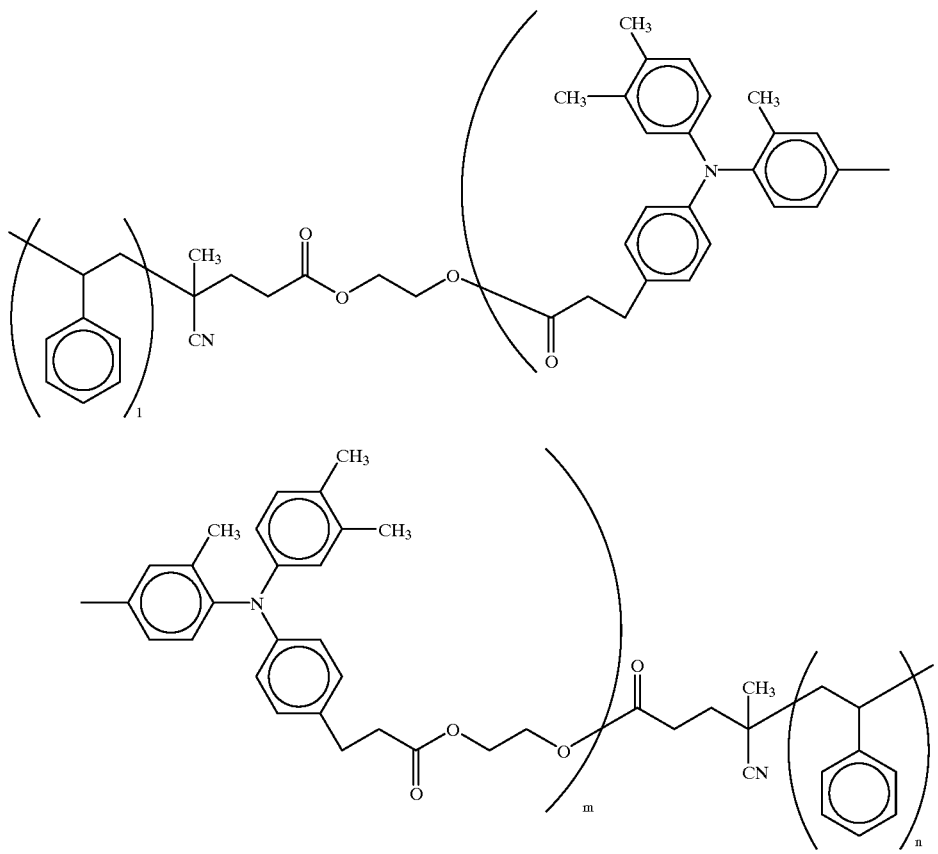

Synthesis 14 (Example 15)

The procedure of Example 14 was repeated, except that the N,N'-bis(p,m-dimethylphenyl)-N,N'-bis[p-(2-methoxycarbonylethyl)phenyl]-[3,3'-dimethyl-1,1'-biphenyl]-4,4'-diamine as used therein was replaced with N,N'-bis(p,m-dimethylphenyl)-N-(m,m'-bis-methoxycarbonylethylphenyl)amine, and a block copolymer represented by the structural formula (11) given below was synthesized. The weight average molecular weight of the charge transporting prepolymer comprising a triarylamine structure was calculated as $8.1 \times 10^3$ (based on styrene). In the finally obtained block copolymer, the weight ratio between the charge transporting block and the insulating block was calculated as approximately 7:6. The weight average molecular weight of the insulating block was calculated as $3.5 \times ^3$.

Structural Formula (11)

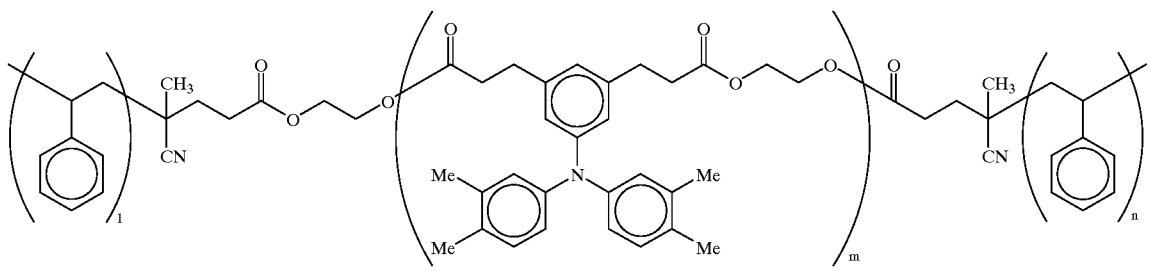

Synthesis 15 (Example 16)

10 of the prepolymer having an initiator introduced therein which was obtained in Example 10, and 20 g of 4-vinylbiphenyl were dissolved in 100 ml of toluene, and the atmosphere of the reaction vessel was replaced with nitrogen. The solution was heated to 60° C., and kept at that temperature for 65 hours. After that, the solution was added dropwise to methanol, and the resultant mixture and was agitated for 1 hour and there after filtered. The solid substance obtained was well washed with cyclohexane, and 15 g of the desired block copolymer was obtained. In the obtained block copolymer, the weight ratio between a charge transporting block having a triarylamine structure, and the insulating block which was composed of poly(4-vinylbiphenyl), was calculated as approximately 1:1. The weight average molecular weight of the insulating block was calculated as $1.2 \times 10^4$.

Synthesis 16 (Example 17)

25 g of 3-iodopropyltrimethoxysilane was placed in a two-neck flask having atmosphere therein replaced with nitrogen, and 200 ml of toluene was added to dissolve the silane. Next, 27 g of triphenylphosphine was added. The resultant solution was heated at reflux while being stirred for 7 hours. Then, the deposited crystals were washed well with toluene, and the solvent was removed at reduced pressure to give 36.5 g of a phosphonium salt (white solid having a melting point of 102.0 to 102.5° C.)

A two-neck flask having the atmosphere therein replaced with nitrogen was charged with 15.9 g of the phosphonium salt obtained and 300 ml of anhydrous dimethylformamide, and thus a solution was produced. The solution was cooled to −5° C. and 1.5 g of sodium.hydride was added to the solution, and thereafter the solution was stirred for 15 minutes. Then, while the solution was being stirred, 6.0 g of 3,3'-dimethyl-N,N'-bis(4-formylphenyl)-N,N'-bis(3,4-dimethylphenyl)-1,1'-biphenyl-4,4'-diamine was added to the solution, and the solution was gradually heated up to room temperature and stirred for 2 hours. After completion of the reaction, 30 ml of methanol was added to the solution, and the resultant solution was poured into ice/water to produce layers. The oily layer was extracted with toluene, and the solvent was removed from the extract at reduced pressure to give a residue, which was purifiedbymeans of silca gel in a column (eluent:toluene) As a result, 6.9 g of a pale yellow oily substance having the following structural formula was obtained.

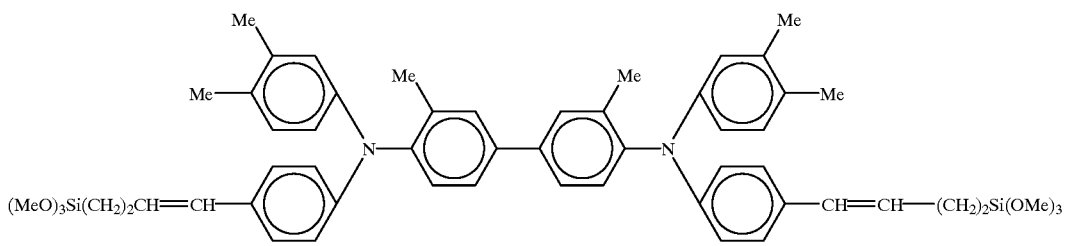

Then, a pear-shaped flask was charged with 6.3 g of the compound prepared above, 20 ml of tetrahydrofuran, and 20 ml of ethanol, and thus a solution was produced. Then, 0.2 g of 5% Pd-C was added to the solution, and thereafter the atmosphere in the flask was replaced with dry hydrogen gas. The reaction mixture was allowed to react for 15 hours at room temperature, while the gas inlet of the flask was connected to the dry hydrogen gas supply. After completion of the reaction, the Pd-C was filtered off and the solvent was removed from the solution at reduced pressure. The residue was purified by means of silica gel in a column (eluent: hexane/ethyl acetate) to give 5.9 g of a compound (a pale yellow oily substance) which was prepared by the addition of hydrogen to the vinyl group of the compound mentioned above.

Synthesis 17 (Example 18)

5.0 g of a carboxylic acid having the structure given below and 5.0 g of allyl alcohol were placed ina300 ml, two-neck flask having the atmosphere therein replaced with nitrogen, and 100 ml of toluene was added to dissolve the contents. Further, 1 ml of concentrated sulfuric acid was added dropwise to the reaction mixture and the reaction mixture was stirred for 15 hours. Then, the reaction mixture was washed twice by being poured into 200 ml of distilled water. Anhydrous sodium sulfate was added to the organic phase to dry the organic phase. Then, the solvent was removed from the organic phase at reduced pressure, and the residue was purified by means of silica gel in a column (eluent:toluene), followed by purification by recrystallization to give 5.2 g of a vinyl-containing ester represented by the following structural formula (white solid having a melting point of 107 to 109° C.).

Carboxylic acid

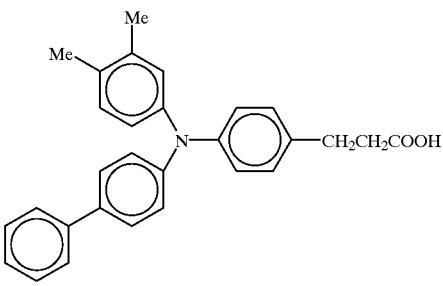

Vinyl-containing ester

-continued

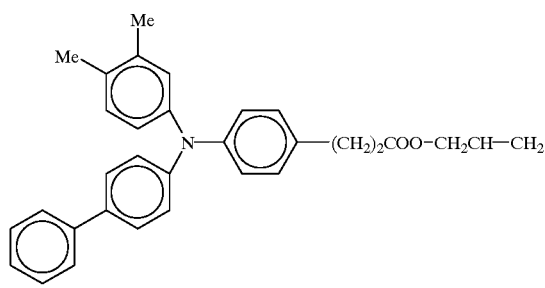

A 200 ml, two-neck flask having atmosphere replaced with nitrogen was charged with 3 g of the vinyl-containing ester obtained above and 3 g of trimethoxysilane. While the contents of the flask were being stirred, to the flask was added dropwise 0.1 ml of a 1% solution of $H_2PtCl_6 \cdot 6H_2O$ in isopropanol. As the reaction proceeded, the solids in the flask were dissolved. After the stirring of the solution in this state was continued for 3 hours, 50 ml of toluene was added to the solution, and the solution was washed by being poured into 100 ml of distilled water. Anhydrous sodium sulfate was added to the organic phase to dry the organic phase. Then, the solvent was removed from the organic phase at reduced pressure, and the residue was purified by means of silica gel in a column (eluent:toluene/ethyl acetate) to give 7.1 g of a pale yellow oily substance having the following structural formula.

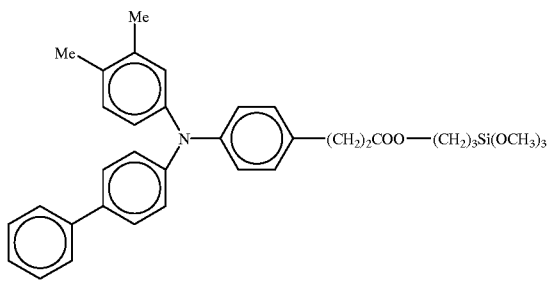

coating was heated at 115° C. for 10 minutes, and thus a heterogeneous charge transporting layer having a thickness of 3 μm was formed. The heterogeneous charge transporting layer was observed under a TEM by means of dyeing with ruthenic acid, and a micro phase-separation structure was found. The scale of the micro phase-separation structure was approximately 0.02 μm, and the volume percentage of the charge transporting phase in the copolymer was about 60%. The mobility of charge of a charge transporting polymer having the same structure as that of the above-mentioned charge transporting block was $5 \times 10^5$ cm$^2$/Vs under an electric field having a strength of $1 \times 10^5$ V cm. Next, a solution, which was obtained by dissolving 15 parts by weight of a compound which was a charge transporting polymer having a weight average molecular weight of 80,000 and composed of repeating units represented by the structure formula (12) given below in 85 parts by weight of toluene, was coated on the heterogeneous charge generating layer by a wire-bar coating method. Then, the coating was heated at 135° C. for 1 hour, and thus a homogeneous charge transporting layer having a thickness of 20 μm was formed. In this way, a electrophotographic photoreceptor having layers illustrated in FIG. 4 was prepared.

Structural Formula (12)

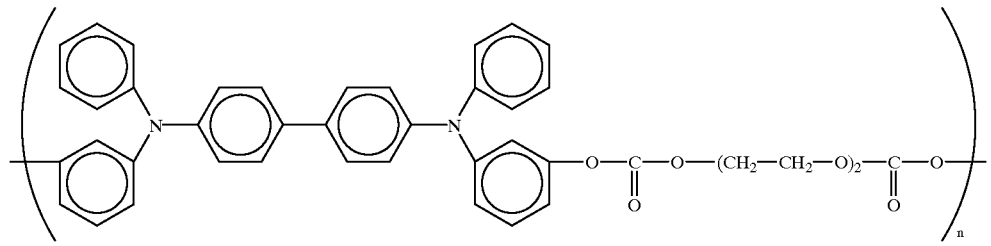

Application 5 (Example 19)

4 parts by weight of dichlorotin phthalocyanine crystals exhibiting strong peaks at least at Bragg angles (2θ±0.2°) of 8.3°, 13.7° and 28.3° in an X-ray diffraction spectrum using CuKα as the X-ray source, 2 parts by weight of a polyvinyl butyral resin ("Eslec BM-S" manufactured by Sekisui Chemical Co., Ltd.) and 100 parts by chlorobenzene were mixed with glass beads, and the mixture was shaken in a paint shaker for 2 hours to obtain a dispersion. The dispersion obtained was coated on an aluminum substrate by means of immersion. Then, the coating was heated at 115° C. for 10 minutes, and thus a charge generating layer having a thickness of 0.5 μm was formed.

Then, a solution, which was obtained by dissolving 10 parts by weight of the block copolymer obtained in Example 10 in 90 parts by weight of cyclohexanone, was coated on the charge generating layer by means of immersion. The The electrophotographic photoreceptor obtained above was mounted in a device for testing electrostatic copying paper ("Electrostatic Analyzer EPA-8100" manufactured by Kawaguchi Electric Manufacturing Co., Ltd.), and electrophotographic properties were evaluated under an atmosphere of normal temperature and humidity (20° C., 40% RH). In the test, the surface of the electrophotographic photoreceptor was charged to −750 V by adjusting the voltage of corona discharge, and irradiated for 7 seconds with halogen lamp light which was converted into a monochromatic light of 780 nm through an interference filter, and which had a light strength adjusted to 10 mW/m$^2$ on the surface of the photoreceptor. As a result, the photo-induced potential attenuation characteristic was S-type as shown in FIG. 2 and the ratio $E_{50\%}/E_{10\%}$ was 2.2. The value of $EE_{50\%}$ was 15 mJ/m$^2$, and the residual potential was 20 V.

Application 6 (Example 20)

An aluminum substrate was coated by means of immersion in a solution comprising 10 parts by weight of a zirconium alkoxide compound ("Orgatics ZC 540" manufactured by Matsumoto Pharmaceutical Manufacturing Co., Ltd.), 1 part by weight of a silane compound ("A1100" manufactured by Nippon Unicar Co., Ltd.), 40 parts by weight of isopropanol, and 20 parts by weight of n-butanol. The coating was heated at 150° C. for 10 minutes, and thus a subbing layer having a thickness of 0.1 μm was formed. On the other hand, 4 parts by weight of fine chlorogallium phthalocyanine crystals exhibiting strong peaks at least at Bragg angles (2θ±0.2°) of 7.4°, 16.6°, 25.5° and 28.3° in an X-ray diffraction spectrum using CuKα as the X-ray source, 2 parts by weight of a vinyl chloride/vinyl acetate/maleic anhydride terpolymer ("UCAR Solution Vinyl Resin VMCH" manufactured by Union Carbide Corporation), 67 parts by weight of xylene and 33 parts by weight of butyl acetate were mixed with glass beads, and the mixture was shaken in a paint shaker for 2 hours to obtain a dispersion. The dispersion obtained was coated on the subbing layer by means of immersion. The coating was heated at 100° C. for 10 minutes, and thus a charge generating layer having a thickness of 0.3 μm was formed.

Then, a solution, which was obtained by dissolving 10 parts by weight of the block copolymer obtained in Example 10 in 90 parts by weight of cyclohexanone, was coated on the charge generating layer by means of immersion as in Example 19. The coating was heated at 115° C. for 10 minutes, and thus a heterogeneous charge transporting layer having a thickness of 3 μm was formed.

Next, a solution, which was obtained by dissolving 15 parts by weight of a compound which was a charge transporting polymer having a weight average molecular weight of 120,000 and was composed of repeating units represented by the structure formula (13) given below in 85 parts by weight of chlorobenzene, was coated on the heterogeneous charge generating layer by a blade-coating method. The coating was heated at 135° C. for 1 hour, and thus a homogeneous charge transporting layer having a thickness of 20 μm was formed. In this way, a multilayer electrophotographic photoreceptor having layers illustrated in FIG. 4 was prepared.

The electrophotographic photoreceptor obtained above was evaluated as in Example 19. As a result, the photo-induced potential attenuation characteristic was S-type, having a residual potential of 10 V, $E_{50\%}$ of 15 mJ/m$^2$ and a ratio $E_{50\%}/E_{10\%}$ of 2.0.

Comparative Example 1

The procedure of Example 20 was repeated to prepare a electrophotographic photoreceptor, except that the heterogeneous charge transporting layer was not formed.

The electrophotographic properties of the thus obtained photoreceptor were evaluated as in Example 19. As a result, the attenuation curve of the photoelectric potential was J-type as shown in FIG. 1.

Comparative Example 2

The procedure of Example 20 was repeated to prepare a electrophotographic photoreceptor, except that the charge generating layer was not formed.

The electrophotographic properties of the thus obtained photoreceptor were evaluated as in Example 19. As a result, it was found that the photoreceptor was not in the least sensitive to light.

Application 7 (Example 21)

The procedure of Example 20 was repeated to prepare a electrophotographic photoreceptor having layers illustrated in FIG. 3, except that the fine chlorogallium phthalocyanine crystals as used therein were replaced with fine hydroxygallium phthalocyanine crystals exhibiting strong peaks at least at Bragg angles (2θ±0.2°) of 7.5°, 9.9°, 12.5°, 16.3°, 18.6°, 25.1° and 28.3° in an X-ray diffraction spectrum using CuKα as the X-ray source, the xylene and butyl acetate solvents in the dispersing process were replaced with monochlorobenzene, the thickness of the heterogeneous charge transporting layer was 23 μm, and the homogeneous charge transporting layer was not formed.

The electrophotographic properties of the thus obtained photoreceptor were evaluated as in Example 19. As a result, the photo-indured potential attenuation characteristic was S-type, having a residual potential of 10 V, $E_{50\%}$ of 5 mJ/m$^2$ and a ratio $E_{50\%}/E_{10\%}$ of 2.4.

Application 8 (Example 22)

12 parts by weight of hexagonal selenium, 1.8 parts by weight of a vinyl chloride/vinyl acetate/maleic anhydride terpolymer ("UCAR Solution Vinyl Resin VMCH" manufactured by Union Carbide Corporation), and 100 parts by weight of isobutyl acetate were mixed with stainless steel beads, and the mixture was shaken in a paint shaker for 5

Structural Formula (13)

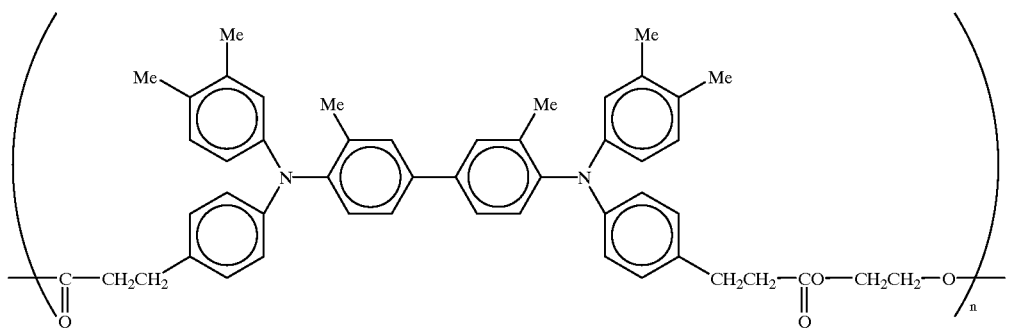

hours to obtain a dispersion. The dispersion obtained was coated on an aluminum substrate by means of immersion. The coating was heated at 100° C. for 10 minutes, and thus a charge generating layer having a thickness of 0.15 μm was formed.

Next, the procedure of Example 19 was repeated to prepare a electrophotographic photoreceptor having layers illustrated in FIG. 3, except that the block copolymer obtained in Example 10 as used therein was replaced with the block copolymer obtained in Example 11; and the thickness of the heterogeneous charge transporting layer was 23 μm. The heterogeneous charge transporting layer was observed under a TEM by means of dyeing with ruthenic acid, and a micro phase separated structure was found. The scale of the micro phase separated structure was approximately 0.01 μm, and the volume percentage of the charge transporting phase in the copolymer was about 60%. The mobility of charge of a charge transporting polymer having the same structure as that of the above-mentioned charge transporting block was $7 \times 10^{-6}$ cm$^2$/Vs under a strong electric filed of $1 \times 10^5$ V cm.

The electrophotographic properties of the thus obtained photoreceptor were evaluated as in Example 19, except that the wavelength of the light for exposure was changed to 500 nm. As a result, the photo-induced potential attenuation characteristic was S-type, having a residual potential of 5 V, $E_{50\%}$ of 8 mJ/m$^2$ and a ratio $E_{50\%}/E_{10\%}$ of 2.5.

Application 9 (Example 23)

The procedure of Example 20 was repeated to prepare an electrophotographic photoreceptor, except that the aluminum substrate as used therein was replaced with an aluminum drum. The electrophotographic photoreceptor obtained above was mounted in a laser printer ("Laser Press 4105" manufactured by Fuji Xerox Co., Ltd.) and a printing test was conducted In the test, in order to obtain an optimal exposure amount, an ND filter was inserted in the pathway of the laser light. The evaluation of the quality of image was performed by visually inspecting the first print and the 2,000th print after continuous printing.

Comparative Example 3

The procedure of Comparative Example 1 was repeated to prepare an electrophotographic photoreceptor, except that the aluminum substrate as used therein was replaced with an aluminum drum. The electrophotographic photoreceptor obtained was subjected to a printing test as in Example 23.

The quality of print of Example 23 was superior to that of Comparative Example 3 in reproducibility of fine lines.

Comparative Example 4

An aluminum substrate was coated by means of immersion with a solution comprising 10 parts by weight of a zirconium alkoxide compound ("Orgatics ZC 540" manufactured by Matsumoto Pharmaceutical Manufacturing Co., Ltd.), 1 part by weight of a silane compound ("A1100" manufactured by Nippon Unicar Co., Ltd.), 40 parts by weight of isopropanol and 20 parts by weight of n-butanol. The coating was heated at 150° C. for 10 minutes, and thus a subbing layer having a thickness of 0.1 μm was formed.

On the other hand, 4 parts by weight of fine chlorogallium phthalocyanine crystals exhibiting strong peaks at least at Bragg angles (2θ±0.2°) of 7.4°, 16.6°, 25.5° and 28.3° in X-ray diffraction spectrum using CuKα as the X-ray source, 2 parts by weight of a vinyl chloride/vinyl acetate copolymer ("UCAR Solution Vinyl Resin VMCH" manufactured by Union Carbide Corporation), 67 parts by weight of xylene, and 33 parts by weight of butyl acetate were mixed with glass beads, and the mixture was shaken in a paint shaker for 2 hours to obtain a dispersion. The dispersion obtained was coated on the subbing layer by means of immersion. The coating was heated at 100° C. for 10 minutes, and thus a charge generating layer having a thickness of 0.3 μm was formed.

Next, 15 parts by weight of hexagonal selenium, 10 parts by weight of a vinyl chloride/vinyl acetate copolymer ("UCAR Solution Vinyl Resin VMCH" manufactured by Union Carbide Corporation), and 100 parts by weight of isobutyl acetate were mixed with stainless steel beads, and the mixture was blended in an attritor for 100 hours to obtain a dispersion. The dispersion obtained was coated on the charge generating layer by means of immersion. The coating was heated at 135° C. for 10 minutes, and thus a heterogeneous charge transporting layer having a thickness of 2.0 μm was formed. The heterogeneous charge transporting layer was observed under a TEM, and it was found that the average diameter of the fine hexagonal crystals of selenium constituting a charge transporting domain was approximately 0.03 μm, and the volume percentage of the fine hexagonal crystals in the heterogeneous charge transporting layer was about 30%.

Next, a solution, which was obtained by dissolving 15 parts by weight of a compound which was a charge transporting polymer having a weight average molecular weight of 120,000 and composed of repeating units represented by the structure formula (13) in 85 parts by weight of chlorobenzene, was coated on the heterogeneous charge generating layer by immersion. The coating was heated at 135° C. for 1 hour, and thus a homogeneous charge transporting layer having a thickness of 20 μm was formed. In this way, a electrophotographic photoreceptor having layers illustrated in FIG. 4 was prepared.

The electrophotographic properties of the thus obtained photoreceptor were evaluated as in Example 19. As a result, the photo-induced potential attenuation characteristic was S-type, having a residual potential of 5 V, $E_{50\%}$ of 8 mJ/m$^2$ and a ratio $E_{50\%}/E_{10\%}$ of 1.8.

Then, the procedure of Example 23 was repeated to prepare an electrophotographic photoreceptor, except that the aluminum substrate as used therein was replaced with an aluminum drum. The electrophotographic photoreceptor obtained above was subjected to a printing test as in Example 23.

The quality of print of Example 23 was equal to that of Comparative Example 4 at the first print. As for the 2,000 th print, however, whereas the print quality of Example 23 was equal to that of the 1st print, the print quality of Comparative Example 4 was poor, due to fogging of the background, and the reproducibility of fine lines dropped markedly.

Comparative Example 5

The procedure of Example 19 was repeated to prepare an electrophotographic photoreceptor, except that the block copolymer obtained in Example 10 as used therein was replaced with a blend of a prepolymer, which was an intermediate product in Example 10 and comprised a triaryl amine structure, and poly(n-dodecyl methacrylate) which was a by-product in Example 10. The heterogeneous charge transporting layer composed of the polymer blend was whitened and irregular, and had a scale of phase separation of several μm or greater.

The photographic properties of the electrophotographic photoreceptor obtained was evaluated as in Example 19. It was found that the percentage of the photo-induced potential attenuation was only 10%.

Application 10 (Example 24)

An aluminum substrate was coated by means of immersion in a solution comprising 15 parts by weight of a zirconium alkoxide compound ("Orgatics ZC 540" manufactured by Matsumoto Pharmaceutical Manufacturing Co., Ltd.), 1 part by weight of a silane compound ("A1100" manufactured by Nippon Unicar Co., Ltd.), 1 part by weight of a polyvinyl butyral resin ("Eslec BM-S" manufactured by Sekisui Chemical Co., Ltd.), 15 parts by weight of isopropanol, and 15 parts by weight of n-butanol. The coating was then humidified under a condition of 50° C. and 85% RH, and thereafter heated at 160° C. for 10 minutes, and thus a subbing layer having a thickness of 1.0 µm was formed.

On the other hand, 4 parts by weight of chlorogallium phthalocyanine crystals exhibiting strong peaks at least at Bragg angles (2θ±0.2°) of 7.4°, 16.6° and 28.3° in X-ray diffraction spectrum using CuKα as the X-ray source, 2 parts by weight of a vinyl chloride/vinyl acetate/maleic anhydride terpolymer ("UCAR Solution Vinyl Resin VMCH" manufactured by Union Carbide Corporation), 67 parts by weight of xylene and 33 parts by weight of n-butyl acetate were mixed with glass beads, and the mixture was shaken in a paint shaker for 5 hours to obtain a dispersion. The dispersion obtained was coated on the subbing layer by means of immersion. The coating was heated at 100° C. for 10 minutes, and thus a charge generating layer having a thickness of 0.2 µm was formed.

Then, a solution, which was obtained by dissolving 10 parts by weight of the block copolymer obtained in Example 13 in 90 parts by weight of toluene, was coated on the charge generating layer by means of immersion. The coating was heated at 135° C. for 10 minutes, and thus a heterogeneous charge transporting layer having a thickness of 3 µm was formed.

Next, a solution, which was obtained by dissolving 20 parts by weight of a compound which was a charge transporting polymer having a weight average molecular weight of 40,000 and composed of repeating units represented by the structure formula (13) given below in 80 parts by weight of chlorobenzene, was coated on the heterogeneous charge generating layer by a blade-coating method. The coating was heated at 135° C. for 1 hour, and a homogeneous charge transporting layer having a thickness of 12 µm was formed. In this way, a electrophotographic photoreceptor having layers illustrated in FIG. 4 was prepared.

The electrophotographic photoreceptor obtained above was mounted in a device for testing electrostatic copying paper ("Electrostatic Analyzer EPA-8100" manufactured by Kawaguchi Electric Manufacturing Co., Ltd.), and electrophotographic properties were evaluated under an atmosphere of normal temperature and humidity (20° C., 40% RH). In the test, the surface of the electrophotographic photoreceptor was charged to −800 V by adjusting the voltage of corona discharge, and irradiated for 5 second with halogen lamp light, which was converted into a monochromatic light of 780 nm through an interference filter, and which had the light strength adjusted to 20 mW/m² on the surface of the photoreceptor. As a result, the photo-induced potential attenuation characteristic was S-type as shown in FIG. 2 and the ratio $E_{50\%}/E_{10\%}$ was 1.7. The value of $E_{50\%}$ was 12 mJ/m², and the residual potential was 15 V.

Application 11 (Example 25)

As in Example 24, a subbing layer and a charge generating layer were formed on an aluminum substrate. Then, a solution, which was obtained by dissolving 20 parts by weight of the block copolymer obtained in Example 13 in 80 parts by weight of toluene, was coated on the charge generating layer by means of immersion. The coating was heated at 135° C. for 60 minutes, and thus a heterogeneous charge transporting layer having a thickness of 15 µm was formed. In this way, a electrophotographic photoreceptor having layers illustrated in FIG. 3 was prepared.

The electrophotographic photoreceptor obtained above was evaluated as in Example 24. As a result, the photo-induced potential attenuation characteristic was S-type, having a residual potential of 20 V, $E_{50\%}$ of 11 mJ/m² and a ratio $E_{50\%}/E_{10\%}$ of 1.6.

Application 12 (Example 26)

The procedure of Example 25 was repeated to prepare a electrophotographic photoreceptor, except that the aluminum substrate as used therein was replaced with an aluminum drum having a surface roughened by honing. The electrophotographic photoreceptor obtained above was mounted in a laser printer ("Laser Press 4105" manufactured by Fuji Xerox Co., Ltd.) and a printing test was conducted. In the test, in order to obtain an optimal exposure amount, an ND filter was inserted in the pathway of the laser light. The evaluation of the quality of image was performed by visually inspecting the first print and the 5,000th print after continuous printing.

Application 13 (Example 27)

The procedure of Example 25 was repeated to prepare a electrophotographic photoreceptor, except that the aluminum substrate as used therein was replaced with an aluminum drum having a surface roughened by honing; and the block copolymer obtained in Example 13 as used therein was replaced with the block copolymer obtained in Example 14. The electrophotographic photoreceptor obtained above was subjected to a printing test as in Example 26.

The quality of print of Example 26 was equal to that of Example 27 for the first print. As for the 5,000th print, however, a clear difference was observed. That is, whereas the print quality of Example 26 was equal to that of the 1st print, the print quality of Example 27 was poor, because imperfections, such as a decrease in image density, fogging of the background and streaky image defects, were observed. In the inspection of the photoreceptors after completion of the printing test, no change was found in the photoreceptor of Example 26, but the photoreceptor of Example 27 exhibited surface imperfections such as a decrease in the film thickness, streaky damages and embedding of toner. These surface imperfections in the photoreceptor of Example 27 are presumably ascribed to mechanical stress by the cleaning blade, because the insulating block of the copolymer used in Example 27 had a Tg as low as −65° C.

Application 14 (Example 28)

4 parts by weight of dichlorotin phthalocyanine crystals exhibiting strong peaks at least at Bragg angles (2θ±0.2°) of 8.3°, 13.7° and 28.3° in X-ray diffraction spectrum using CuKα as the X-ray source, 2 parts by weight of a polyvinyl butyral resin ("Eslec BM-S" manufactured by Sekisui Chemical Co., Ltd.) and 1 part of chlorobenzene were mixed with glass beads, and the mixture was shaken in a paint shaker for 2 hours to obtain a dispersion. The dispersion obtained was coated on an aluminum substrate by means of immersion. The coating was heated at 115° C. for 10 minutes, and thus a charge generating layer having a thickness of 0.5 μm was formed.

Then, a solution, which was obtained by dissolving 10 parts by weight of the block copolymer obtained in Example 14 in 90 parts by weight of cyclohexanone, was coated on the charge generating layer by means of immersion. The coating was heated at 115° C. for 10 minutes, and thus a heterogeneous charge transporting layer having a thickness of 3 μm was formed. The heterogeneous charge transporting layer was observed under a TEM by means of dyeing with ruthenic acid, and a micro phase separated structure was found. The scale of the micro phase separated structure was approximately 0.02 μm, and the volume percentage of the charge transporting phase in the copolymer was about 60%.

Next, a solution, which was obtained by dissolving 15 parts by weight of a compound which was a charge transporting polymer having a weight average molecular weight of 80,000 and composed of repeating units represented by the structure formula (12) in 85 parts by weight of chlorobenzene, was coated on the heterogeneous charge generating layer by a wire bar coating method. The coating was heated at 135° C. for 1 hour, and thus a homogeneous charge transporting layer having a thickness of 20 μm was formed. In this way, a electrophotographic photoreceptor having layers illustrated in FIG. 4 was prepared.

The electrophotographic photoreceptor obtained above was mounted in a device for testing electrostatic copying paper ("Electrostatic Analyzer EPA-8100" manufactured by Kawaguchi Electric Manufacturing Co., Ltd.), which was partly modified, and electrophotographic properties were evaluated under an atmosphere of normal temperature and humidity (20° C., 40% RH) In the test, the surface of the electrophotographic photoreceptor was charged to −750 V by adjusting the voltage of corona discharge and irradiated for 7 seconds with halogen lamp light which was converted into a monochromatic light of 780 nm through an interference filter, and which had a light strength adjusted to 10 mW/m$^2$ on the surface of the photoreceptor. As a result, the photo-induced potential attenuation characteristic was S-type as shown in FIG. 2 and the ratio $E_{50\%}/E_{10\%}$ was 2.0. The value of $E_{50\%}$ was 30 mJ/m$^2$, and the residual potential was 22 V.

Application 15 (Example 29)

An aluminum substrate was coated by means of immersion with a solution comprising 10 parts by weight of a zirconium alkoxide compound ("Orgatics ZC 540" manufactured by Matsumoto Pharmaceutical Manufacturing Co., Ltd.), 1 part by weight of a silane compound ("A1100" manufactured by Nippon Unicar Co., Ltd.) 40 parts by weight of isopropanol, and 20 parts by weight of n-butanol. The coating was heated at 150° C. for 10 minutes, and thus a subbing layer having a thickness of 0.1 μm was formed.

On the other hand, 4 parts by weight of fine chlorogallium phthalocyanine crystals exhibiting strong peaks at least at Bragg angles (2θ±0.2°) 7.4°, 16.6°, 25.5° and 28.3° in an X-ray diffraction spectrum using CuKα as the X-ray source, 2 parts by weight of a vinyl chloride/vinyl acetate/maleic anhydride terpolymer ("UCAR Solution Vinyl Resin VMCH" manufactured by Union Carbide Corporation), 67 parts by weight of xylene and 33 parts by weight of n-butyl acetate were mixed with glass beads, and the mixture was shaken in a paint shaker for 2 hours to obtain a dispersion. The dispersion obtained was coated on the subbing layer by means of immersion. The coating was heated at 100° C. for 10 minutes, and thus a charge generating layer having a thickness of 0.3 μm was formed.

Then, a solution, which was obtained by dissolving 10 parts by weight of the block copolymer obtained in Example 14 in 90 parts by weight of cyclohexanone, was coated on the charge generating layer by means of immersion. The coating was heated at 115° C. for 10 minutes, and thus a heterogeneous charge transporting layer having a thickness of 3 μm was formed.

Next, a solution, which was obtained by dissolving 15 parts by weight of a compound which was a charge transporting polymer having a weight average molecular weight of 130,000, and composed of repeating units represented by the structure formula (13) in 85 parts by weight of chlorobenzene, was coated on the heterogeneous charge generating layer by a wire-bar coating method. The coating was heated at 135° C. for 1 hour, and thus a homogeneous charge transporting layer having a thickness of 20 was formed. In this way, an electrophotographic photoreceptor having layers illustrated in FIG. 4 was prepared.

The electrophotographic properties of the thus obtained photoreceptor were evaluated as in Example 28. As a result, the photo-induced potential attenuation characteristic was S-type, having a residual potential of 10 V, $E_{50\%}$ of 10 mJ/m$^2$ and a ratio $E_{50\%}/E_{10\%}$ of 2.2.

Application 16 (Example 30)

The procedure of Example 29 was repeated to prepare a electrophotographic photoreceptor, except that the fine chlorogallium phthalocyanine crystals as used therein were replaced with fine hydroxygallium phthalocyanine crystals exhibiting strong peaks at least at Bragg angles (2θ±0.2°) of 7.5°, 9.9°, 12.5°, 16.3°, 18.6°, 25.1° and 28.30° in an X-ray diffraction spectrum using CUKα as the X-ray source; xylene and butyl acetate as a solvent in the dispersing operation were replaced with monochlorobenzene; the film thickness of the heterogeneous charge transporting layer was 23 μm; and the homogeneous charge transporting layer was not formed. In this way, an electrophotographic photoreceptor having layers illustrated in FIG. 3 was prepared.

The electrophotographic photoreceptor obtained above was evaluated as in Example 28. As a result, the photo-induced potential attenuation characteristic was S-type, having a residual potential of 10 V, $E_{50\%}$ of 5 mJ/m$^2$ and a ratio $E_{50\%}/E_{10\%}$ of 2.3.

Application 17 (Example 31)

12 parts by weight of hexagonal selenium, 1.8 parts by weight of a vinyl chloride/vinyl acetate/maleic anhydride terpolymer ("UCAR Solution Vinyl Resin VMCH" manufactured by Union Carbide Corporation), and 100 parts by weight of isobutyl acetate were mixed with stainless steel beads, and the mixture was shaken in a paint shaker for 5 hours to obtain a dispersion. The dispersion obtained was coated on an aluminum substrate by means of immersion. The coating was heated at 100° C. for 10 minutes, and thus a charge generating layer having a thickness of 0.15 μm was formed.

Next, the procedure of Example 28 was repeated to prepare a electrophotographic photoreceptor having layers illustrated in FIG. 3, except that the block copolymer obtained in Example 14 as used therein was replaced with the block copolymer obtained in Example 15; and the thickness of the heterogeneous charge transporting layer was 23 μm. The heterogeneous charge transporting layer was observed under a TEM by means of dyeing with ruthenic acid, and a micro phase separated structure was found. The scale of the micro phase separated structure was approximately 0.01 μm, and the volume percentage of the charge transporting phase in the copolymer was about 60%.

The electrophotographic properties of the thus obtained photoreceptor were evaluated as in Example 28, except that the wavelength of the light for exposure was changed to 500 nm. As a result, the photo-induced potential attenuation characteristic potential was S-type, having a residual potential of 5 V, $E_{50\%}$ of 8 mJ/m$^2$ and a ratio $E_{50\%}/E_{10\%}$ of 2.5.

Application 18 (Example 32)

The procedure of Example 29 was repeated to prepare a electrophotographic photoreceptor, except that the aluminum substrate as used therein was replaced with an aluminum drum. The electrophotographic photoreceptor obtained above was mounted in a laser printer ("Laser Press 4105" manufactured by Fuji Xerox Co., Ltd.) and a printing test was conducted. In the test, in order to obtain an optimal exposure amount, an ND filter was inserted in the pathway of the laser light. The evaluation of the quality of image was performed by visually inspecting the first print and the 2,000th print after continuous printing.

Comparative Example 6

5 parts by weight of dichlorotin phthalocyanine crystals exhibiting strongpeaks at Bragg angles (2θ±0.2°) of 8.3°, 13.7° and 28.3° in an X-ray diffraction spectrum using CuKα as the X-ray source, 10 parts by weight of a bisphenol Z-type polycarbonate resin("PC-Z" manufactured by Mitsubishi Gas-Chemical Co., Ltd.), and 100 parts by weight of chlorobenzene were mixed with stainless steel beads, and the mixture was shaken for 4 hours in a paint shaker to produce a dispersion liquid. The dispersion liquid obtained was coated by means of immersion on an aluminum drum. The coating was heated at 115° C. for 60 minutes, and thus a single-layer electrophotographic photoreceptor having a thickness of 23 μm was prepared. The single-layer electrophotographic photoreceptor was subjected to a printing test as in Example 32.

Meanwhile, the above-described procedure was repeated to prepare a single-layer electrophotographic photoreceptor, except that the aluminum drum as used therein was replaced with an aluminum substrate. The single-layer electrophotographic photoreceptor obtained was evaluated as in Example 28. As a result, the photo-induced potential attenuation characteristic of single-layer photoreceptor of this comparative example was S-type, having a residual potential of 5 V, $E_{50\%}$ of 25 mJ/m$^2$ and a ratio $E_{50\%}/E_{10\%}$ of 1.7.

The quality of print of Comparative Example 6 was equal to that of Example 32 at the first print. As to the 2,000th print, however, whereas the print quality of Example 32 was equal to that of the 1st print, the print quality of Comparative Example 6 was poor, because the fogging of the background occurred and reproducibility of fine lines dropped remarkably.

Application 19 (Example 33)

The procedure of Example 24 was repeated to prepare an electrophotographic photoreceptor, except that the copolymer obtained in Example 13 as used therein was replaced with the copolymer obtained in Example 17. In this way, an electrophotographic photoreceptor was prepared.

The electrophotographic photoreceptor obtained above was evaluated as in Example 24. As a result, the photo-induced potential attenuation characteristic was S-type, having a ratio $E_{50\%}/E_{10\%}$ of 1.9 $E_{50\%}$ was 10 mJ/m$^2$, and the residual potential was 10 V.

Application 20 (Example 34)

As in Example 26, a primer layer, a charge generating layer and a heterogeneous charge transporting layer were formed in that order on an aluminum drum. The heterogeneous charge transporting layer on the aluminum drum was further coated by means of a ring with a coating liquid prepared by dissolving 6 parts by weight of the compound obtained in Example 18, 2 parts of phenyltriethoxysilane, 12 parts by weight of a silicone hard coat agent ("X-40-2239" manufactured by Shin-Etsu Silicone Co., Ltd.) and 2 parts by weight of acetic acid in 10 parts by weight of cyclohexanone. The coating was heated at 100° C. for 20 minutes to dry and cure the film so that a crosslinked charge transporting layer having a thickness of 3 μm was formed, and thus a electrophotographic photoreceptor was prepared.

The electrophotographic photoreceptor was mounted in a laser printer as in Example 26. After the continuous printing of 10,000 sheets of paper, no deterioration in image quality was found by visual inspection. Accordingly, the high level of durability of the photoreceptor of this example and of the electrophotographic device was confirmed.

Application 21 (Example 35)

The procedure of Example 34 was repeated to prepare a electrophotographic photoreceptor, except that the compound obtained in Example 18 as used therein was replaced with the compound obtained in Example 17. In this way, a electrophotographic photoreceptor was prepared.

The electrophotographic photoreceptor was mounted in a laser printer as in Example 34. After the continuous printing test as in Example 34, no deterioration in image quality was found by visual inspection. Accordingly, the high level of durability of the photoreceptor of this example and of the electrophotographic device was confirmed.

What is claimed is:

1. A charge transporting copolymer which is a block copolymer or a graft copolymer, said charge transporting copolymer being composed of:

(a) a charge transporting block having as a repeating unit at least one structure represented by the following general formula (1) or (2); and (b) an insulating block having as a repeating unit at least one structure represented by the following general formula (3);

General formula (1) being

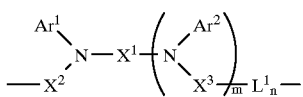

where Ar$^1$ and Ar$^2$ each independently represent a substituted or unsubstituted aryl group, X$^1$ represents a divalent hydrocarbon or heteroatom-containing hydrocarbon group which has an aromatic ring structure, X$^2$ and X$^3$ each independently represent a substituted or unsubstituted arylene group, L$^1$ represents a divalent hydrocarbon or heteroatom-containing hydrocarbon group which may be branched or may contain a ring structure, and m and n each independently represent 0 or 1;

General formula (2) being:

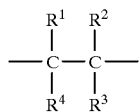

where $Ar^3$ and $Ar^4$ each independently represent a substituted or unsubstituted aryl group, and $L^2$ represents a trivalent hydrocarbon or heteroatom-containing hydrocarbon group which has an aromatic ring structure; and General formula (3) being:

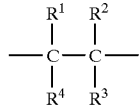

where $R^1$–$R^3$ each independently represent a hydrogen atom, a halogen atom, a substituted or unsubstituted alkyl group, or a substituted or unsubstituted aryl group, and $R^4$ represents a halogen atom, a hydroxyl group, a carboxyl group, a substituted or unsubstituted alkyl group, a substituted or unsubstituted aryl group, a substituted or unsubstituted alkoxy group, a substituted or unsubstituted acyl group, a substituted or unsubstituted acyloxy group, or a substituted or unsubstituted alkoxycarbonyl group.

2. A charge transporting copolymer according to claim 1, wherein $R^1$–$R^3$ in the general formula (3) each independently represent a hydrogen atom or a monovalent hydrocarbon group which may be branched or may contain a ring structure, and $R^4$ is a monovalent hydrocarbon group which may be branched or may contain a ring structure.

3. A charge transporting copolymer according to claim 1, wherein $R^4$ in the general formula (3) represents a substituted alkyl group, a substituted aryl group, a substituted alkoxy group, a substituted acyl group, a substituted acyloxy group or a substituted alkoxycarbonyl group, each having as a substituent thereof at least one group selected from the group consisting of a halogen atom, a hydroxyl group, a mercapto group, a nitrile group, a carboxyl group, a halogenated carbonyl group, a halogenated sulfonyl group, an isocyanate group, an amino group and an alkoxysilyl group.

4. A charge transporting copolymer according to claim 1, wherein the glass transition temperature of said insulating block and/or the glass transition temperature of said charge transporting block are 20° C. or higher.

5. A charge transporting copolymer according to claim 1, wherein the weight average molecular weight of said charge transporting block and the weight average molecular weight of said insulating block are each in the range of from 2,000 to 5,000,000.

6. A charge transporting copolymer according to claim 1, wherein the weight average molecular weight of said charge transporting block and the weight average molecular weight of said insulating block are each in the range of from 20,000 to 1,000,000.

7. A charge transporting copolymer according to claim 1, wherein said charge transporting block and said insulating block are incompatible with each other.

8. A charge transporting copolymer according to claim 1, wherein $X^1$ in said general formula (1) represents a substituted or unsubstituted biphenylene group.

9. A method for making a charge transporting copolymer, comprising the steps of:

preparing a charge transporting block having as a repeating unit at least one structure represented by the general formula (1) or (2);

introducing a polymerization initiator into an end or side of said charge transporting block; and polymerizing a vinyl monomer represented by the general formula (3) by means of said polymerization initiator to form an insulating block having as a repeating unit at least one structure represented by the general formula (3) at the end or side of the charge transporting block;

General formula (1) being:

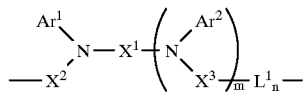

where $Ar^1$ and $Ar^2$ each independently represent a substituted or unsubstituted aryl group, $X^1$ represents a divalent hydrocarbon or heteroatom-containing hydrocarbon group which has an aromatic ring structure, $X^2$ and $X^3$ each independently represent a substituted or unsubstituted arylene group, $L^1$ represents a divalent hydrocarbon or heteroatom-containing hydrocarbon group which may be branched or may contain a ring structure, and m and n each independently represent 0 or 1;

General fornula (2) being:

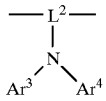

where $Ar^3$ and $Ar^4$ each independently represent a substituted or unsubstituted aryl group, and $L^2$ represents a trivalent hydrocarbon or heteroatom-containing hydrocarbon group which has an aromatic ring structure; and General formula (3):

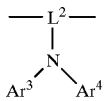

where $R^1$–$R^3$ each independently represent a hydrogen atom, a halogen atom, a substituted or unsubstituted alkyl group, or a substituted or unsubstituted aryl group, and $R^4$ represents a halogen atom, a hydroxyl group, a carboxyl group, a substituted or unsubstituted alkyl group, a substituted or unsubstituted aryl group, a substituted or unsubstituted alkoxy group, a substituted or unsubstituted acyl group, a substituted or unsubstituted acyloxy group, or a substituted or unsubstituted alkoxycarbonyl group.

10. A method for making a charge transporting copolymer according to claim 9, wherein said initiator is an azo-type initiator.

11. A method for making a three-dimensionally crosslinked charge transporting copolymer, comprising preparing a charge transporting polymer according to claim 3; and heating and/or treating said polymer with water to crosslink and cure the polymer.

12. A three-dimensionally crosslinked charge transporting copolymer prepared by the method of claim 11.

13. A method for making a charge transporting copolymer according to claim 9, wherein $R^1$–$R^3$ in the general formula (3) each independently represent a hydrogen atom or a monovalent hydrocarbon group which may be branched or may contain a ring structure, and $R^4$ is a monovalent hydrocarbon group which may be branched or may contain a ring structure.

14. A method for making a charge transporting copolymer according to claim 9, wherein $R^4$ in the general formula (3) represents a substituted alkyl group, a substituted aryl group, a substituted alkoxy group, a substituted acyl group, a substituted acyloxy group or a substituted alkoxycarbonyl group, each having as a substituent thereof at least one group selected from the group consisting of a halogen atom, a hydroxyl group, a mercapto group, a nitrile group, a carboxyl group, a halogenated carbonyl group, a halogenated sulfonyl group, an isocyanate group, an amino group and an alkoxysilyl group.

15. A method for making a charge transporting copolymer according to claim 9, wherein the glass transition temperature of said insulating block and/or the glass transition temperature of said charge transporting block are 20° C. or higher.

16. A method for making a charge transporting copolymer according to claim 9, wherein the weight average molecular weight of said charge transporting block and the weight average molecular weight of said insulating block are each in the range of from 2,000 to 5,000,000.

17. A method for making a charge transporting copolymer according to claim 9, wherein said charge transporting block and said insulating block are incompatible with each other.

18. A method for making a charge transporting copolymer according to claim 9, wherein $X^1$ in said general formula (1) represents a substituted or unsubstituted biphenylene group.

19. A charge transporting copolymer according to claim 1, wherein said charge transporting block is connected to said insulating block through an azo-type initiator.

20. A method for making a three-dimensionally crosslinked charge transporting copolymer according to claim 11, comprising the steps of:

preparing a charge transporting block having as a repeating unit at least one structure represented by the general formula (1) or (2);

introducing a polymerization initiator into an end or side of said charge transporting block;

polymerizing a vinyl monomer represented by the general formula (3) by means of said polymerization initiator to form an insulating block having as a repeating unit at least one structure represented by the general formula (3) at the end or side of the charge transporting block to form a block or graft copolymer; and heating and/or treating said block or graft copolymer with water to crosslink and cure the block or graft copolymer.

21. A method for making a three-dimensionally crosslinked charge transporting copolymer according to claim 20, wherein said initiator is an azo-type initiator.

* * * * *